United States Patent [19]

Ishida et al.

[11] Patent Number: 5,579,405
[45] Date of Patent: Nov. 26, 1996

[54] METHOD AND APPARATUS FOR CONTOUR VECTOR IMAGE PROCESSING

[75] Inventors: Yoshihiro Ishida; Akihiro Katayama; Junichi Yamakawa, all of Kawasaki, Japan

[73] Assignee: Canon Kabushiki Kaisha, Tokyo, Japan

[21] Appl. No.: 561,154

[22] Filed: Nov. 21, 1995

Related U.S. Application Data

[63] Continuation of Ser. No. 80,242, Jun. 23, 1993, abandoned.

[30] Foreign Application Priority Data

Jun. 26, 1992 [JP] Japan ................................. 4-169581

[51] Int. Cl.⁶ .................................................. G06K 9/48
[52] U.S. Cl. ........................ 382/197; 382/199; 382/298
[58] Field of Search ................................. 382/197, 198, 382/199, 200, 242, 298, 316

[56] References Cited

U.S. PATENT DOCUMENTS

| | | | |
|---|---|---|---|
| 4,956,869 | 9/1990 | Miyatake et al. | 382/22 |
| 4,961,231 | 10/1990 | Nakayama et al. | 382/22 |
| 5,038,385 | 8/1991 | Kasahara | 382/22 |
| 5,086,484 | 2/1992 | Katayama et al. | 382/50 |
| 5,144,682 | 9/1992 | Nakamura | 382/22 |

FOREIGN PATENT DOCUMENTS

| | | |
|---|---|---|
| 0333496 | 9/1989 | European Pat. Off. |
| 1-232893 | 9/1989 | Japan . |
| 1-295374 | 11/1989 | Japan . |
| 4157578 | 5/1992 | Japan . |
| 5108823 | 4/1993 | Japan . |
| 5174140 | 7/1993 | Japan . |

Primary Examiner—Leo Boudreau
Assistant Examiner—Phuoc Tran
Attorney, Agent, or Firm—Fitzpatrick, Cella, Harper & Scinto

[57] ABSTRACT

A method and an apparatus for forming an image by contour vector processing includes scanning a pixel along an edge of the image formed by pixels having a first pixel state and pixels having a second pixel state, discriminating one pixel state of the scanned pixel, and determining the pixel states of pixels bordering the discriminated pixel in the case the discriminated pixel has a first pixel state. Contour vectors are extracted between the discriminated pixel having the first pixel state and pixels having a second pixel state bordering the discriminated pixel which are closer to the discriminated pixel than to the bordering pixels, and outputting the extracted contour vectors to form the image.

22 Claims, 58 Drawing Sheets

FIG.3
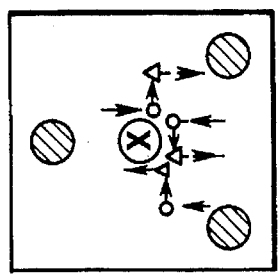
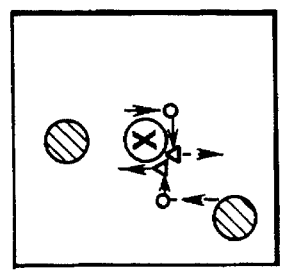
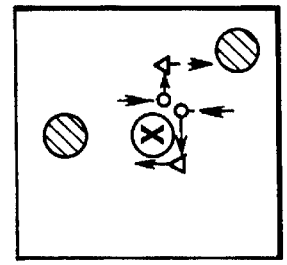
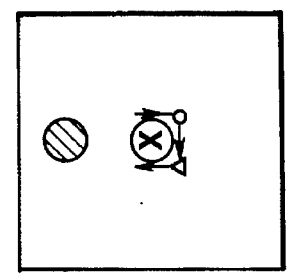
CASE 01
FIG.4
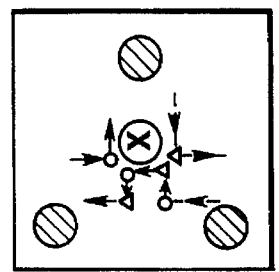
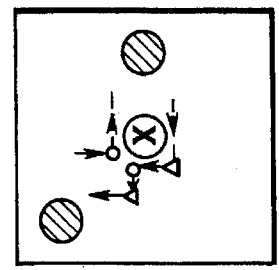
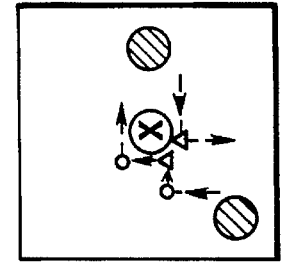
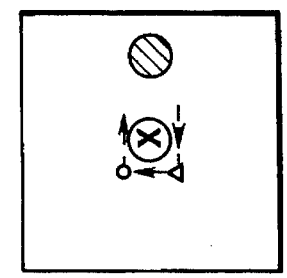
CASE 02

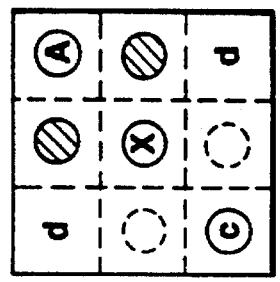
CASE 03

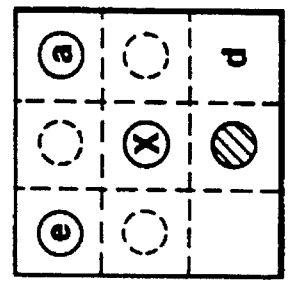
CASE 04

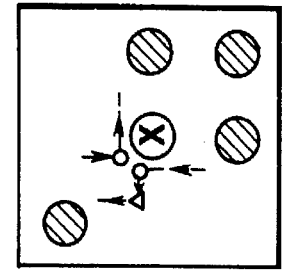
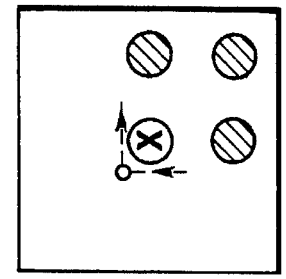
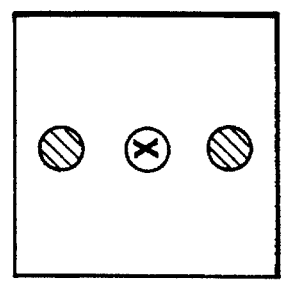
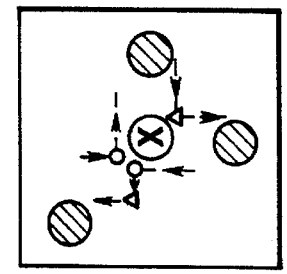
FIG.7　　FIG.8
　
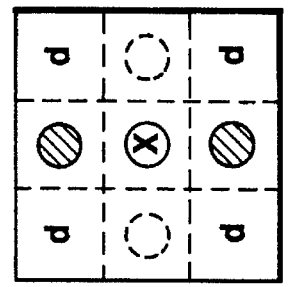
CASE 05
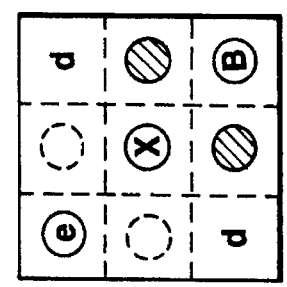
CASE 06

FIG.9
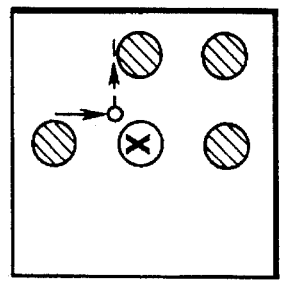
OR
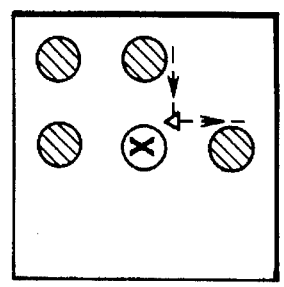
OR
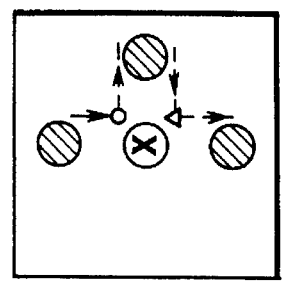 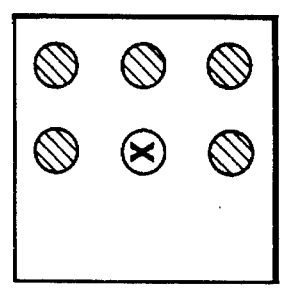
OR
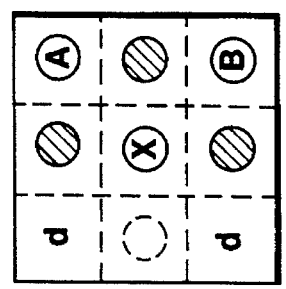
CASE 07

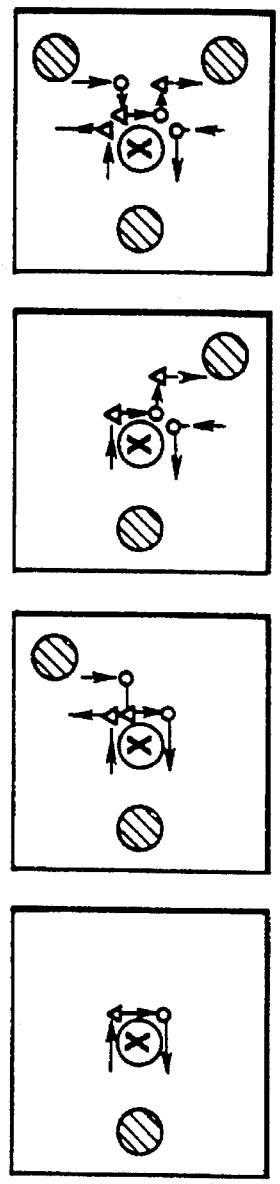
FIG.10
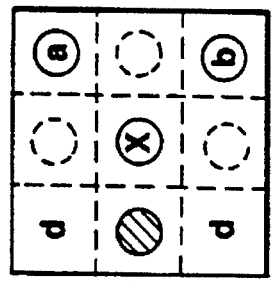
CASE 08
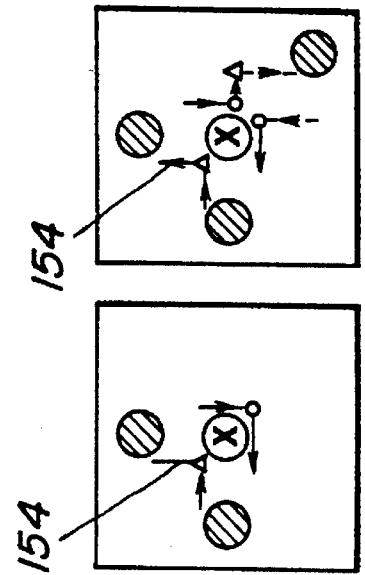
FIG.11
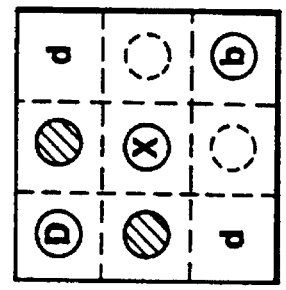
CASE 09

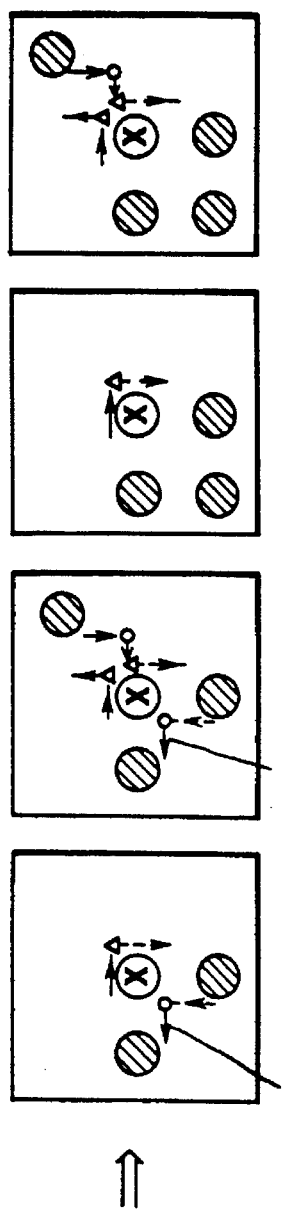
FIG.14
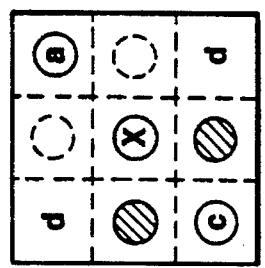
CASE 12
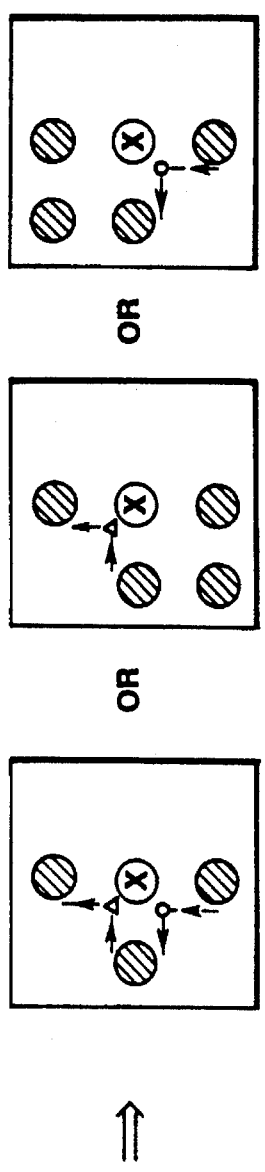
FIG.15
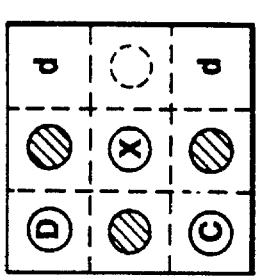
CASE 13

FIG.16
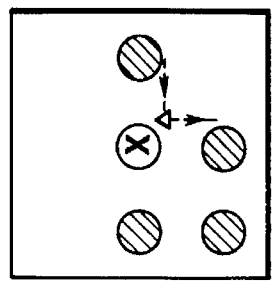
OR
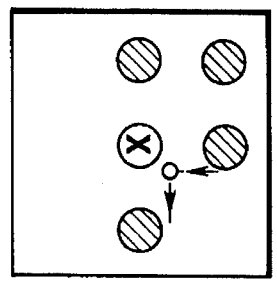
OR
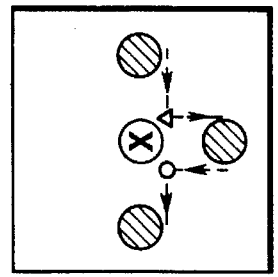 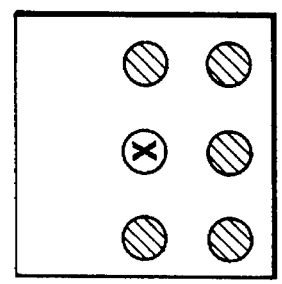
OR
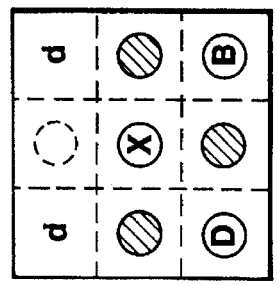
CASE 14

METHOD AND APPARATUS FOR CONTOUR VECTOR IMAGE PROCESSING

This application is a continuation of application Ser. No. 08/080,242 filed Jun. 23, 1993, now abandoned.

BACKGROUND OF THE INVENTION

1. Field of the Invention

This invention relates to an image processing method and apparatus in which contour vectors of an input binary image are extracted, and a binary image is generated based on the extracted contour vectors.

2. Description of the Related Art

The asignee of the present application has proposed techniques for extracting contour information of a binary image in Japanese Patent Application Nos. 2-281958 (1990) and 3-272701 (1991).

In Japanese Patent Application No. 2-281958 (1990), a technique is disclosed in which attention is paid to a certain pixel (picture element), and it is determined whether or not the target pixel is a pixel situated at a contour position in accordance with the state of the target pixel and a plurality of pixels surrounding it. When it has been determined that the target pixel is a contour pixel, vectors in the horizontal and vertical directions are extracted in accordance with the state of the target pixel and pixels surrounding it.

According to this technique, since all contour lines in an image can be extracted in a single raster scanning operation, and an image memory for storing all image data is not required, the capacity of a memory can be reduced. This technique is a contour-line extraction method which can extract contour-line vector data providing a significant width even for a fine line having the width of one pixel by extracting contours in units of an edge of each pixel of an input image, instead of extracting contours by connecting the central positions of respective pixels of the image. Furthermore, the present application describes that not only contour lines of a region comprising pixels connected in four directions in the original image are extracted, but also contour lines of a region comprising pixels connected in eight directions can also be extracted.

In Japanese Patent Application No. 3-272701 (1991), with respect to the rules when extracting contour points of a region comprising eight connected pixels disclosed in Japanese Patent Application No. 2-281958 (1990), a method is proposed in which each of two contour points set between two black pixels connected in an oblique direction is defined at each time period when it becomes a target pixel. By adopting such a method, each extraction means can be operated independently from the state of other surrounding pixels.

On the other hand, in Japanese Patent Application No. 3-345062 (1991), the assignee of the present application has proposed an image processing apparatus for obtaining a variable-magnification image having high picture quality using contour information of a binary image. In this proposal, outline vectors are extracted from a binary image, outline vectors subjected to smooth magnification-varying processing with a desired (arbitrary) magnification are formed in the state of expression of the extracted outline vectors, and a binary image is regenerated from the outline vectors subjected to the smooth magnification-varying processing. Thus, a digital binary image having high picture quality subjected to magnification-varying processing with the desired (arbitrary) magnification is obtained. Methods for extracting outline vectors from a binary image are disclosed, for example, in the above-described Japanese Patent Application Nos. 2-281958 (1990) and 3-272701 (1991).

However, in the technique described in Japanese Patent Application No. 3-345062 (1991), if the user intends to obtain a variable-magnification image using outline vectors extracted using the rules disclosed in the above-described Japanese Patent Application Nos. 2-281958 (1990) and 3-272701 (1991), the widths of pixels at fine-line portions of the generated output image in some cases tend to increase when magnification-varying processing of a low magnification of about 1 to 2 times is performed. That is, in the methods disclosed in the above-described Japanese Patent Application Nos. 2-281988 (1990) and 3-272701 (1991), while contour vectors are extracted by defining a contour point at the exact midpoint between a white pixel and a black pixel, a pixel regeneration unit processes a pixel indicated by a contour coordinate value of the obtained image subjected to smoothing and magnification-varying processing as a black pixel. Accordingly, in the case of a low magnification, if pixels on contour lines defined so as to surround a pixel in the original image are black pixels, and a black pixel is present in the region surrounded by the contour lines, the area of regions of black pixels tends to increase at a non-neglible ratio from the area defined by the original magnification compared with the area of regions of white pixels.

SUMMARY OF THE INVENTION

The present invention has been made in consideration of the above-described problems.

It is an object of the present invention to provide an image processing method and apparatus for extracting contour vector data in order to generate an excellent image without increasing the width of a line even after magnification-varying processing.

According to one aspect, the present invention which achieves this objective relates to an image processing method and apparatus for extracting contour vectors of a binary image consisting of a set of a first pixel state and a second pixel state, wherein, when extracting a vector present along an image edge changing from the first pixel state to the second pixel state, a vector present along a border which is provided at least between the first and second pixel states and closer to the first pixel state is extracted.

According to another aspect, the present invention which achieves this objective relates to an image processing method and apparatus for extracting contour vectors of a binary image consisting of a set of a first pixel state and a second pixel state, and generating a binary image having a desired varying magnification based on the extracted contour vectors, wherein, when extracting a vector present along an image edge changing from the first pixel state to the second pixel state, a vector present along a border which is provided at least between the first pixel state and the second pixel state and closer to the first pixel state based on the magnification is extracted.

These and other objects, advantages and features of the present invention will become more apparent from the following description of the preferred embodiments taken in conjunction with the accompanying drawings.

BRIEF DESCRIPTION OF THE DRAWINGS

FIG. 3 is a diagram illustrating the state of case 01 when extracting contour vectors from a binary image in the first embodiment;

FIG. 4 is a diagram illustrating the state of case 02 when extracting contour vectors from a binary image in the first embodiment;

FIG. 7 is a diagram illustrating the state of case 05 when extracting contour vectors from a binary image in the first embodiment;

FIG. 8 is a diagram illustrating the state of case 06 when extracting contour vectors from a binary image in the first embodiment;

FIG. 9 is a diagram illustrating the state of case 07 when extracting contour vectors from a binary image in the first embodiment;

FIG. 10 is a diagram illustrating the state of case 08 when extracting contour vectors from a binary image in the first embodiment;

FIG. 11 is a diagram illustrating the state of case 09 when extracting contour vectors from a binary image in a first embodiment of the present invention;

FIG. 14 is a diagram illustrating the state of case 12 when extracting contour vectors from a binary image in the first embodiment;

FIG. 15 is a diagram illustrating the state of case 13 when extracting contour vectors from a binary image in the first embodiment;

FIG. 16 is a diagram illustrating the state of case 14 when extracting contour vectors from a binary image in the first embodiment;

DESCRIPTION OF THE PREFERRED EMBODIMENTS

A first preferred emodiment of the present invention will now be described in detail with reference to the drawings.

Figure 1:
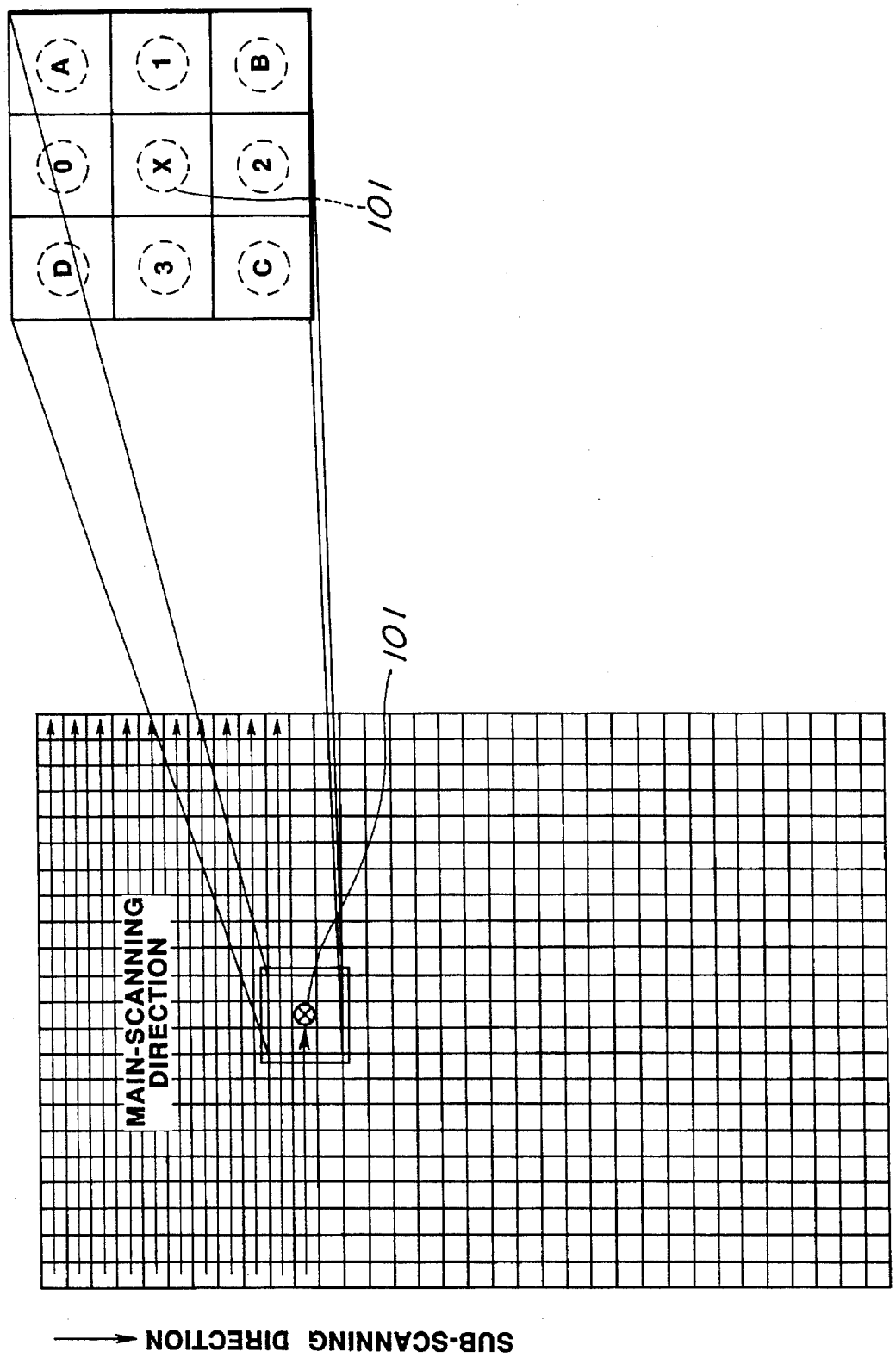
FIG. 1 is a diagram illustrating scanning directions of an image, and the relationship between a target pixel and pixels surrounding it.

In the first embodiment, as shown in FIG. 1, in a binary image, processing is performed based on the state of nine pixels, i.e., a target pixel and eight pixels surrounding it. After the completion of one processing, a pixel adjacent to the target pixel is made to be the new target pixel, and the same processing is performed. In FIG. 1, the pixel (represented by reference numeral 101) having mark "x" in the center of the pixel block (comprising 3×3 pixels) indicates the target pixel. Positions indicated by marks "0" and "2" are situated at the same position as target pixel 101 in the main-scanning direction, and represent pixels before and after target pixel 101 by one raster in the sub-scanning direction, respectively. Positions indicated by marks "1" and "3" are situated on the same raster as target pixel 101, and represent pixels immediately before and after target pixel 101 in the main-scanning direction. Marks "A" and "B" represent pixels immediately after target pixel 101 in the main-scanning direction and at positions before and after target pixel 101 by one raster in the sub-scanning direction, respectively. Marks "C" and "D" represent pixels immediately before target pixel 101 in the main-scanning direction and at positions after and before target pixel 101 by one raster in the sub-scanning direction, respectively.

FIG. 84 illustrates an example of the configuration of the hardware for performing contour detection in the present embodiment.

In FIG. 84, input control (interface) unit 501 controls image data input via signal line 500. Binary image data are sequentially input from signal line 500 in the form of raster scanning. Latch 502 holds the image data input from input control unit 501 while sequentially updating the data for every pixel in synchronization with a pixel synchronizing clock signal (not shown). At the next pixel synchronizing clock signal, latch 502 inputs the next pixel data from input control circuit 501. At that time, the held pixel data is latched and held by latch 503 in synchronization with the pixel synchronizing clock signal. Similarly, the pixel data held in latch 503 is held by latch 504 at the next pixel synchronizing clock signal.

FIFO's (first-in first-out memories) 505 and 506 hold pixel data for one raster. FIFO 505 sequentially receives the output of latch 504 in synchronization with the pixel synchronizing clock signal, and outputs data of the immediately preceding raster to latch 507. Similarly, FIFO 506 receives the output of latch 509, and outputs pixel data of the immediately preceding raster to latch 510. Latches 507, 508 and 509, and latches 510, 511 and 512 function entirely in the same manner as the above-described latches 502, 503 and 504.

Thus, latches 502, 503, 504, 507, 508, 509, 510, 511 and 512 store pixel data of the region comprising the nine (3×3) pixels shown in FIG. 1. That is, the data stored in these latches correspond to "B", "2", "C", "1", "x", "3", "A", "0" and "D" shown in FIG. 1, respectively.

Reference numerals 513 and 514 represent input ports of CPU 519. Input port 513 inputs the data stored in latches 510, 502, 504 and 512, i.e., the data of the positions "A", "B", "C" and "D", to CPU 519. Similarly, input port 514 inputs the data stored in latches 511, 507, 503, 509 and 508, i.e., the data of the positions "0", "1", "2", "3" and "x", to CPU 519.

Main-scanning counter 515 indicating the positions of pixels in the main-scanning direction is reset by a sub-scanning synchronizing signal (not shown), and performs counting by pixel synchronizing signals. Sub-scanning counter 516 indicating the positions of pixels in the sub-scanning direction is reset by a page synchronizing signal (not shown), and performs counting by sub-scanning synchronizing signals. Input/output control port 517 holds a signal for instructing the execution and retention of a pixel data input to input/output control circuit 501 and a signal for notifying updating of pixel data from input/output control circuit 501 to CPU 519, and the like. Reference numeral 521 represents an input/output control device for file 522. Input/output control port 517, main-scanning counter 515, sub-scanning counter 516, input ports 513 and 514, memory 520 and disk I/O 521 are connected to CPU 519 via bus 518.

Thus, CPU 519 updates pixel data via input/output control port 517, and can know the position (i, j) of the target pixel via main-scanning counter 515 and sub-scanning counter 516. CPU 519 can also know the state of the target pixel and the eight surrounding pixels via input ports 513 and 514.

When the processing of the target pixel has thus been completed, CPU 519 instructs updating of pixel data to be stored in the nine latches via input/output control port 517, and resets the signal indicating the completion of updating of pixel data. Upon the instruction of updating, input/output control circuit 501 clears the signal indicating updating of pixel data, updates pixel data latched in the following latches, and outputs a signal indicating the completion of updating to input/output control port 517 upon the completion of updating.

After outputting the instruction of updating, CPU 519 monitors input of the signal indicating the completion of updating from input/output control port 517. Upon input of the signal indicating the completion of updating, CPU 519 executes processing for the pixel data newly stored in the nine latches, and repeats the above-described processing. When the final pixel in the image region has been processed as the target pixel, input/output control circuit 501 outputs an end signal to input/output control port 517.

Next, a description will be provided of respective cases in accordance with the state of the target pixel and the eight pixels surrounding it.

When the target pixel is a white pixel, it can be determined that the position of the pixel does not correspond to an edge of the binary image. Hence, the processing is terminated, and the next pixel in the direction of raster (the main-scanning direction in FIG. 1) is made to be a new target pixel.

When the target pixel is a black pixel, processing is performed in accordance with the state of the surrounding pixels. A description will now be provided of the contents of specific processing with reference to FIGS. 2 through 17.

In FIGS. 2 through 17, mark ○ represents the start point of a horizonal vector and the end point of a vertical vector. Mark △ represents the start point of vertical vector and the end point of a horizontal vector. A solid-line arrow represents a vector whose connection relationship is determined in the processing of the target pixel. A broken-line arrow represents a vector in which only one of the start point and the end point is determined in the processing of the target pixel. A vector in which the direction of the arrow is indicated in the midpoint of the axis represents a vector defined by a contour point (indicating both the start point and the end point) extracted (to be extracted) in the processing of a pixel other than the target pixel, and a contour point to be extracted in the processing of the target pixel. A vector in which the direction of the arrow is indicated at the leading end of the axis represents a vector defined between contour points to be extracted in the processing of the target pixel.

In FIGS. 2 through 17, in the present embodiment, a contour point is defined at a position closer to a black pixel between the black pixel and the white pixel. By defining a coutour point at a position closer to the black pixel between the black pixel and the white pixel, a contour point to be extracted between pixels connected in a diagonal direction is also defined. The operation in each case will now be described in detail.

Figure 2:
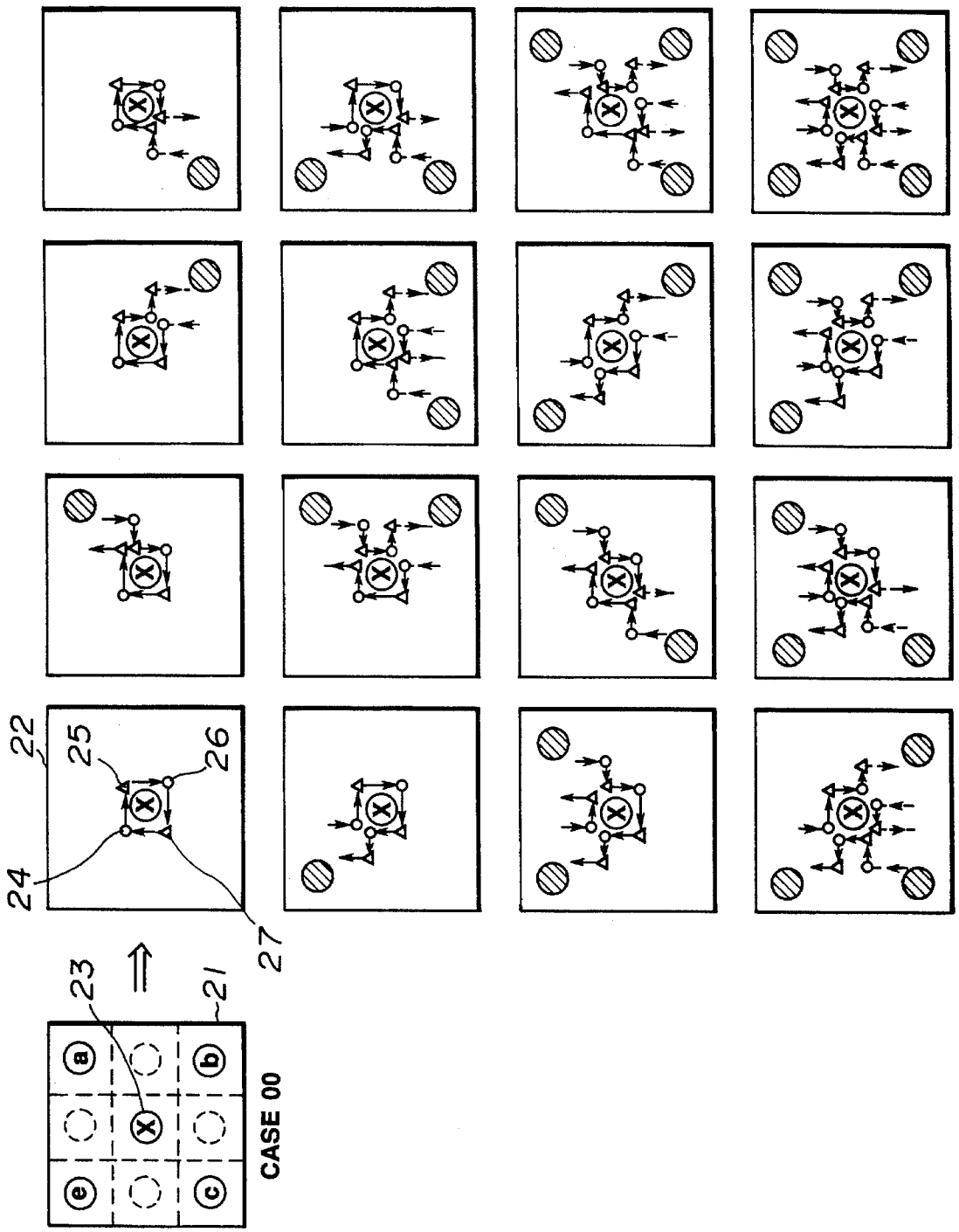
FIG. 2 is a diagram illustrating the state of case 00 when extracting contour vectors from a binary image in a first embodiment of the present invention.

The position of a pixel in an input image is indicated by a positive integer both in the main-scanning direction and the sub-scanning direction, and is represented by two-dimensional coordinates. For example, if the position of the target pixel shown in FIG. 2 is assumed to be (3, 7), this indicates the position of the third pixel on the seventh raster. Four vectors indicated by reference numeral 22 in FIG. 2 are expressed as four continuous vectors whose start points and end points are sequentially present at points 24 (2.75, 6.75), 25 (3.25, 6.75), 26 (3.25, 7.25) and 27 (2.75, 7.25).

If these vectors are expressed by [the coordinates of the start point, the coordinates of the end point], the four vectors indicated by reference numeral 22 in FIG. 2 are expressed in the following manner:
[(2.75, 6.75), (3.25, 6.75)],
[(3.25, 6.75), (3.25, 7.25)],
[(3.25, 7.25), (2.75, 7.25)], and
[(2.75, 7.25), (2.75, 6.75)].

In order to avoid expression in decimal notation, for the sake of convenience, the position of a pixel is expressed by positive multiples of four in the following description, and the position of a pixel at a start point or an end point is expressed by an integer (an odd number) obtained by adding or subtracting one from multiples of four. That is, a pixel at position (m, n) is expressed by a coordinate expression of positive integers (multiples of four) ($4m$, $4n$). Thus, in the case of FIG. 2, the position of the target pixel is expressed by (12, 28), the four start or end points are expressed by (11, 27), (13, 27), (13, 29) and (11, 29). That is, the four vectors shown in FIG. 2 are expressed as follows:
[(11, 27), (13, 27)],
[(13, 27), (13, 29)],
[(13, 29), (11, 29)], and
[(11, 29), (11, 27)].

The binary image is assumed to be made of m×n pixels (m and n are positive integers), comprising n rasters, each having m pixels, and the position of the i-th pixel on the j-th raster is expressed by ($4i$, $4j$) (i and j are positive integers, and $i \leq m$ and $j \leq n$).

Although in the present embodiment, the ratio of the distance between the coordinate position of a contour vector and a black pixel to the distance between the coordinate position of the contour vector and a white pixel is assumed to be 1:3, the present invention is not limited to this ratio.
Explanation of Contour Extraction Processing FIG. 64 is a flowchart illustrating the entire flow of contour extraction processing by CPU 519 of the apparatus of the first embodiment.

Figure 65:
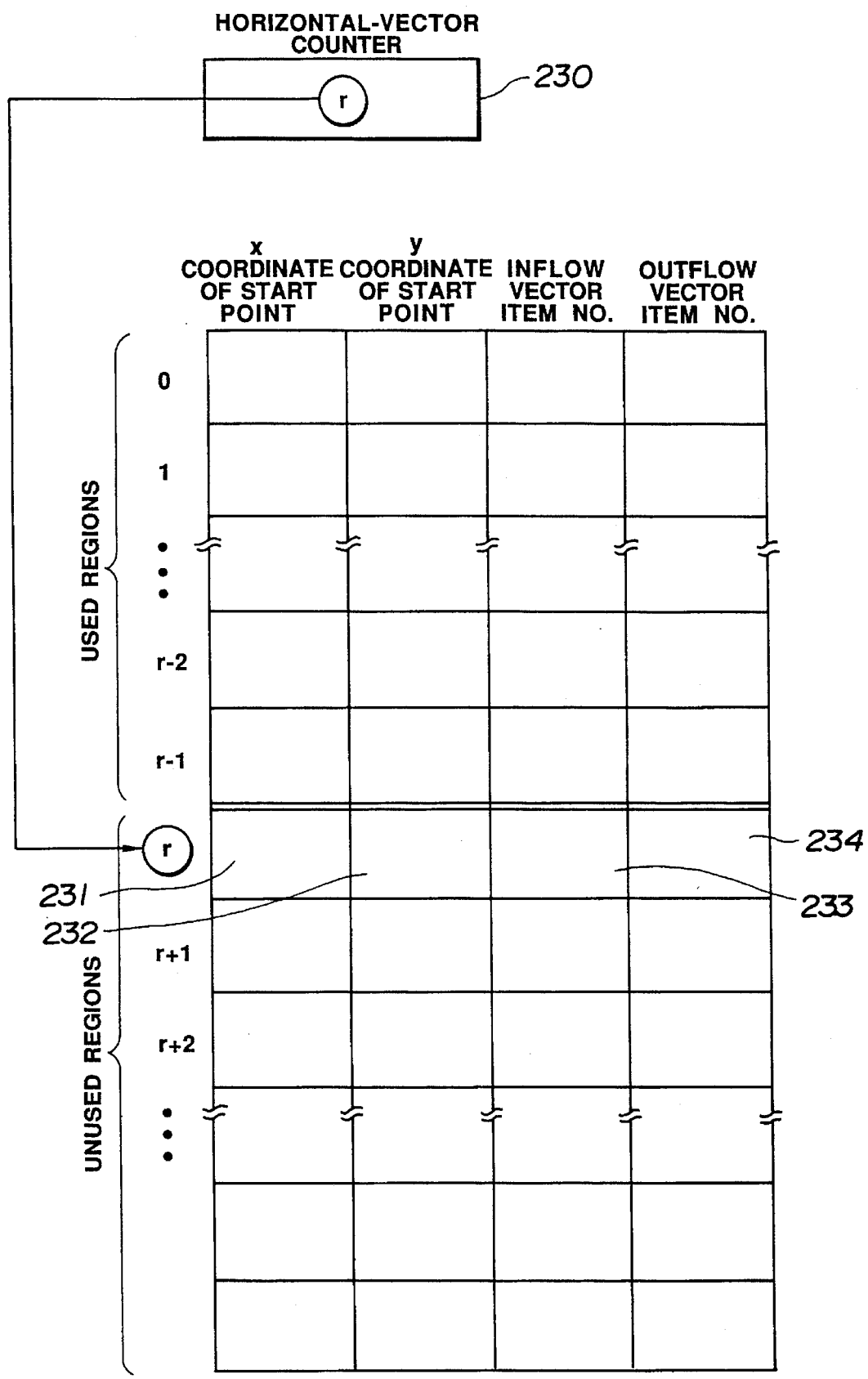
FIG. 65 is a diagram illustrating a registration table for horizontal vectors in the first embodiment.
Figure 66:
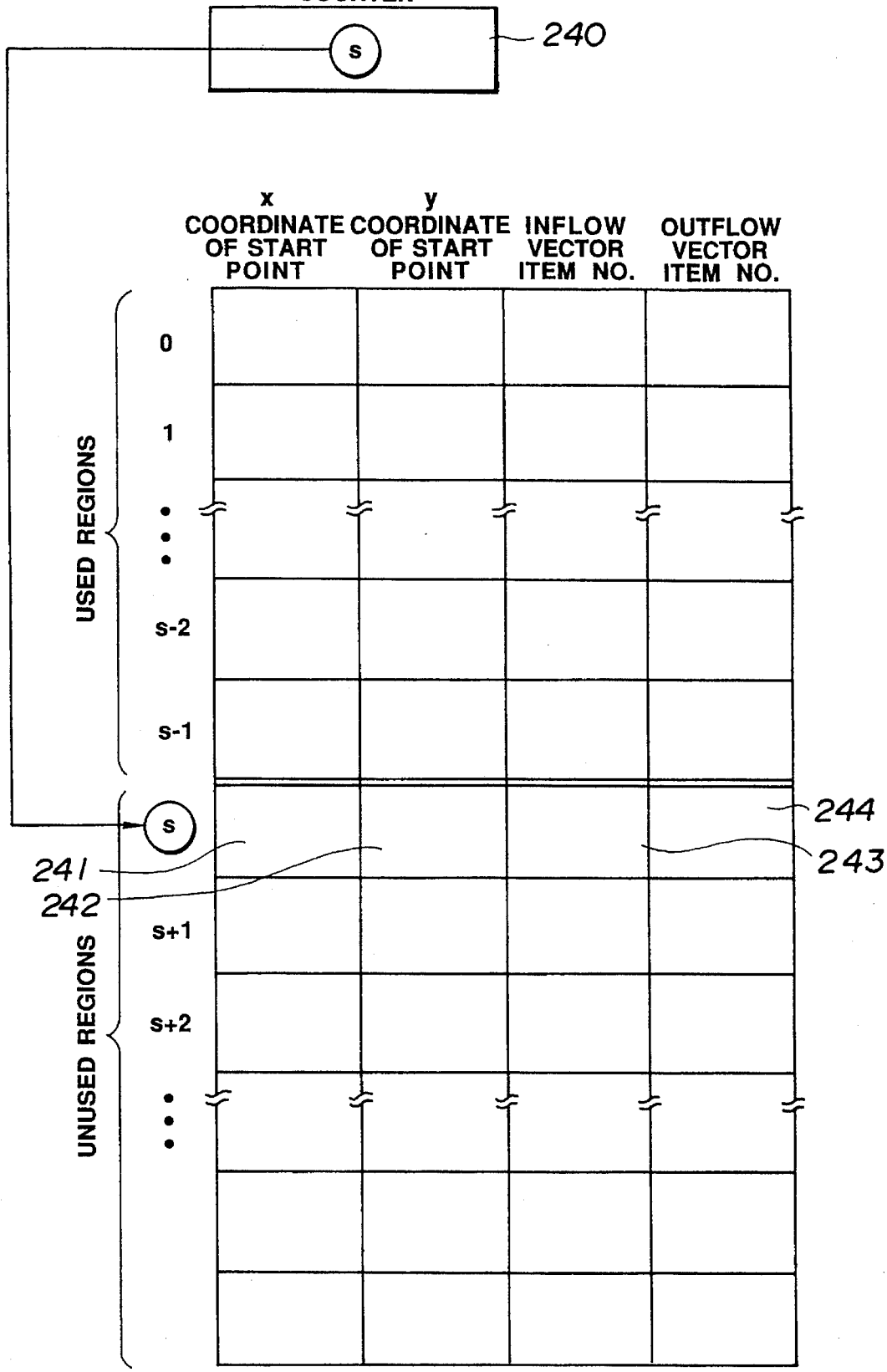
FIG. 66 is a diagram illustrating a registration table for vertical vectors in the first embodiment.

First, in step S1, a vector string is extracted from binary image data, and the coordinates of the start point of each vector, vectors flowing in this vector (having the coordinates of the start point of this vector as end points), and vectors flowing from this vector (having the coordinates of the end point of this vector as start points) are output in the table forms shown in FIGS. 65 and 66. FIG. 65 includes horizontal vectors, and FIG. 66 includes vertical vectors.

Figure 67:
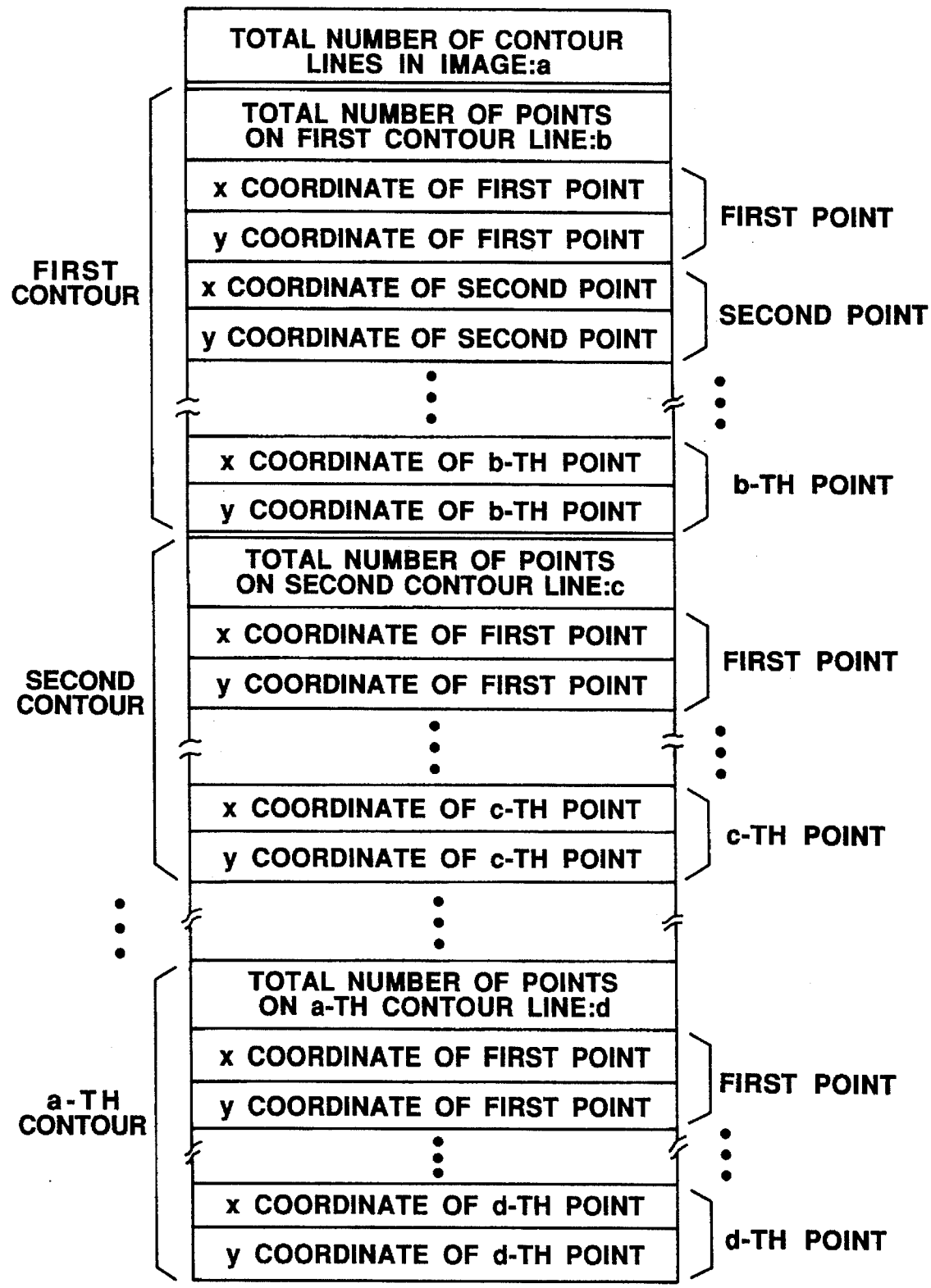
FIG. 67 is a diagram illustrating the data form of contour lines in the first embodiment.

The process then proceeds to step S2, where by following the item numbers of inflow and outflow vectors from the tables shown in FIGS. 65 and 66, a table as shown in FIG. 67 is formed, which stores the total number of contour lines in the image, the total number of contour points on each contour line, and the x coordinate and the y coordinate of each point on each contour line. The process then proceeds to step S3, where the table information is stored in the form of a file on disks 522 via disk I/O 521, and where processing is terminated.

Figure 64:
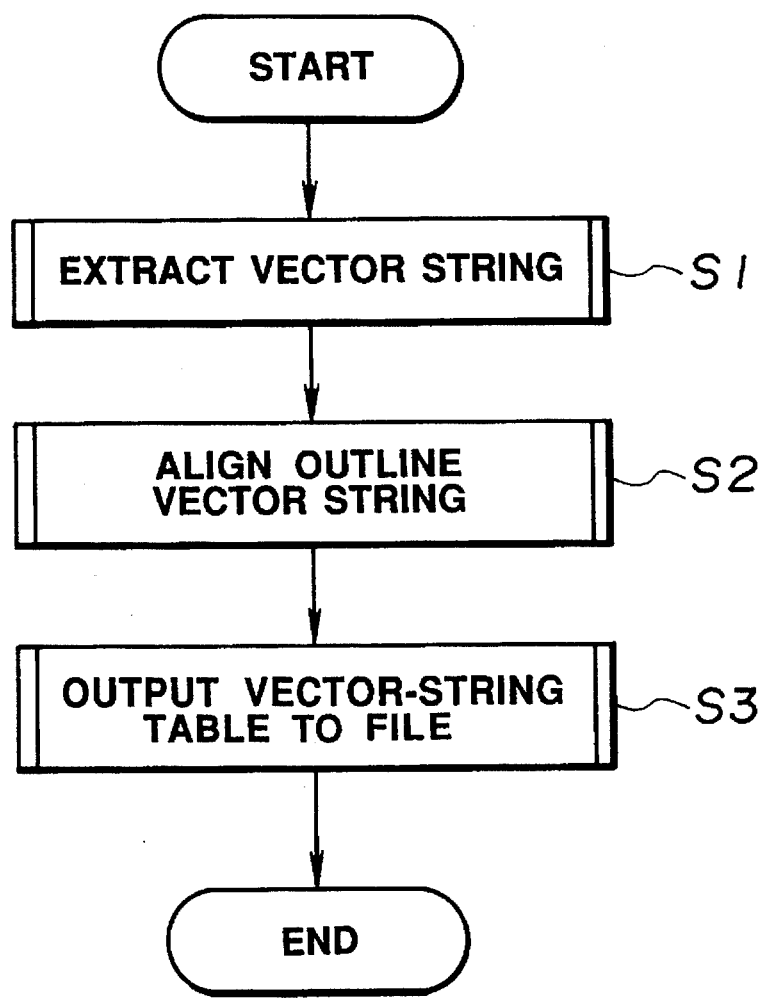
FIG. 64 is a flowchart illustrating the entire procedure of contour vector extraction in the first embodiment.
Figure 68:
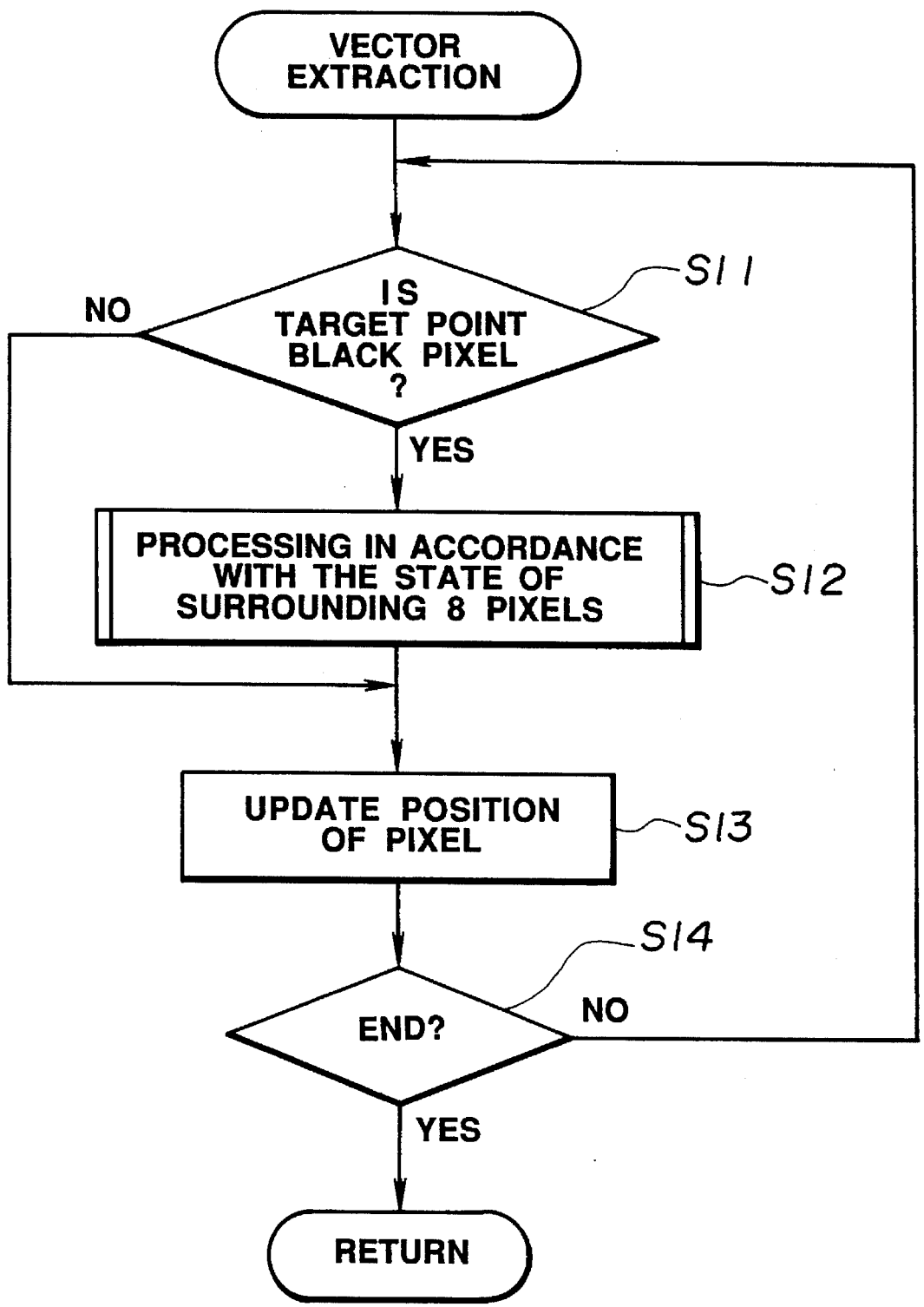
FIG. 68 is a flowchart illustrating the entire procedure of vector extraction at the position of a target pixel in the first embodiment.

FIG. 68 is a flowchart illustrating vector-string extraction processing performed in step S1 shown in FIG. 64.

First, in step S11, by seeing bit 4 (the target pixel) of input port 514, the target pixel is determined to be a white pixel or a black pixel. In the case of a white pixel, the process proceeds to step S13. In the case of a black pixel, the process proceeds to step S12. In step S12, by seeing the state of the eight pixels surrounding the target pixel, a process routine suitable for the state is initialed.

In step S13, updating of the pixel position is instructed via input/output control port 517 in the above-described manner. When a signal indicating the completion of updating has been input from input/output control port 517, the process proceeds to step S14. In step S14, it is determined whether or not the processing for the final pixel has been completed by input/output control port 517. If the result of the determination is negative, the process returns to step S11. If the result of the determination is affirmative, the process returns to the original routine.

Figure 69:
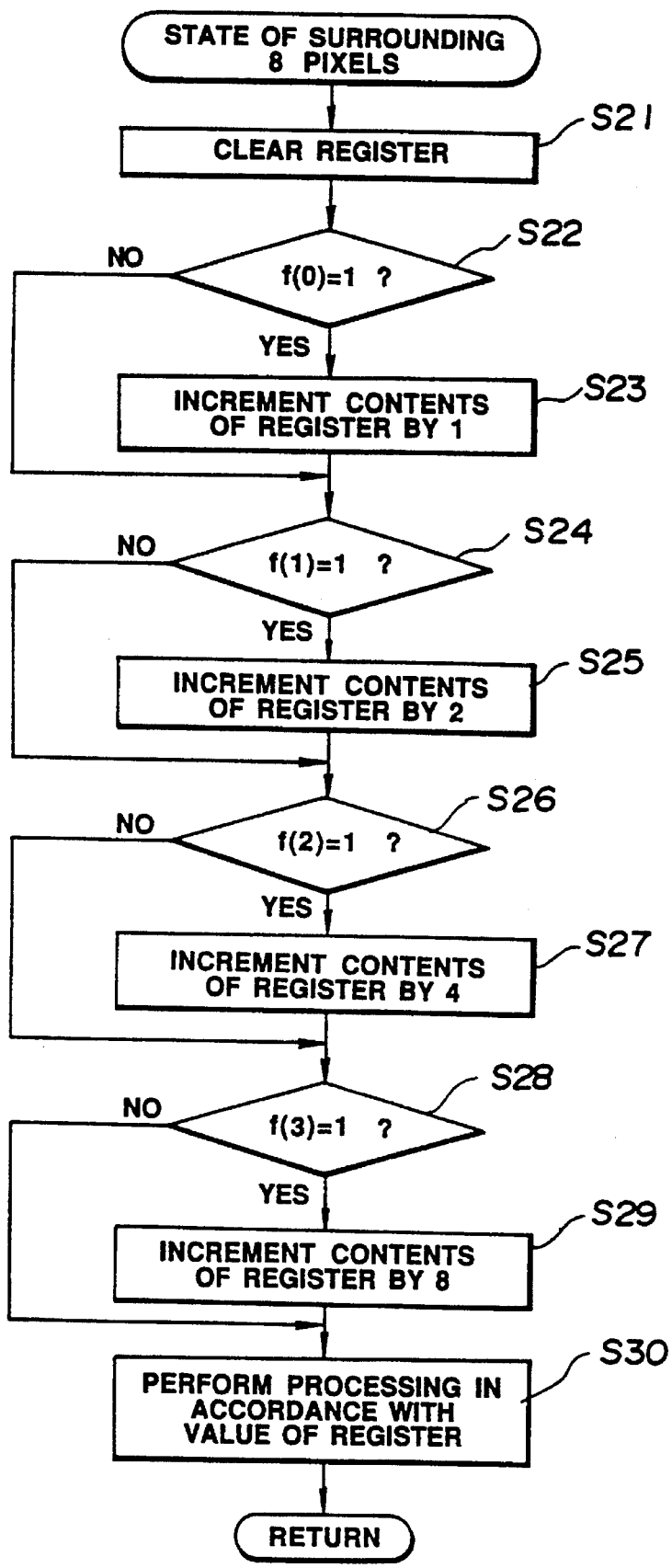
FIG. 69 is a flowchart illustrating the contents of step S12 shown in FIG.

FIG. 69 is a flowchart illustrating the processing to be executed in accordance with the state of the surrounding eight pixels performed in step S12 shown in FIG. 68.

In step S21, the register (comprising, for example, 8 bits) of CPU 519 is cleared to "0". The process then proceeds to step S22. If the state of the pixel at the position indicated by "0" in FIG. 1 (hereinafter expressed f(0)) indicates a black pixel (hereinafter expressed by "1"), the process proceeds to step S23. If the state of that pixel indicates a white pixel (hereinafter expressed by "0"), the process proceeds to step S24. In step S23, "1" is added to the contents of the register (that is, bit 0 is set to "1").

The process then proceeds to step S24. If the state of the pixel at position "1" shown in FIG. 1 indicates a black pixel (that is, f(1)=1), the process proceeds to step S25, in which "2" is added to the contents of the register (bit 1 is set to "1"). If f(1)=0, the process proceeds to step S26. In step S26, it is checked whether or not the state of the pixel at position "2" shown in FIG. 1 indicates a black pixel. If f(2)=1 (a black pixel), the process proceeds to step S27, in which 4 is added to the contents of the register (bit 2 is set to "1").

The process then proceeds to step S28, in which attention is paid to the pixel at position "3" shown in FIG. 1. If f(3)=1, the process proceeds to step S29, in which 8 is added to the contents of the register (bit 3 is set to "1"). If f(3) does not equal 1, the process proceeds to step S30. In step S30, the routine of the process number corresponding to the value held by the register is called for.

According to the above-described processing, the contents of the register can have any value between 0 and 15 in accordance with the state of each pixel at each of pixel positions "0", "1", "2" and "3" shown in FIG. 1.

Cases "00" through "15" are provided in accordance with the respective values, and the following processing is performed for each case.

Explanation of Processing for Case 00

Case 00 is a case in which the target pixel is a black pixel, and least pixels in vertical and horizontal positions relative to the target pixel are white pixels, but pixels in diagonal directions relative to the target pixel may or may not be white.

In this case, cases as shown in FIG. 2 are present for the target pixel and the eight pixels surrounding it. These cases are processed according to the processes for cases e, c, a and b in steps S0001 through S0004 shown in the flowchart of FIG. 18. The processes for cases e, c, a and b correspond to pixels D, C, A and B surrounding the target pixel shown in FIG. 1.

Figure 19:
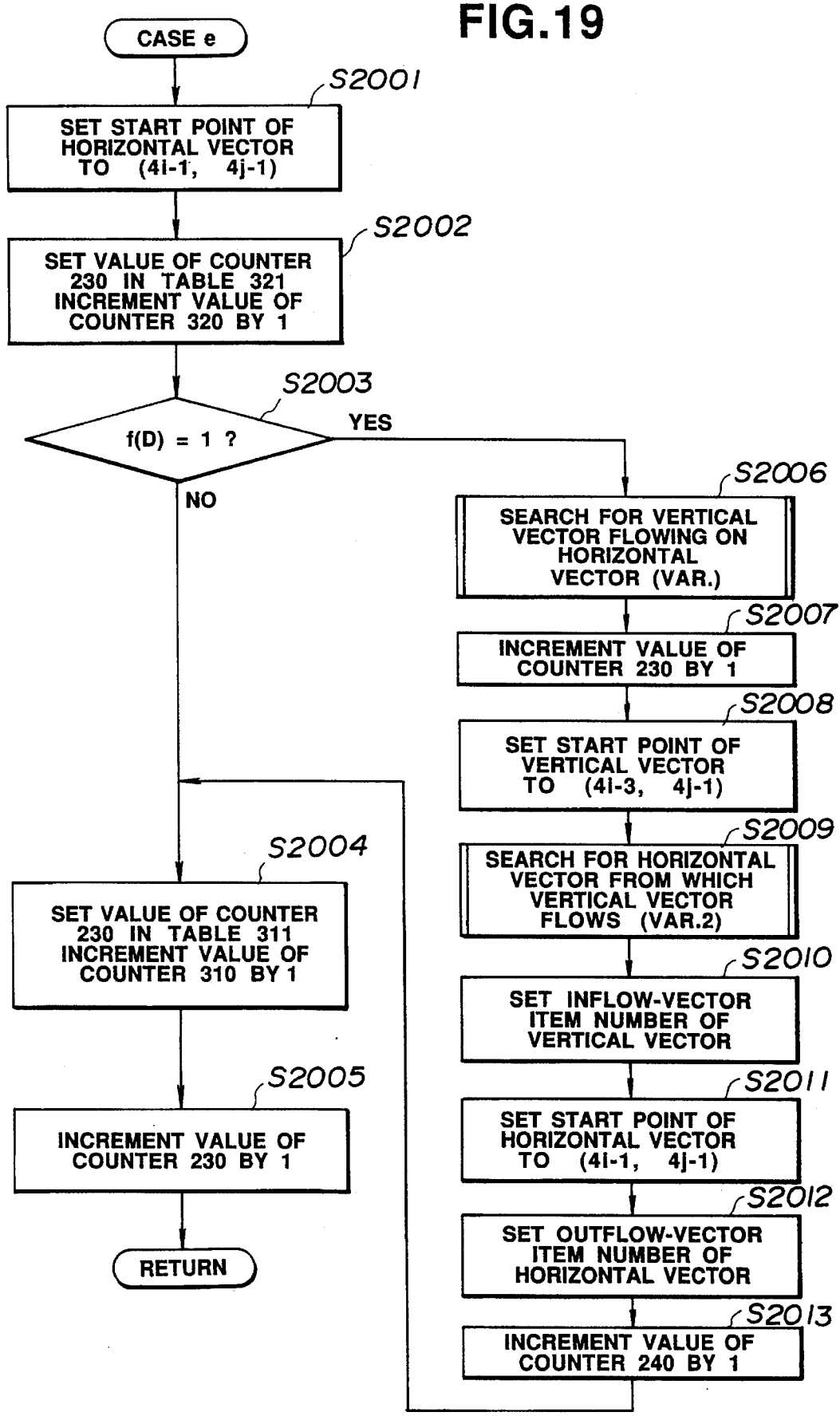
FIG. 19 is a flowchart illustrating the procedure of the process for case e in the first embodiment.

First, a description will be provided of the process for case e (corresponding to a pixel immediately before the target pixel in the main-scanning direction on the immediately preceding raster) in step S0001 with reference to the flowchart of FIG. 19.

In step S2001, point ($4i-1$, $4j-1$) is registered in the registration table for horizontal vectors shown in FIG. 65 as the start point of a horizontal vector. In step S2002, the horizontal vector is registered in table 321 shown in FIG. 71 as a vector having an undetermined vector to which the horizontal vector flows, and the value of counter 320 is updated. In step S2003, it is determined whether (f(D)=1) or not (f(D)=0) the position of pixel D indicates a black pixel. If the result of the determination is affirmative, i.e., f(D)=1, the process proceeds to step S2006. If the result of the determination is negative, i.e., f(D)=0, the process proceeds to step S2004. In step S2004, the horizontal vector is registered in table 311 shown in FIG. 70 as a vector having an undetermined vector which flows in the horizontal vector, and the value of counter 310 is updated. In step S2005, the value of horizontal-vector counter 230 shown in FIG. 65 is incremented by one. In step S2006, a vertical vector which flows in the horizontal vector defined in step S2001 is searched for. The search is performed according to the procedure of the flowchart of FIG. 74.

After the completion of the process in step S2006, the process proceeds to step S2007. In step S2007, the value of horizontal-vector counter 230 shown in FIG. 65 is incremented by one, and the process proceeds to step S2008. In step S2008, point ($4i-3$, $4j-1$) is registered in the registration table for vertical vectors shown in FIG. 66 as the start point of a vertical vector. In step S2009, a horizontal vector from which the vertical vector defined in step S2008 flows is searched for. The search is performed according to the procedure of the flowchart shown in FIG. 75.

In step S2010, a horizontal vector to be defined in the following step S2011 is made to be the horizontal vector flowing in the vertical vector defined in step S2008, and the value of horizontal-vector counter 230 shown in FIG. 65 at that time is set in inflow-vector item number column 243 of the registration table for vertical vectors shown in FIG. 66. In step S2011, point ($4i-1$, $4j-1$) is registered in the registration table for horizontal vectors shown in FIG. 65 as the start point of a horizontal vector. In step S2012, the vertical vector defined in the above-described step S2008 is made to be the vertical vector to which the horizontal vector defined in step S2011 flows, and the value of vertical-vector counter 240 at that time is set in outflow-vector item number column 234 of the registration table for horizontal vectors shown in FIG. 65. In step S2013, the value of vertical-vector counter 240 shown in FIG. 66 is incremented by one, and the process proceeds to step S2004.

Figure 18:
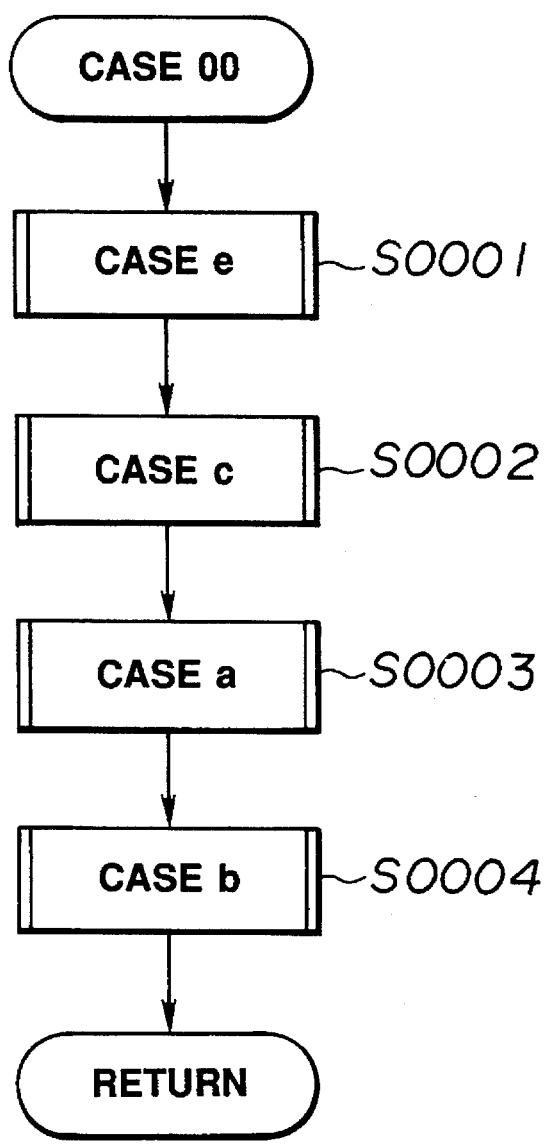
FIG. 18 is a flowchart illustrating the procedure of the process for case 00 in the first embodiment.
Figure 20:
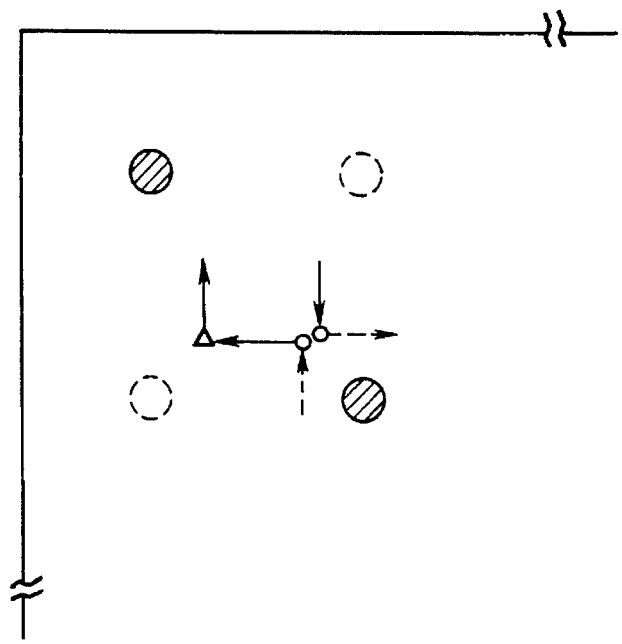
FIGS. 20 and 21 are diagrams illustrating the outline of the process for case e in the first embodiment.
Figure 21:
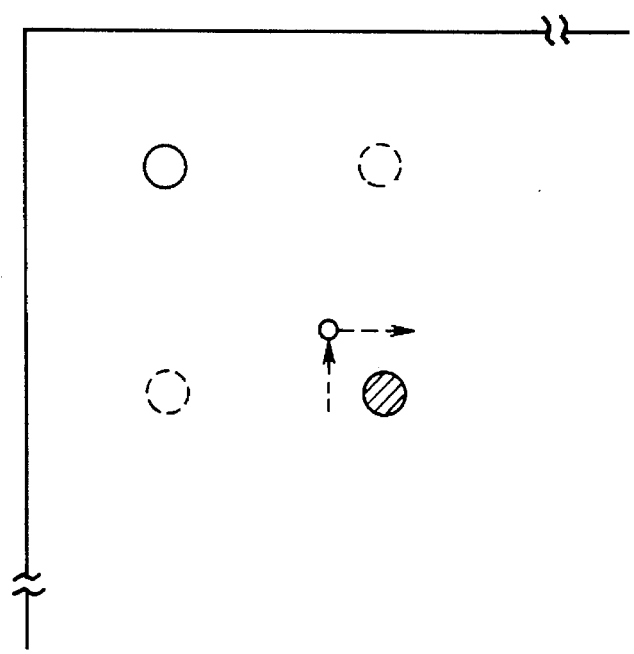

Thus, the process for case e in step S0001 shown in FIG. 18 is terminated. In this process, as shown in FIGS. 20 and 21, a contour vector present between the target pixel and pixel position D (see FIG. 1) is extracted.

Figure 74:
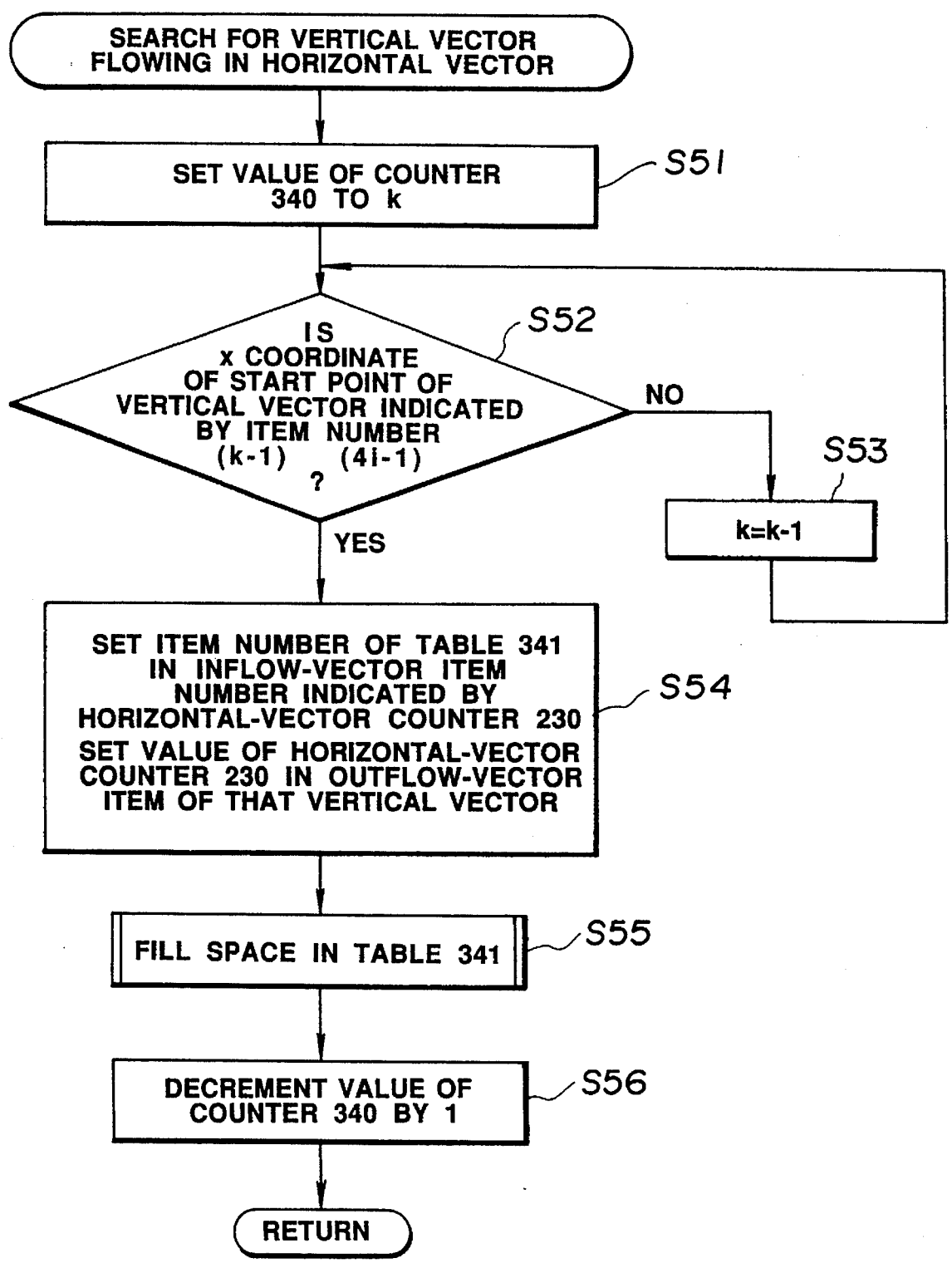
FIG. 74 is a flowchart illustrating an example of the procedure of the process of searching for a vertical vector flowing in a horizontal vector in the first embodiment.

A description will now be provided of the process of searching for a vertical vector flowing in a horizontal vector with reference to the flowchart of FIG. 74.

In step S51, the value of counter 340 for vertical vectors having an undetermined number of outflow vectors which holds the number of vertical vectors having undetermined vectors to which the vertical vectors flow registered in table 341 is set to variable k. In step S52, it is determined whether or not the column of the x coordinate of the start point of the vertical vector indicated by item number (k–1) registered in table 341 for item numbers of vertical vectors having undetermined outflow vectors has value (4$i$–1). If the result of the determination is negative, the value of variable k is reduced by one, and the process in step S52 is executed again. If the result of the determination in step S52 is affirmative, the process proceeds to step S54.

In step S54, the number of the vertical vector having item number (k–1) in table 341 is set in the item number column for inflow vectors to horizontal vectors indicated by horizontal-vector counter 230 shown in FIG. 65, and the value of horizontal-vector counter 230 is stored in the item number column for outflow vectors to vertical vectors shown in FIG. 66 is stored.

In step S55, the vector for which the vector to flow has been determined in steps S53 and S54 is erased from table 341 for vectors having undetermined outflow vectors, and the space in the table is filled. Next, in step S56, the value of counter 340 for vertical vectors having undetermined outflow vectors is reduced by one, and updating such that the number of vertical vectors having undetermined outflow vectors registered in table 341 for item numbers of vertical vectors having undetermined outflow vectors is reduced by one is performed, and the process returns to the original routine.

Figure 75:
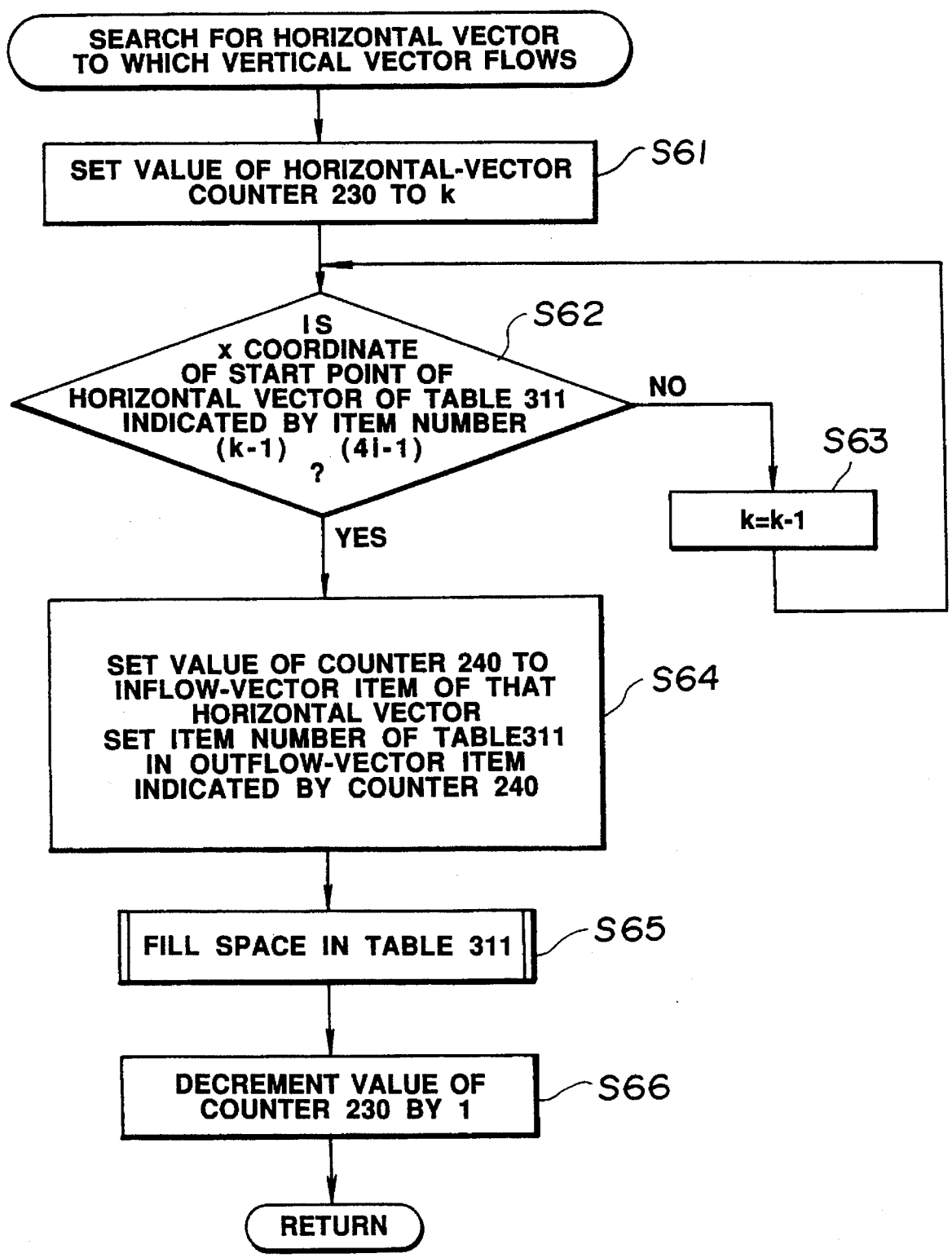
FIG. 75 is a flowchart illustrating an example of the procedure of the process of searching for a horizontal vector to which a vertical vector flows in the first embodiment.

The process to search for the outflow horizontal vector shown in FIG. 75 is substantially the same as the above-described process of FIG. 74. Hence, a description thereof will be omitted.

Referring again to FIG. 18, after the completion of the process of step S0001, the process proceeds to step S0002, in which the process for the neighborhood of position C shown in FIG. 1 (the process for case c) is performed. The contents of the process will be described in accordance with the flowchart of FIG. 22.

First, in step S2101, point (4$i$–1, 4$j$+1) is registered in the registration table for vertical vectors shown in FIG. 66 as the start point of a vertical vector. In step S2102, the horizontal vector to which the vertical vector defined in step S2101 flows is searched for. This search is performed in the same manner as in the above-described process of FIG. 75. After the completion of the process of step S2102, the process proceeds to step S2103.

In step S2103, it is determined whether (f(C)=1) or not (f(C)=0) the position of pixel C indicates a black pixel. If the result of the determination is affirmative, i.e., f(C)=1, the process proceeds to step S2104. If the result of the determination in step S2103 is negative, i.e., f(C)=0, the process proceeds to step S2112.

In step S2104, a horizontal vector to be defined in the following step S2105 is made to be the horizontal vector from which the above-described vertical vector flows, and the value of horizontal-vector counter 230 shown in FIG. 65 at that time is set in inflow-vector item number column 243 of the registration table for vertical vectors shown in FIG. 66. In step S2105, point (4$i$–3, 4$j$+1) is registered in the registration table for horizontal vectors shown in FIG. 65 as the start point of a horizontal vector. In step S2106, the vertical vector defined in the above-described step S2101 is made to be the vertical vector to which the horizontal vector defined in step S2105 flows, and the value of counter 240 for vertical vectors shown in FIG. 66 at that time is set in outflow-vector item number column 234 of the registration table for horizontal vectors shown in FIG. In step S2107, the value of vertical-vector counter 240 shown in FIG. 66 is incremented by one, and the process proceeds to step S2108. In step S2108, the vector flowing in the above-described horizontal vector is registered as to be undetermined in table 311 shown in FIG. 70, and the value of counter 310 is updated. In step S2109, the value of horizonal-vector counter 230 shown in FIG. 65 is incremented by one, and the process proceeds to step S2110. In step S2110, point (4$i$–1, 4$j$+1) is registered in the registration table for vertical vectors shown in FIG. 66 as the start point of a vertical vector. In step S2111, the horizontal vector to which the vertical vector defined in step S2110 flows is registered as to be undetermined in table 341 shown in FIG. 73, and the value of counter 340 is updated.

Figure 72:
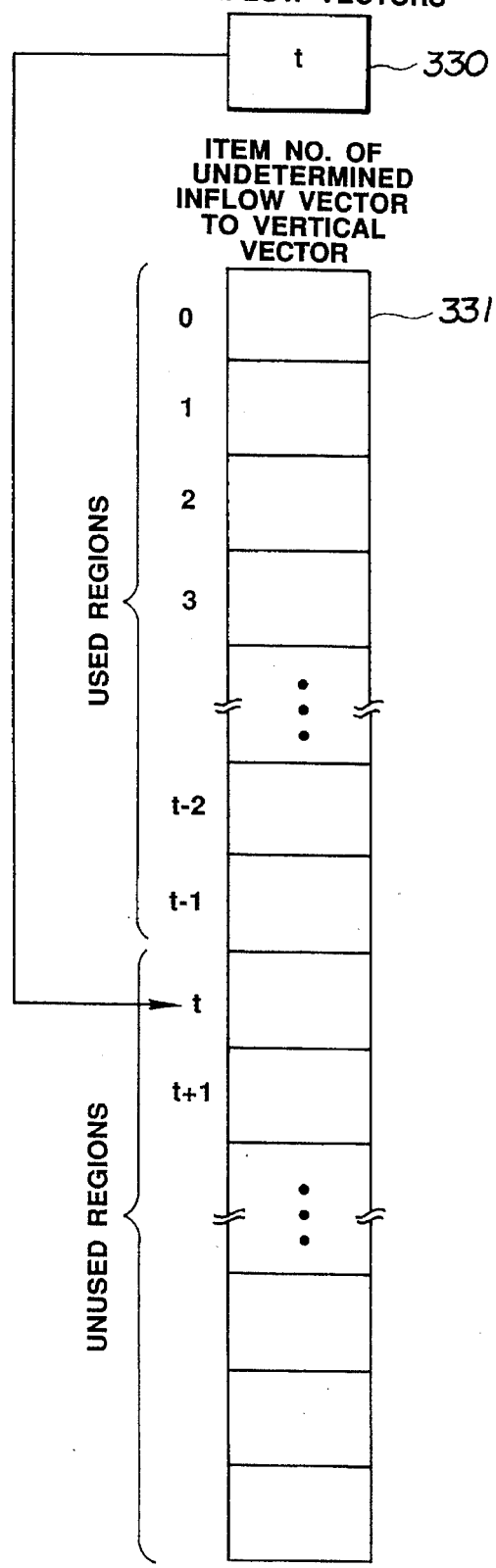
FIG. 72 is a diagram illustrating a registration table for vertical vectors having undetermined inflow vectors in the first embodiment.

In step S2112, the horizontal vector flowing in the vertical vector defined in the preceding step is registered as to be undetermined in table 331 shown in FIG. 72, and the value of counter 330 is updated. In step S2113, the value of vertical-vector counter 240 shown in FIG. 66 is incremented by one, and the process returns to the original process.

Figure 23:
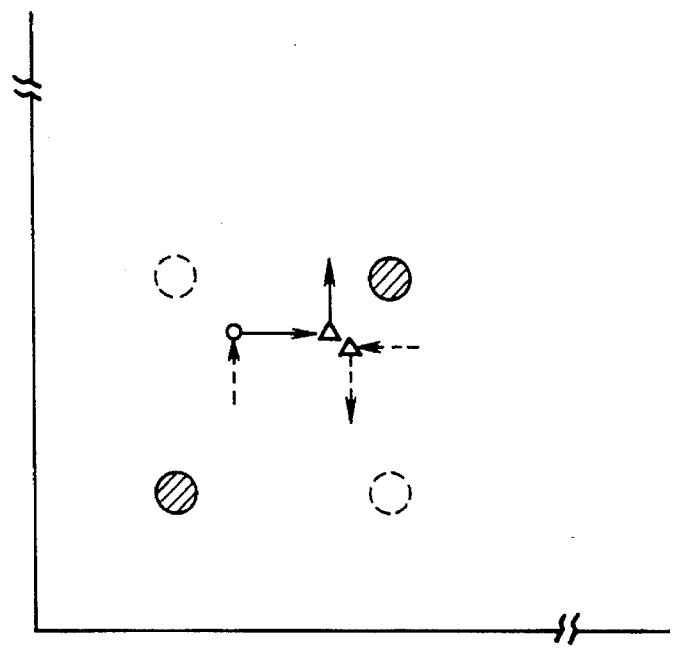
FIGS. 23 and 24 are diagrams illustrating the outline of the process for case c in the first embodiment.
Figure 24:
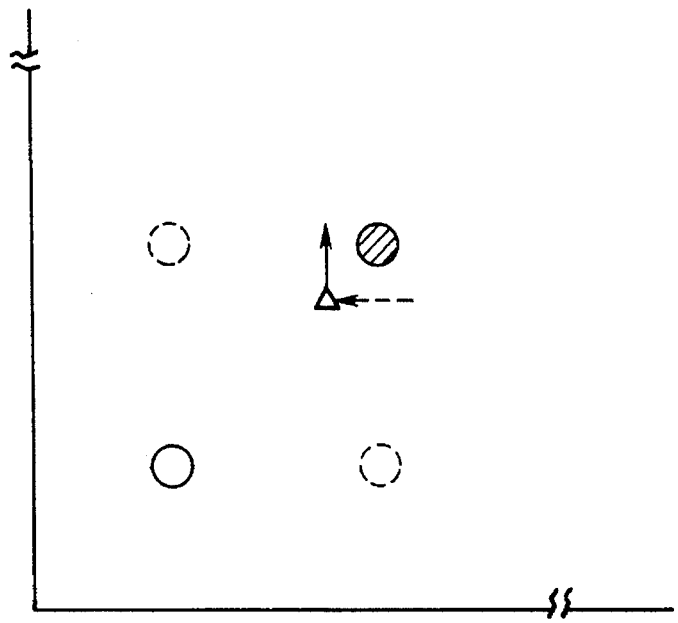

Thus, the process for case c in step S0002 shown in FIG. 18 is terminated. In this process, as shown in FIGS. 23 and 24, a contour vector present between the target pixel and pixel position C is extracted.

Next, a description will be provided of step S0003 shown in FIG. 18. In this step, the process for the neighborhood of the pixel at position A shown in FIG. 1 is performed. The contents of the process will be described with reference to the flowchart of FIG. 25.

First, in step S2201, point (4$i$+1, 4$j$–1) is registered in the registration table for vertical vectors shown in FIG. 66 as the start point of a vertical vector. In step S2202, the horizontal vector flowing in the vertical vector defined in step S2201 is searched for. The search is performed in accordance with the procedure shown in FIG. 76. In step S2203, it is determined whether (f(A)=1) or not (f(A)=0) the position of the above-described pixel A indicates a black pixel. If the result of the determination is affirmative, i.e., f(A)=1, the process proceeds to step S2206. If the result of the determination in step S2203 is negative, i.e., f(A)=0, the process proceeds to step S2204.

Figure 73:
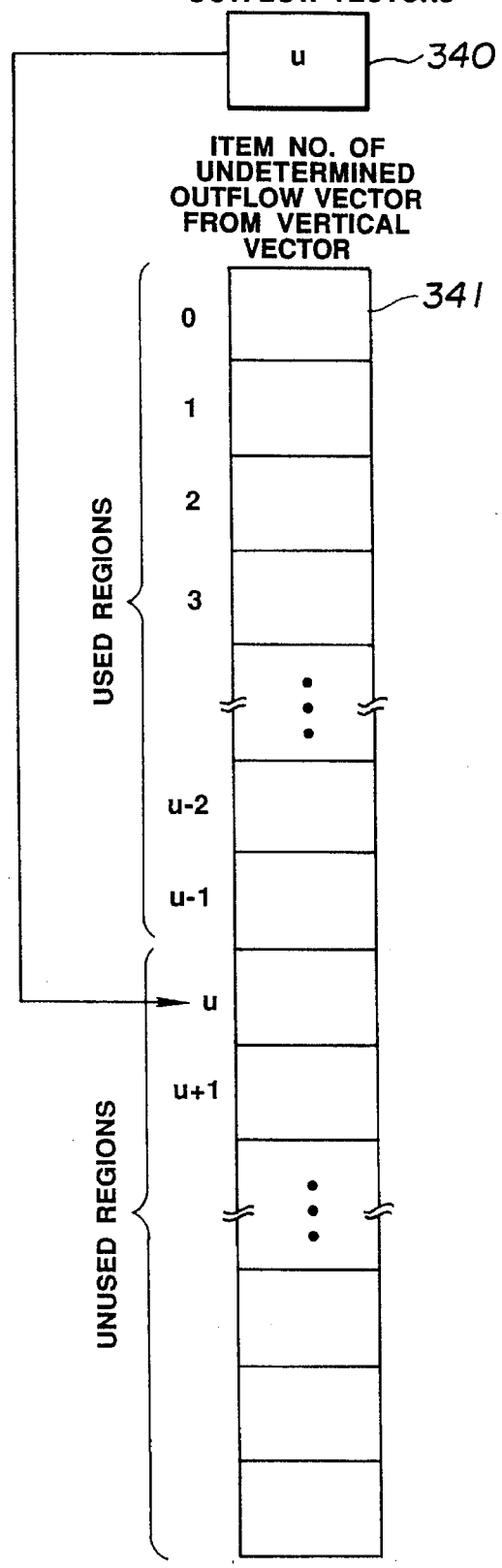
FIG. 73 is a diagram illustrating a registration table for vertical vectors having undetermined outflow vectors in the first embodiment.

In step S2204, the vector to which the above-described vertical vector flows is registered as to be undetermined in table 341 shown in FIG. 73, and the value of counter 340 is updated. In step S2205, the value of vertical-vector counter 240 shown in FIG. 66 is incremented by one, and the process returns to the original process.

In step S2206, the horizontal vector to which the vertical vector defined in step S2201 flows is searched for. This search is performed in the same manner as the flowchart of FIG. 75, except using ". . . (4$i$+1)?" instead of ". . . (4$i$–1)? in step S62 shown in FIG. 75.

After the completion of the process of step S2206, the process proceeds to step S2207. In step S2207, the value of vertical-vector counter 240 shown in FIG. 66 is incremented by one, and the process proceeds to step S2208. In step S2208, point (4$i$+3, 4$j$–1) is registered in the registration table for horizontal vectors shown in FIG. 65 as the start point of a horizontal vector. In step S2209, the vertical vector flowing in the horizontal vector defined in step S2208 is searched for. The search is performed in accordance with the procedure shown in the flowchart of FIG. 74, except using ". . . (4$i$+3)?" instead of ". . . (4$i$–1)?" in step S52 of FIG. 74. In step S2210, a vertical vector to be defined in the following step S2211 is made to be the vertical vector to which the horizontal vector defined in step S2208 flows, and the value of vertical-vector counter at that time is set in outflow-vector item number column 234 of the registration table for horizontal vectors shown in FIG. 65. In step S2211, point (4$i$+1, 4$j$–1) is registered in the registration table for vertical vectors shown in FIG. 66 as the start point of a vertical vector. In step S2212, the horizontal vector defined in the preceding step S2208 is made to be the horizontal vector flowing in the vertical vector defined in step S2211, and the value of horizontal-vector counter 230 shown in FIG. 65 at that time is set in inflow-vector item number column 243 of the registration table for vertical vectors shown in FIG. 66. In step S2213, the value of horizontal-vector counter 230 shown in FIG. 65 is incremented by one, and the process proceeds to step S2204.

Figure 26:
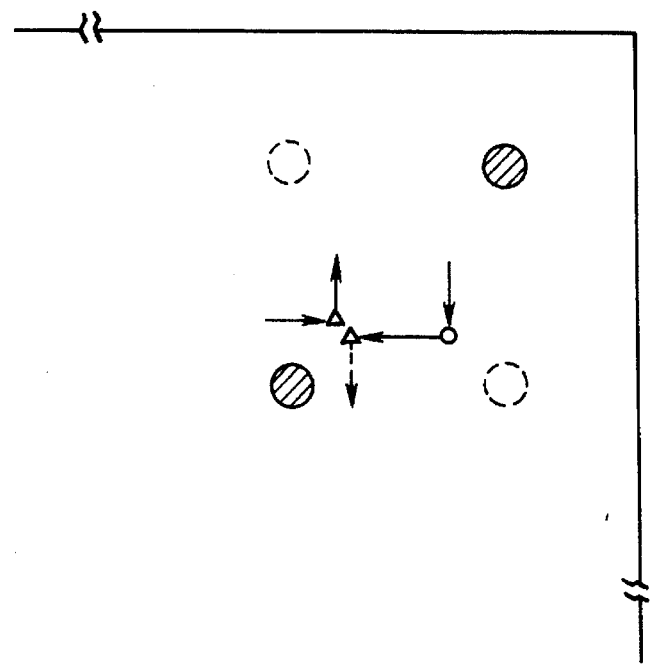
FIGS. 26 and 27 are diagrams illustrating the outline of the process for case "a" in the first embodiment.
Figure 27:
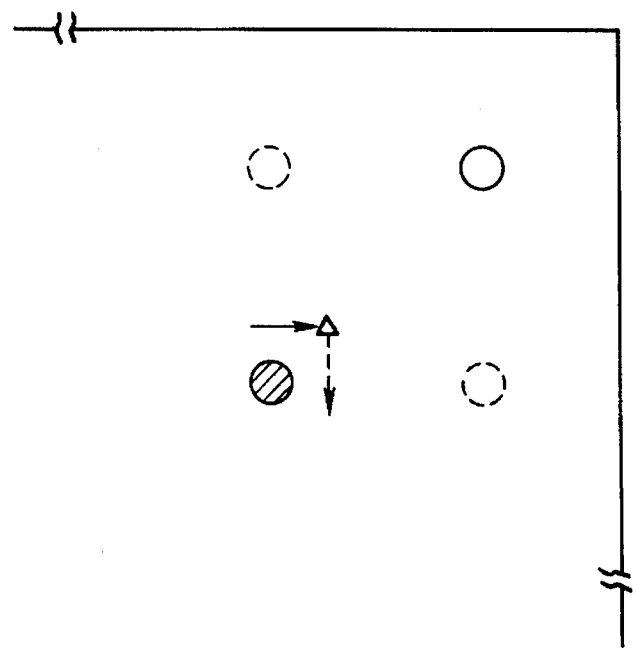

Thus, the process for case "a" in step S0003 shown in FIG. 18 is terminated. In this process, as shown in FIGS. 26 and 27, a contour vector present between the target pixel and pixel position A is extracted.

Figure 28:
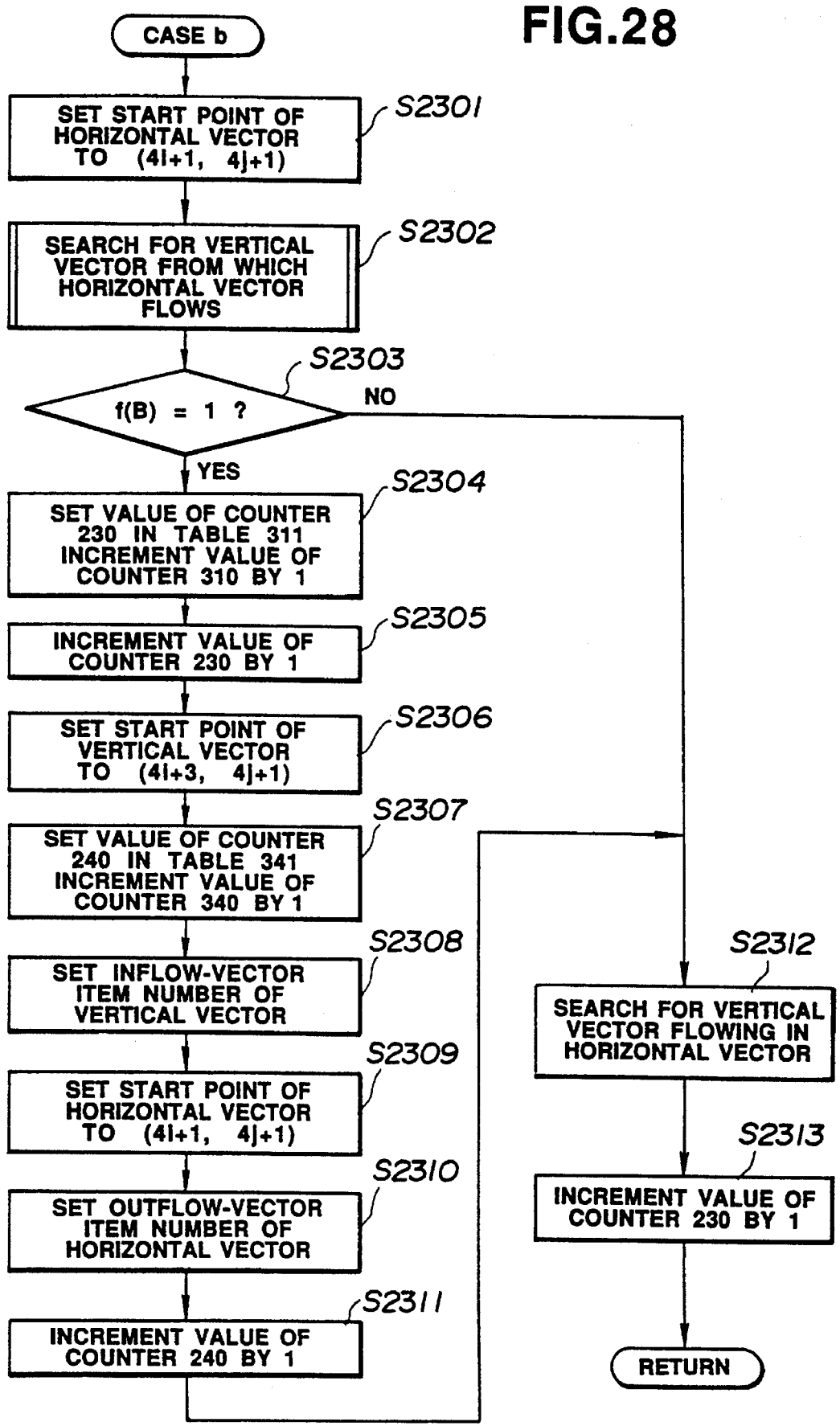
FIG. 28 is a flowchart illustrating the procedure of the process for case b in the first embodiment.

Next, a description will be provided of the process of step S0004. This is the process for the neighborhood of the pixel at position B shown in FIG. 1. FIG. 28 illustrates the contents of the process.

Figure 77:
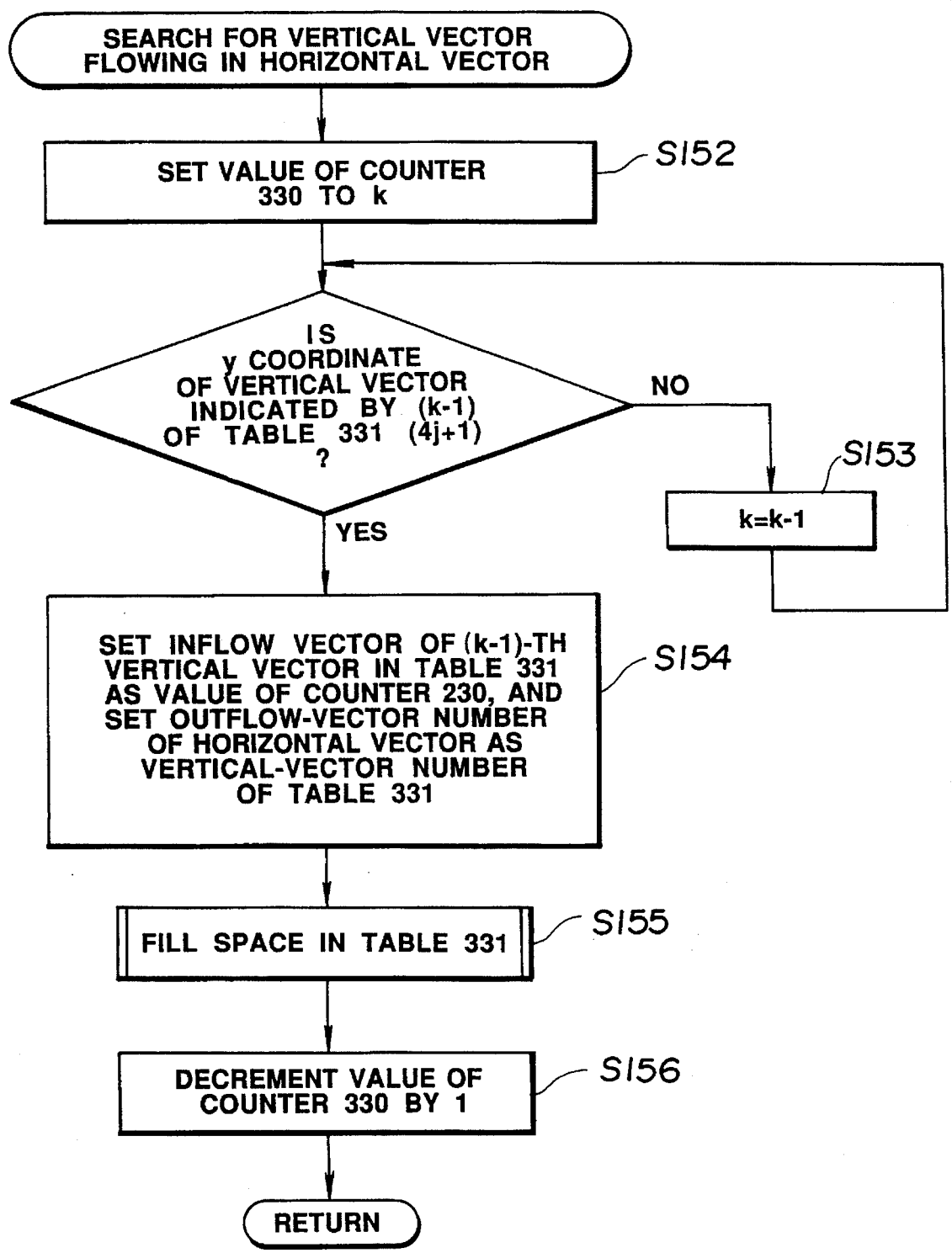
FIG. 77 is a flowchart illustrating an example of the procedure of the process of searching for a vertical vector which flows to a horizontal vector in the first embodiment.

In step S2301, point $(4i+1, 4j+1)$ is registered in the registration table for horizontal vectors shown in FIG. 65 as the start point of a horizontal vector. In step S2302, the vertical vector from which the horizontal vector defined in step S2301 flows is searched for. The search is performed in accordance with the flowchart of FIG. 77. After the completion of the process of step S2302, the process proceeds to step S2303, in which it is determined whether (f(B)=1) or not (f(B)=0) the position of the above-described pixel B indicates a black pixel. If the result of the determination is affirmative, the process proceeds to step S2304. If the result of the determination in step S2303 is negative, the process proceeds to step S2312.

Figure 70:
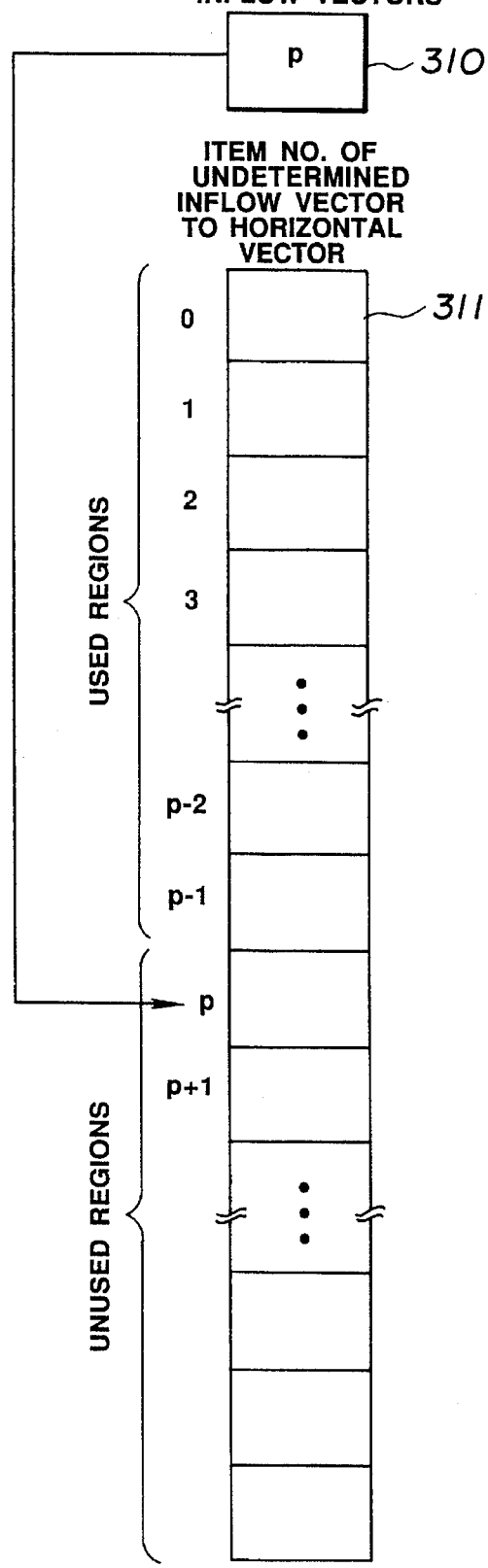
FIG. 70 is a diagram illustrating a registration table for horizontal vectors having undetermined inflow vectors in the first embodiment.

In step S2304, the vertical vector flowing in the above-described horizontal vector is registered as to be undetermined in table 311 shown in FIG. 70, and the value of counter 310 is updated. In step S2305, the value of horizontal-vector counter 230 shown in FIG. 65 is incremented by one, and the process proceeds to step S2306. In step S2306, point $(4i+3, 4j+1)$ is registered in the registration table for vertical vectors shown in FIG. 66 as the start point of a vertical vector. In step S2307, the horizontal vector to which the above-described vertical vector flows is registered as to be undetermined in table 341 shown in FIG. 73, and the value of counter 340 is updated. In step S2308, a horizontal vector to be defined in the following step S2309 is made to be the horizontal vector flowing in the vertical vector, and the value of horizontal-vector counter 230 shown in FIG. 65 at that time is set in inflow-vector item number column 243 of the registration table for vertical vectors shown in FIG. 66. In step S2309, point $(4i+1, 4j+1)$ is registered in the registration table for horizontal vectors shown in FIG. 65 as the start point of a horizontal vector. In step S2310, the vertical vector defined in the preceding step S2306 is made to be the vertical vector to which the horizontal vector defined in step S2309 flows, and the value of vertical-vector counter 240 shown in FIG. 66 at that time is set in outflow-vector item number column 234 of the registration table for horizontal vectors shown in FIG. 65. In step S2311, the value of vertical-vector counter 240 shown in FIG. 66 is incremented by one, and the process proceeds to step S2312. In step S2312, the vertical vector flowing in the horizontal vector defined in the preceding step is searched for. The search is performed in accordance with the above-described procedure shown in FIG. 74, except using ". . . $(4i+1)$?" instead of ". . . $(4i-1)$?" in step S52 shown in FIG. 74. In step S2313, the value of horizontal vector 230 shown in FIG. 65 is incremented by one, and the process returns to the original process.

Figure 29:
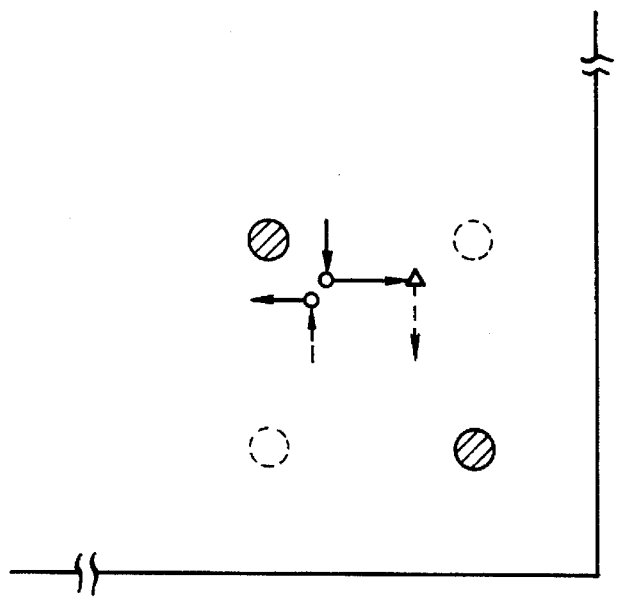
FIGS. 29 and 30 are diagrams illustrating the outline of the process for case b in the first embodiment.
Figure 30:
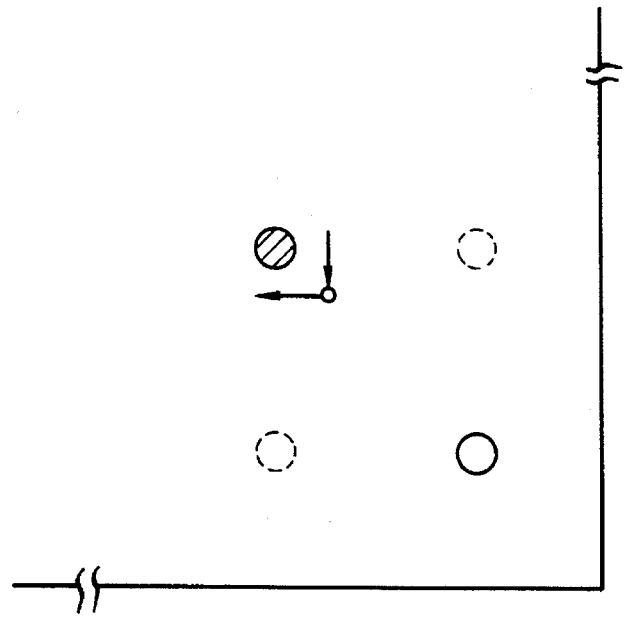

Thus, the process for case b in step S0004 shown in FIG. 18 is terminated. In this process, as shown in FIGS. 29 and 30, a contour vector present between the target pixel and pixel position B is extracted.

The process for the case (case 00) in which the target pixel and the eight pixels surrounding it are in the state shown in FIG. 2 has now been described.

Explanation of the Process for Case 01

FIG. 3 illustrates the state in which the target pixel and the eight pixels surrounding it corresponds to case 01.

As described above, case 01 is the case in which pixel "0" shown in FIG. 1 is a black pixel, and pixels represented by reference numerals 1 through 3 are white pixels. As shown in FIG. 3, four patterns can be provided in this case.

Figure 31:
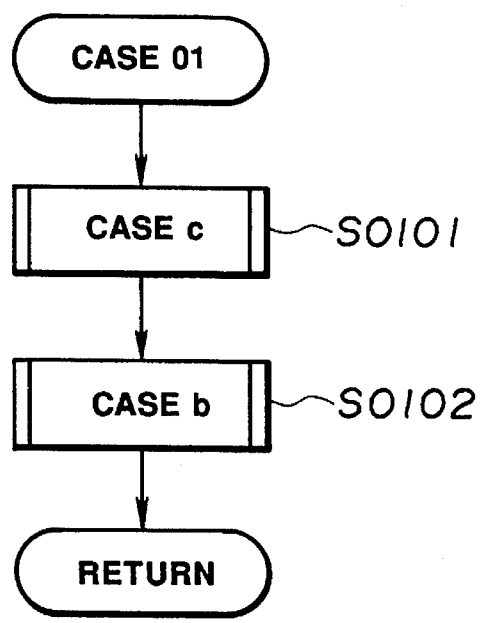
FIG. 31 is a flowchart illustrating the procedure of the process for case 01 in the first embodiment.

FIG. 31 illustrates the procedure of the process for case 01. As shown in FIG. 31, pixel positions c and b shown in FIG. 3 are processed.

Figure 22:
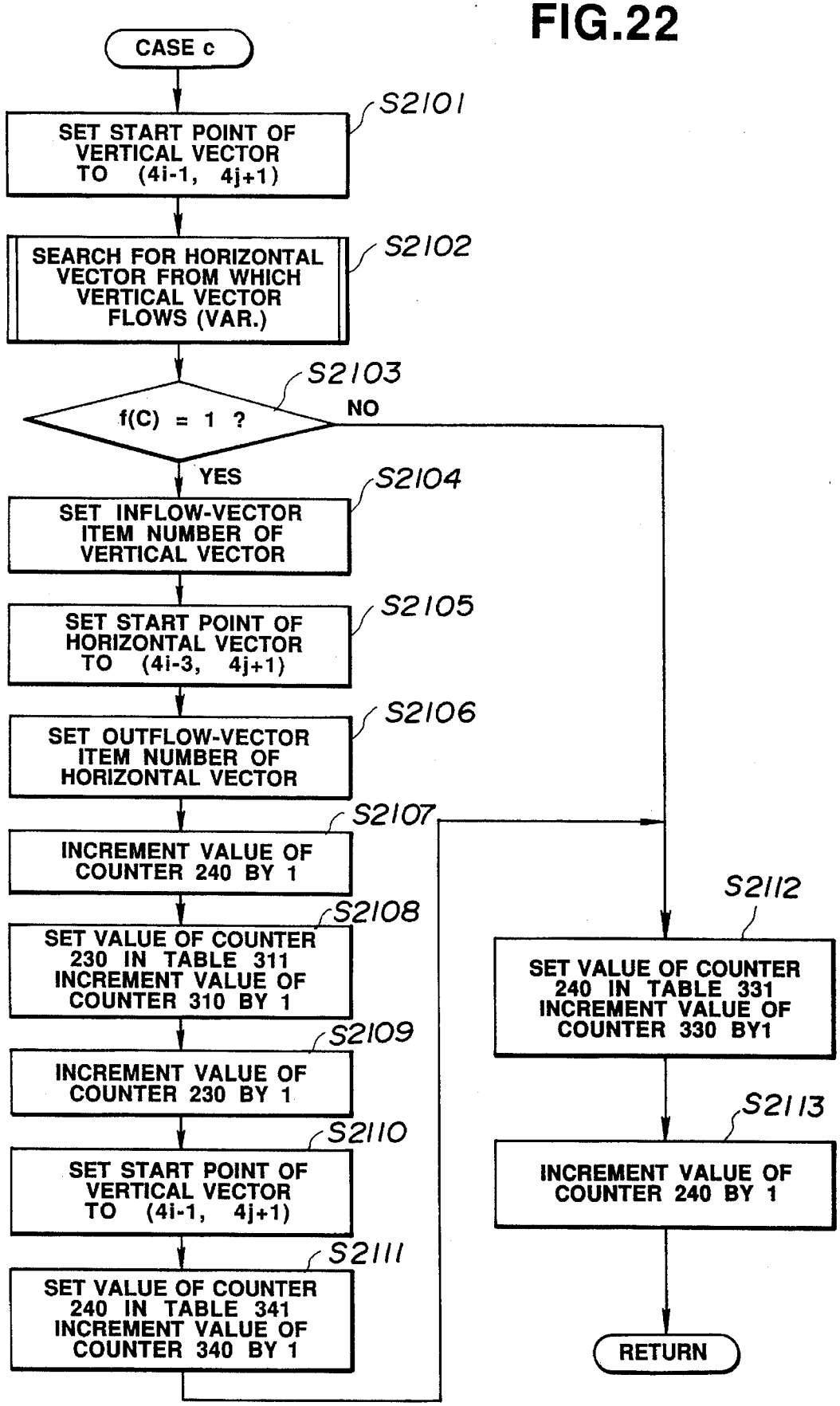
FIG. 22 is a flowchart illustrating the procedure of the process for case c in the first embodiment.

First, in step S0101, the above-described process of the flowchart of FIG. 22 is performed. Next, in step S0102, the above-described process of the flowchart of FIG. 28 is performed.

Thus, the process for case 01 is terminated.

Explanation of the Process for Case 02

Next, a description will be provided of the process for case 02. Case 02 is the case in which the pixel at pixel position "1" shown in FIG. 1 is a black pixel, and the pixels at other pixels positions 0, 2 and 3 are white pixels.

Figure 32:
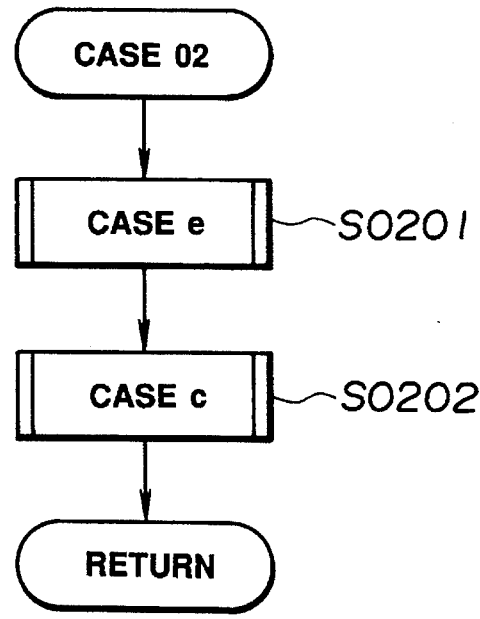
FIG. 32 is a flowchart illustrating the procedure of the process for case 02 in the first embodiment.

The process for case 02 is executed in accordance with the flowchart of FIG. 32.

That is, in step S0201, the process based on the above-described process for case e (the flowchart of FIG. 19) is performed. In step S0202, entirely the same process for case c described with reference to FIG. 22 is performed. Thus, the process for case 02 shown in FIG. 4 is terminated.

Explanation of the Process for Case 03

Figure 5:
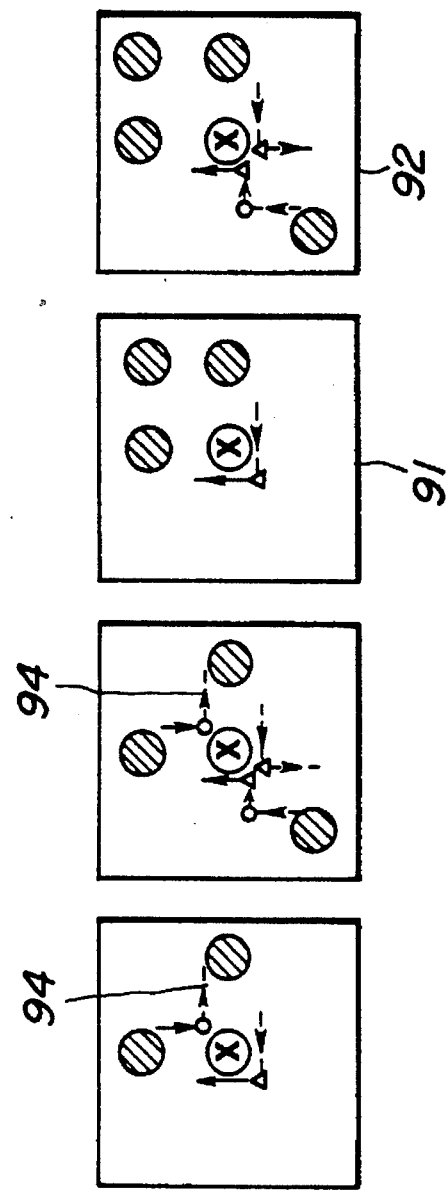
FIG. 5 is a diagram illustrating the state of case 03 when extracting contour vectors from a binary image in the first embodiment.

Case 03 is the case in which the pixels at the pixel positions 0 and 1 shown in FIG. 1 are black pixels, and the pixels at the pixel positions 2 and 3 are white pixels. FIG. 5 illustrates case 03.

Figure 33:
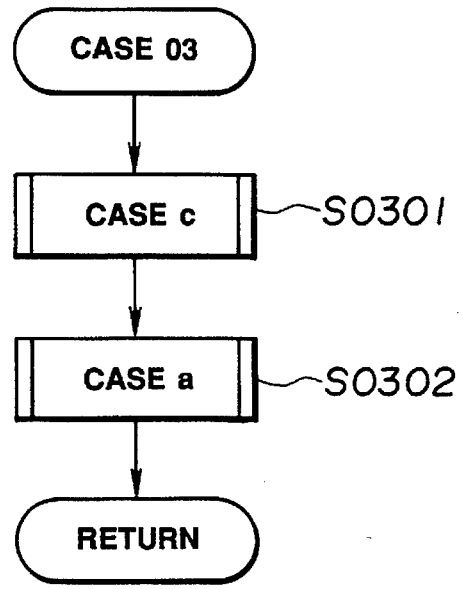
FIG. 33 is a flowchart illustrating the procedure of the process for case 03 in the first embodiment.

The process for case 03 is executed in accordance with the flowchart of FIG. 33.

Figure 78:
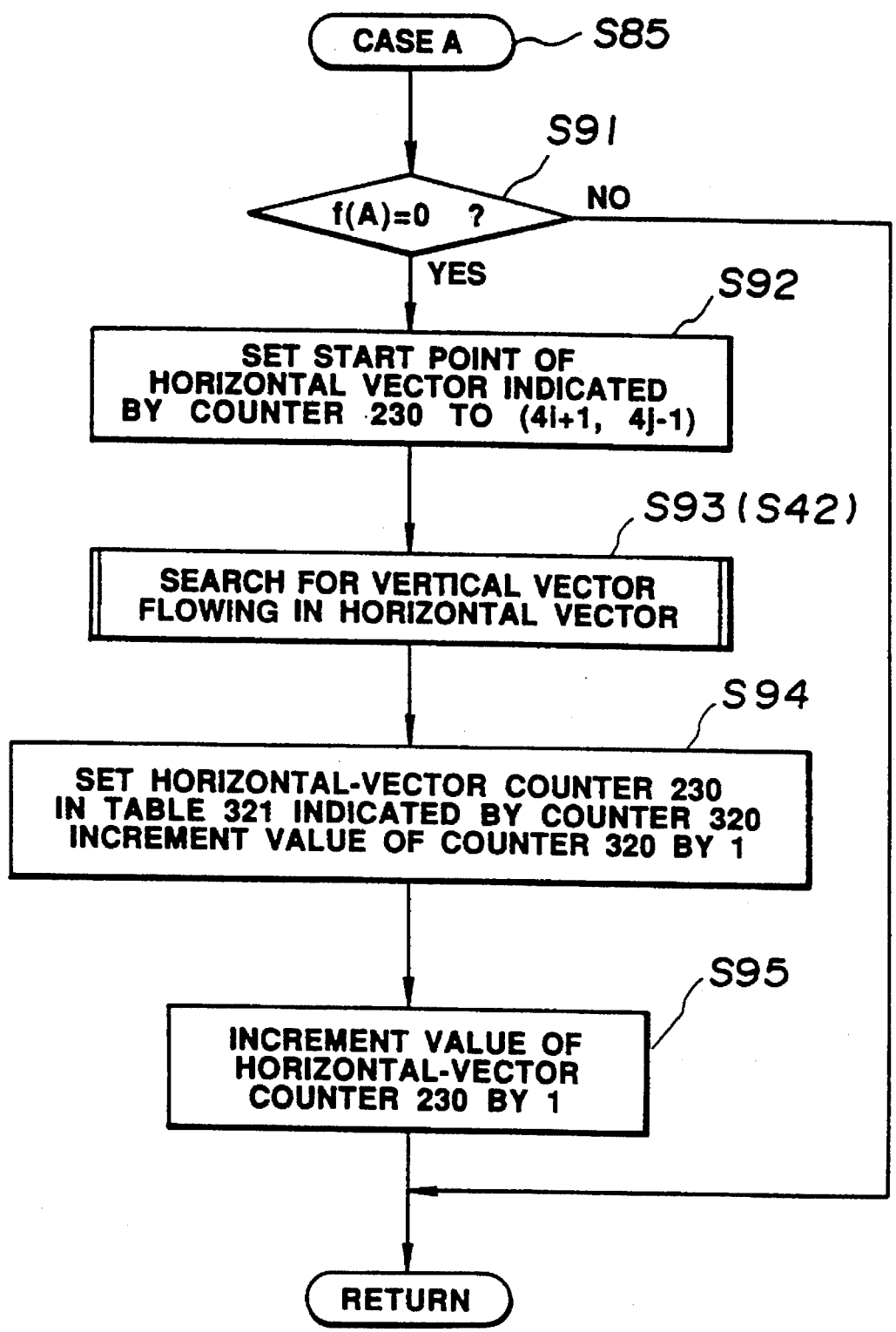
FIG. 78 is a flowchart illustrating the contents of the process for case A relating to vector extraction.

First, in step S0301, the process for the neighborhood of pixel position C shown in FIG. 1 is performed. That is, entirely the same process as the process for case c described with reference to FIG. 22 is performed. The process then proceeds to step S0302, in which the process for the neighborhood of pixel position A shown in FIG. 1 is performed. FIG. 78 illustrates the contents of the process.

Referring to the flowchart of FIG. 78, in step S91, it is checked whether or not the pixel position A shown in FIG. 1 indicates a white pixel "0". If the result of the check is negative, the process is terminated. This corresponds to cases indicated by reference numerals 91 and 92 in FIG. 5.

If the result of the check is affirmative in step S91, the process proceeds to step S92, in which point $(4i+1, 4j-1)$ is made to be the start point of horizontal vector 94 shown in FIG. 5. Next, in step S93, the vertical vector flowing in this horizontal vector is searched for. The process then proceeds to step S94, in which the number of this horizontal vector is set in table 321 as a horizontal vector having an undetermined outflow vector. In step S95, the value of horizontal-vector counter 230 is incremented by one, and the process is terminated.

Figure 34:
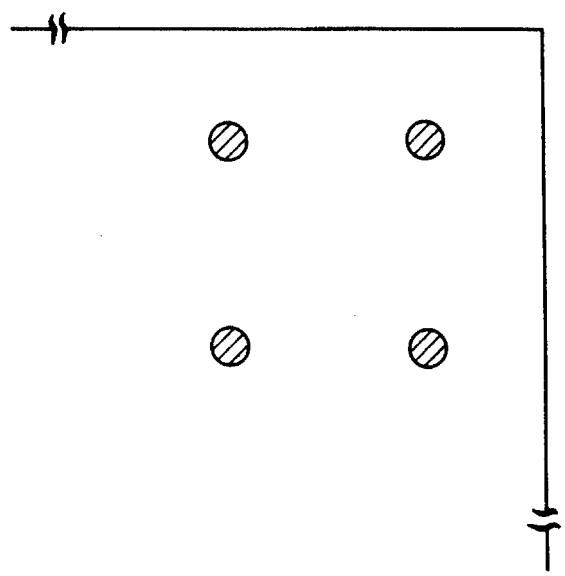
FIG. 34 is a diagram illustrating the outline of an improved process for case A in the first embodiment.
Figure 35:
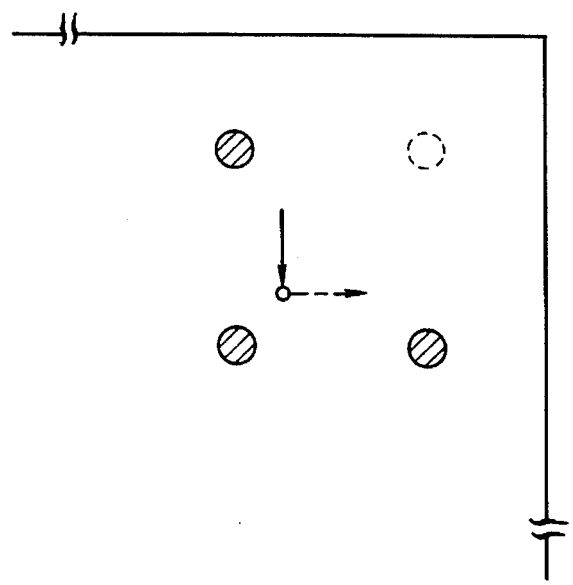
FIG. 35 is a diagram illustrating the contents of the improved process for case A in the first embodiment.

In this process, as shown in FIGS. 34 and 35, a contour vector present between the target pixel and pixel position A is extracted. Thus, the process for the case (case 03) shown at the left end portion of FIG. 5 (case 03) is terminated.

Explanation of the Process for Case 04

Figure 6:
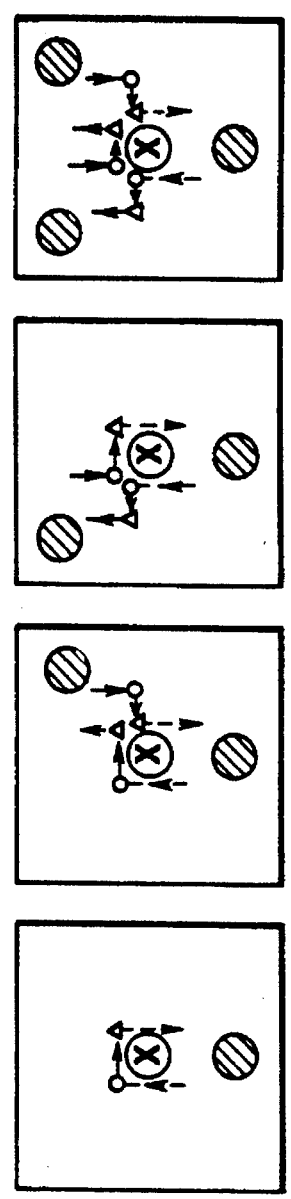
FIG. 6 is a diagram illustrating the state of case 04 when extracting contour vectors from a binary image in the first embodiment.
Figure 36:
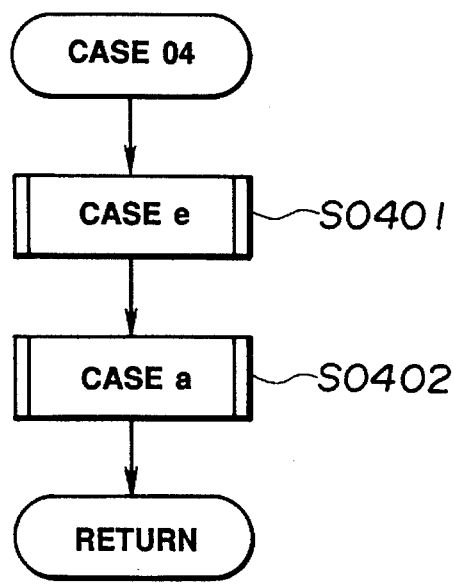
FIG. 36 is a flowchart illustrating the procedure of the process for case 04 in the first embodiment.

Case 04 is the case in which the pixel at pixel position "2" shown in FIG. 1 is a black pixel, and the pixels at pixel positions 0, 1 and 3 are white pixels. FIG. 6 illustrates case 04. The process for case 04 is performed in accordance with the flowchart of FIG. 36.

First, in step S0401, the process for the neighborhood of pixel position e shown in FIG. 6 is performed. The contents of the process are entirely the same as the contents of the above-described process for case e shown in FIG. 19. The process then proceeds to step S0402, in which the process for the neighborhood of pixel position "a" shown in FIG. 6 is performed. The contents of the process are entirely the same as the contents of the above-described process for case "a" shown in FIG. 25. Thus, the process for the case (case 04) shown at the left-end portion of FIG. 6 is terminated.

Explanation of the Process for Case 05

Case 05 is the case in which the pixels at pixel positions 0 and 2 shown in FIG. 1 are black pixels, and the pixels at the pixel positions 1 and 3 are white pixels. FIG. 7 illustrates case 05.

Figure 37:
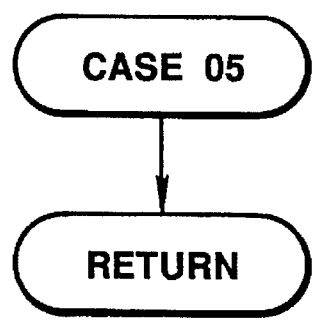
FIG. 37 is a flowchart illustrating the procedure of the process for case 05 in the first embodiment.

The process for this case is executed in accordance with the flowchart of FIG. 37. As shown in FIG. 37, the process returns with performing nothing. Thus, the process for the case (case 05) shown at the left-end portion of FIG. 7 is terminated.

Explanation of the Process for Case 06

Case 06 is the case in which the pixels at pixel positions 1 and 2 are black pixels, and the pixels at pixel positions 0 and 3 are white pixels. FIG. 8 illustrates case 06. The process for case 06 is executed in accordance with the flowchart of FIG. 38.

Figure 79:
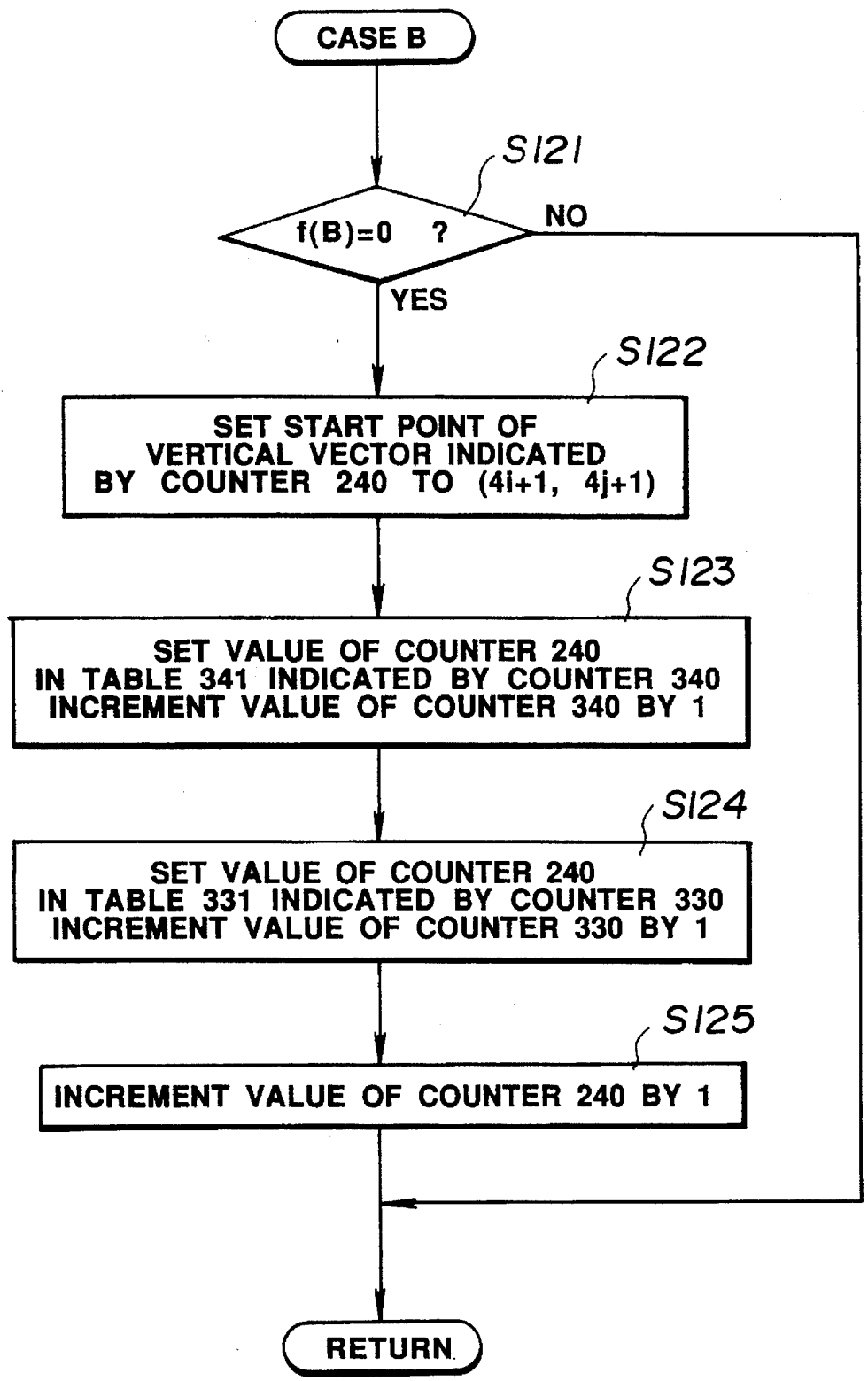
FIG. 79 is a flowchart illustrating the contents of the process for case B relating to vector extraction in the first embodiment.

First, in step S0601, the process for the neighborhood of pixel position e shown in FIG. 8 is performed. The contents of the process are entirely the same as the contents of the above-described process for case e shown in FIG. 19. The process then proceeds to step S0602, in which the process for pixel position B shown in FIG. 8 is performed. The process is executed in accordance with the flowchart of FIG. 79. This process will be hereafter described.

First, in step S121, it is determined whether pixel B is a white pixel or a black pixel. In the case of a black pixel, the process returns with doing nothing. In the case of a white pixel, the process proceeds to step S122. In step S122, point ($4i+1$, $4j+1$) is registered as the start point of a vertical vector. In step S123, this vertical vector is registered in table 341 shown in FIG. 73 as a vertical vector having an undetermined vector to which it flows. In step S124, the vertical vector is registered in table 331 shown in FIG. 72 as a vertical vector having an undetermined vector flowing to it. In step S125, the value of vertical-vector counter 240 is incremented by one, and the process returns to the original routine.

Figure 39:
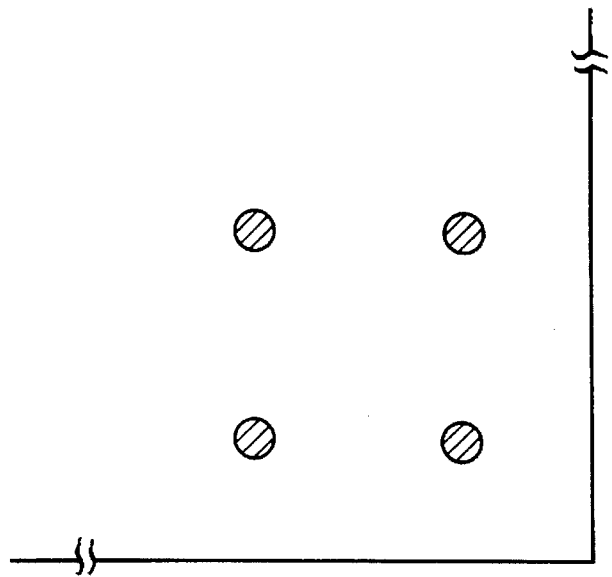
FIGS. 39 and 40 are diagrams illustrating the outline of the process for case B in the first embodiment.
Figure 40:
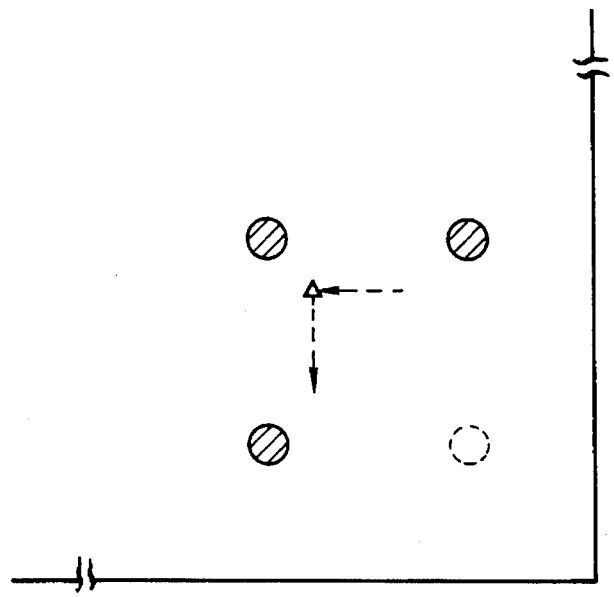

According to the above-described process, as shown in FIGS. 39 and 40, a contour vector present between the target vector and pixel position B is extracted. Thus, the process for the case (case 06) shown at the left-end portion of FIG. 8 is terminated.

Explanation of the Process for Case 07

Case 07 is the case in which the pixels at pixel positions 0, 1 and 2 are black pixels, and the pixel at pixel position 3 is a white pixel. FIG. 9 illustrates case 07.

Figure 41:
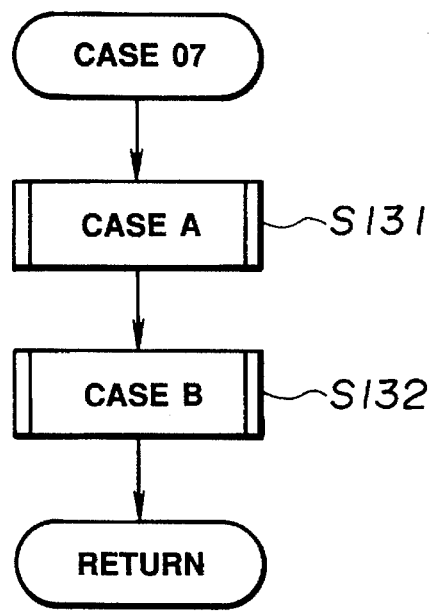
FIG. 41 is a flowchart illustrating the procedure of the process for case 07 in the first embodiment.

In this case, the process is executed in accordance with the flowchart of FIG. 41.

First, in step S131, the process for the neighborhood of pixel position A shown in FIG. 9 is performed. The contents of the process are the same as the contents of the above-described process for case "a" in step S0302 shown in FIG. 33. The process then proceeds to step S132, in which the process for the neighborhood of pixel position B shown in FIG. 9 is performed. The contents of the process are the same as the contents of the above-described process for case B in step S0602 shown in FIG. 38. Thus, the process for the case (case 07) shown at the left-end portion of FIG. 9 is terminated.

Explanation of the Process for Case 08

Figure 42:
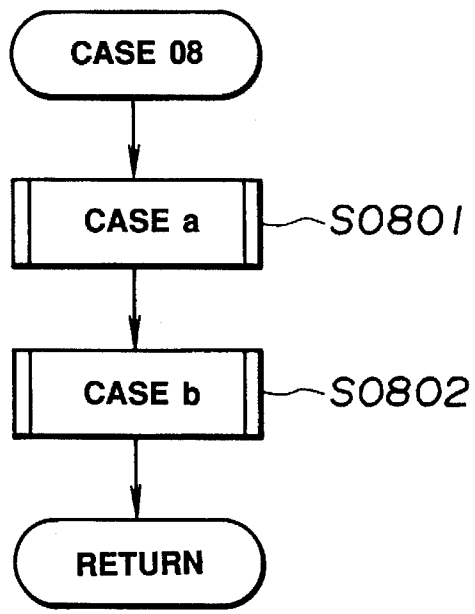
FIG. 42 is a flowchart illustrating the procedure of the process for case 08 in the first embodiment.

Case 08 is the case in which the pixel at pixel position 3 is a black pixel, and the pixels at pixel positions 0, 1 and 2 are white pixels. FIG. 10 illustrates case 08. In this case, the process is executed in accordance with the flowchart of FIG. 42.

First, in step S0801, the process for the neighborhood of pixel position "a" shown in FIG. 10 is performed. The contents of the process are entirely the same as the contents of the above-described process for case "a" shown in FIG. 25. The process then proceeds to step S0802, in which the process for the neighborhood of pixel position b shown in FIG. 10 is performed. The contents of the process are entirely the same as the contents of the above-described process for case a.

Thus, the process for the case (case 08) shown at the left-end portion of FIG. 10 is terminated.

Explanation of the Process for Case 09

Figure 43:
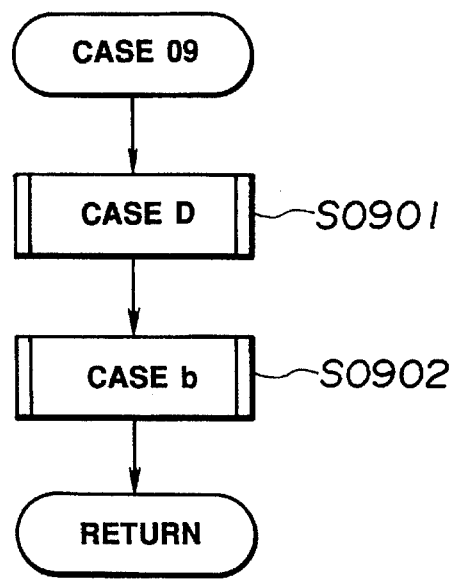
FIG. 43 is a flowchart illustrating the procedure of the process for case 09 in the first embodiment.

Case 09 is the case in which the pixels at pixel positions 0 and 3 shown in FIG. 1 are black pixels, and the pixels at pixel positions 1 and 2 are white pixels. FIG. 11 illustrates case 09. The process in this case is performed in accordance with the flowchart shown in FIG. 43.

Figure 80:
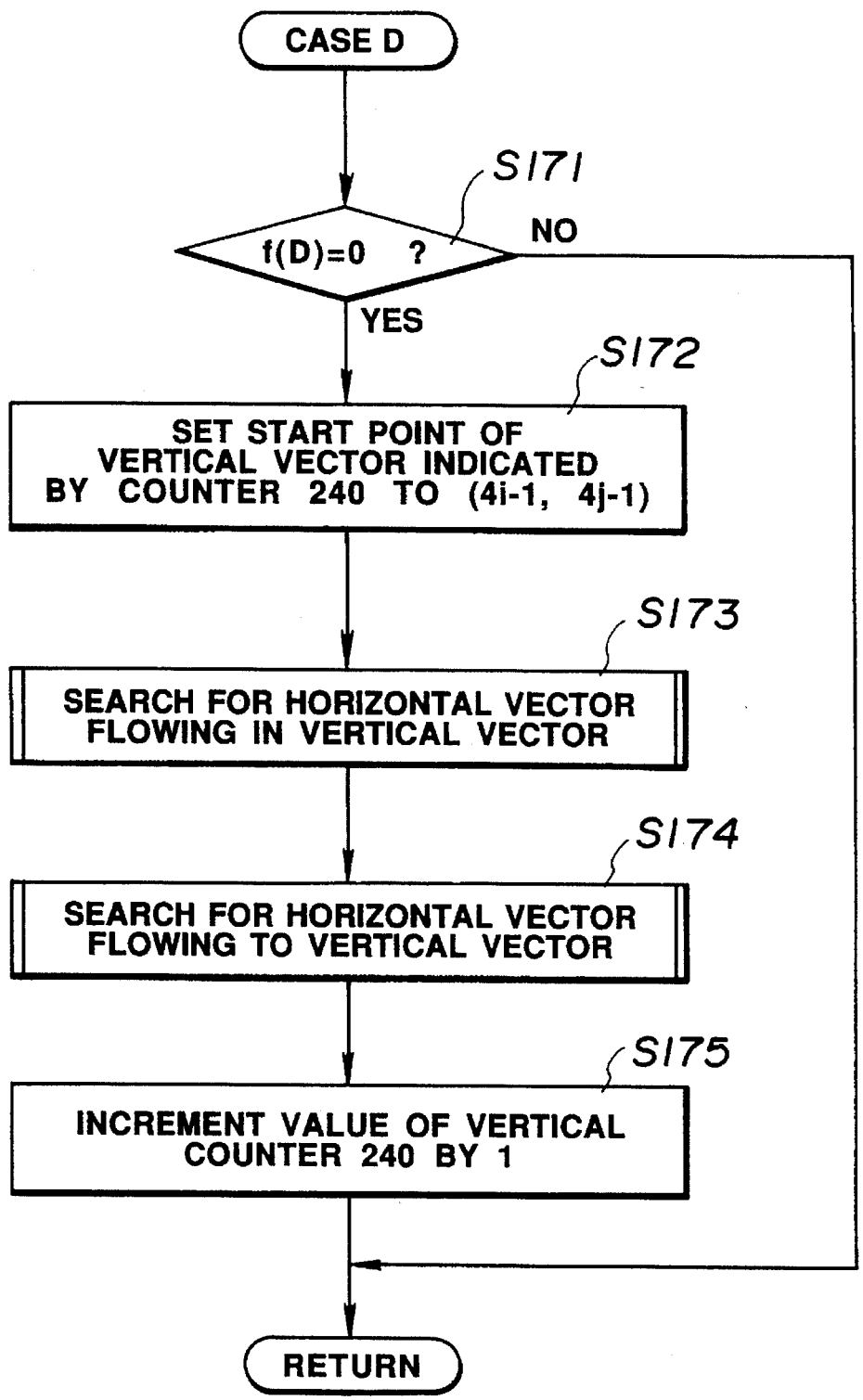
FIG. 80 is a flowchart illustrating the contents of the process for case D relating to vector extraction in the first embodiment.

First, in step S0901, the process for the neighborhood of pixel position D shown in FIG. 11 is performed. This process is performed in accordance with the flowchart of FIG. 80.

Figure 71:
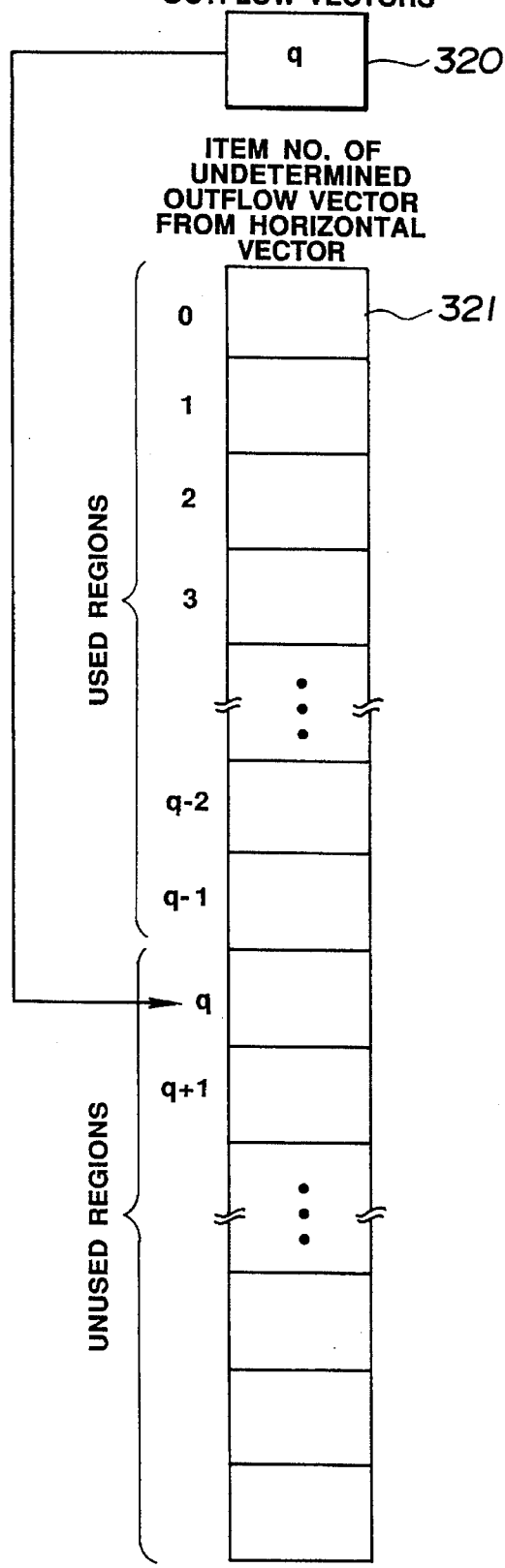
FIG. 71 is a diagram illustrating a registration table for horizontal vectors having undetermined outflow vectors in the first embodiment.
Figure 76:
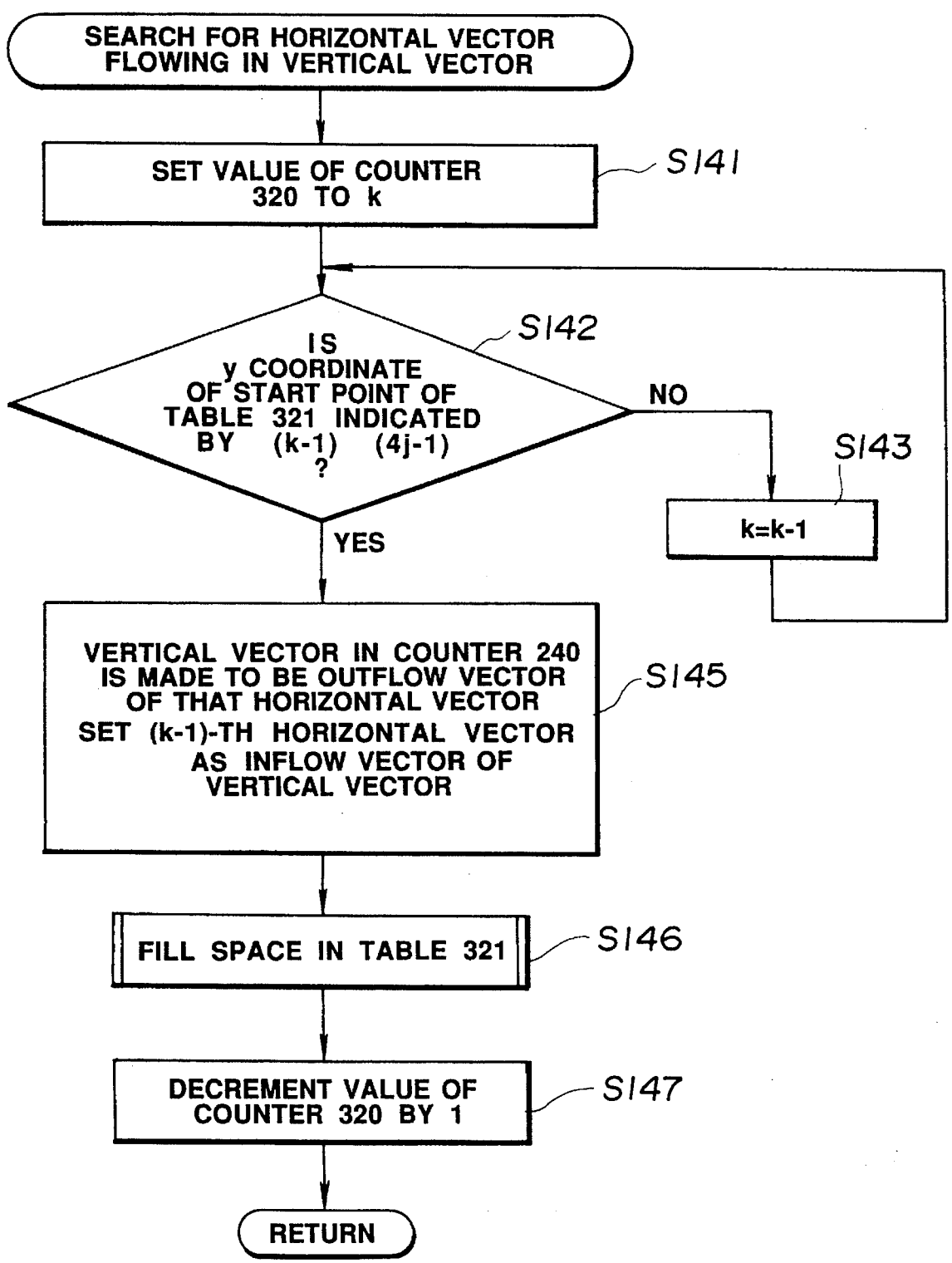
FIG. 76 is a flowchart illustrating an example of the procedure of the process of searching for a horizontal vector flowing in a vertical vector in the first embodiment.

First, in step S171, it is determined whether the pixel at pixel position D is a white pixel or a black pixel. In the case of a black pixel, the process returns with doing nothing. In the case of a white pixel, the process proceeds to step S172, in which point ($4i-1$, $4j-1$) is registered as the start point of vertical vector 154. The process then proceeds to step S173, in which the process shown in the flowchart of FIG. 76 is performed. That is, a horizontal vector flowing in vertical vector 154 registered in step S172 is registered, and the vertical vector 154 registered in step S172 is registered as the vertical vector to which this horizontal vector flows, and table 321 shown in FIG. 71 is updated.

Figure 44:
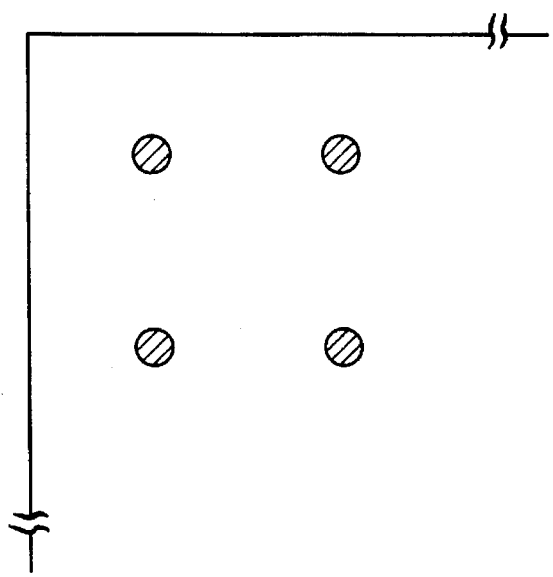
FIGS. 44 and 45 are diagrams illustrating the outline of the process for case D in the first embodiment.
Figure 45:
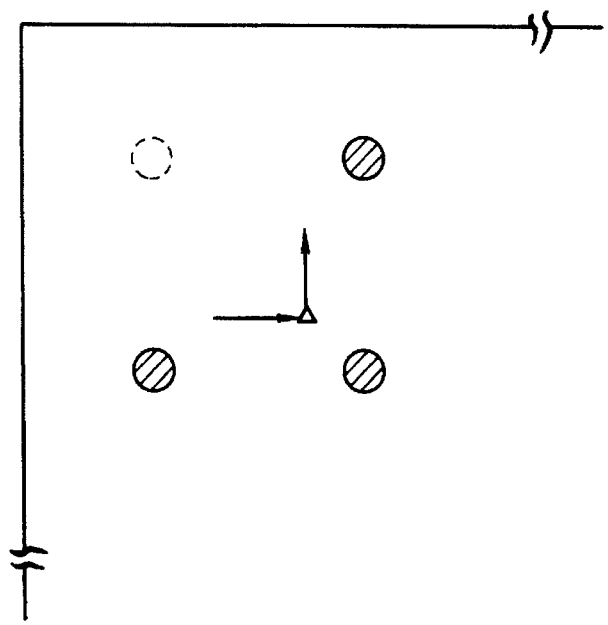

In step S174, the above-described process in accordance with the flowchart of FIG. 75 is performed. That is, a horizontal vector to which vertical vector 154 registered in step S172 flows is registered, and vertical vector 154 registered in step S172 is registered as the vector flowing in this horizontal vector, and table 311 shown in FIG. 70 is updated. In step S175, the value of vertical-vector counter 240 is incremented by one, and the process returns. That is, in this process, as shown in FIGS. 44 and 45, a contour vector present between the target pixel and pixel position D is extracted.

After the completion of the above-described step S0901, the process proceeds to step S0902, in which the process for the neighborhood of pixel position b shown in FIG. 11 is performed. The contents of the process are entirely the same as the contents of the above-described process for case b shown in FIG. 28.

Thus, the process for the case (case 09) shown at the left-end portion of FIG. 11 is terminated.

Explanation of the Process for Case 10

Figure 12:
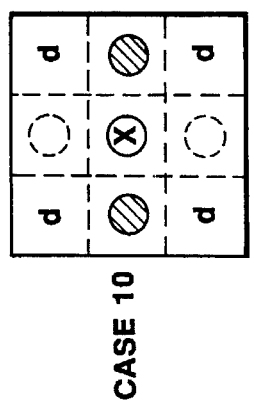
FIG. 12 is a diagram illustrating the state of case 10 when extracting contour vectors from a binary image in the first embodiment.
Figure 46:
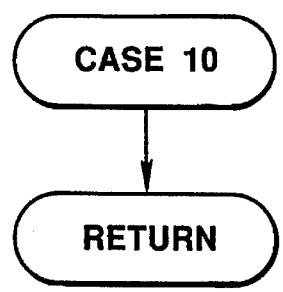
FIG. 46 is a flowchart illustrating the procedure of the process for case 10 in the first embodiment.

Case 10 is the case in which the pixels at pixel positions 1 and 3 shown in FIG. 1 are black pixels, and the pixels at pixel positions 0 and 2 are white pixels. FIG. 12 illustrates case 10. In this case, the process is performed in accordance with the flowchart of FIG. 46. As shown in FIG. 46, the process returns with doing nothing. Thus, the process for the case (case 10) shown at the left-end portion of FIG. 12 is terminated.

Explanation of the Process for Case 11

Figure 13:
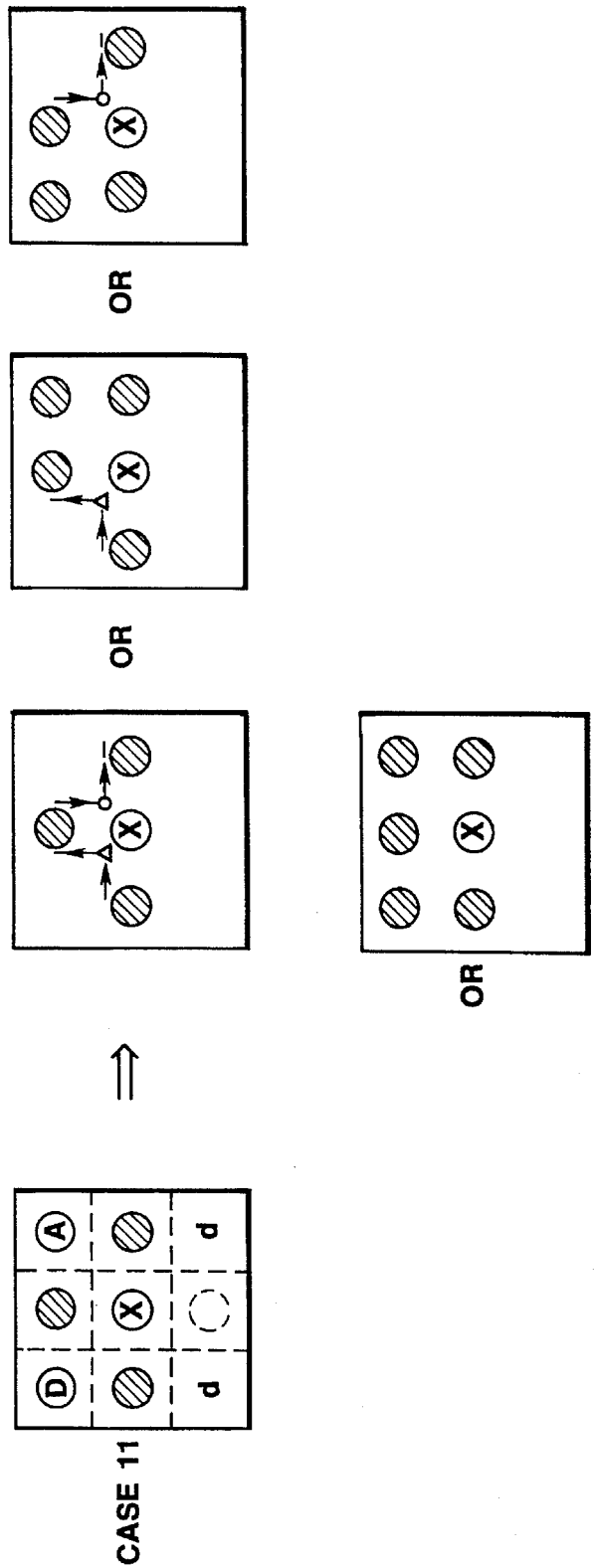
FIG. 13 is a diagram illustrating the state of case 11 when extracting contour vectors from a binary image in the first embodiment.
Figure 47:
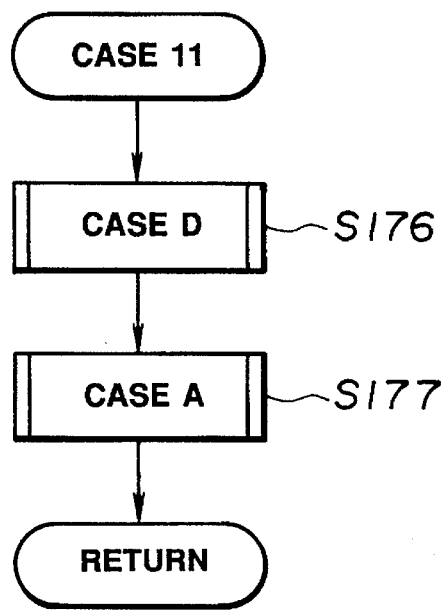
FIG. 47 is a flowchart illustrating the procedure of the process for case 11 in the first embodiment.

Case 11 is the case in which the pixels at pixel positions 0, 1 and 3 shown in FIG. 1 are black pixels, and the pixel at pixel position 2 is a white pixel. FIG. 13 illustrates case 11. In this case, the process is performed in accordance with the flowchart of FIG. 47.

First, in step S176, the process for the neighborhood of pixel position D shown in FIG. 13 is performed. The contents of the process are the same as the contents of the above-described process in step S0901 shown in FIG. 43. The process then proceeds to step S177, in which the process for the neighborhood of pixel position A shown in FIG. 13 is performed. The contents of the process are the same as the contents of the above-described process for case "a" in step S0302 shown in FIG. 33.

Thus, the process for the case (case 11) shown at the left-end portion of FIG. 13 is terminated.

Explanation of the Process for Case 12

Case 12 is the case in which the pixels at pixel positions 2 and 3 shown in FIG. 1 are black pixels, and the pixels at pixel positions 0 and 1 are white pixels. FIG. 14 illustrates case 12. In this case, the process is performed in accordance with the flowchart of FIG. 48.

Figure 81:
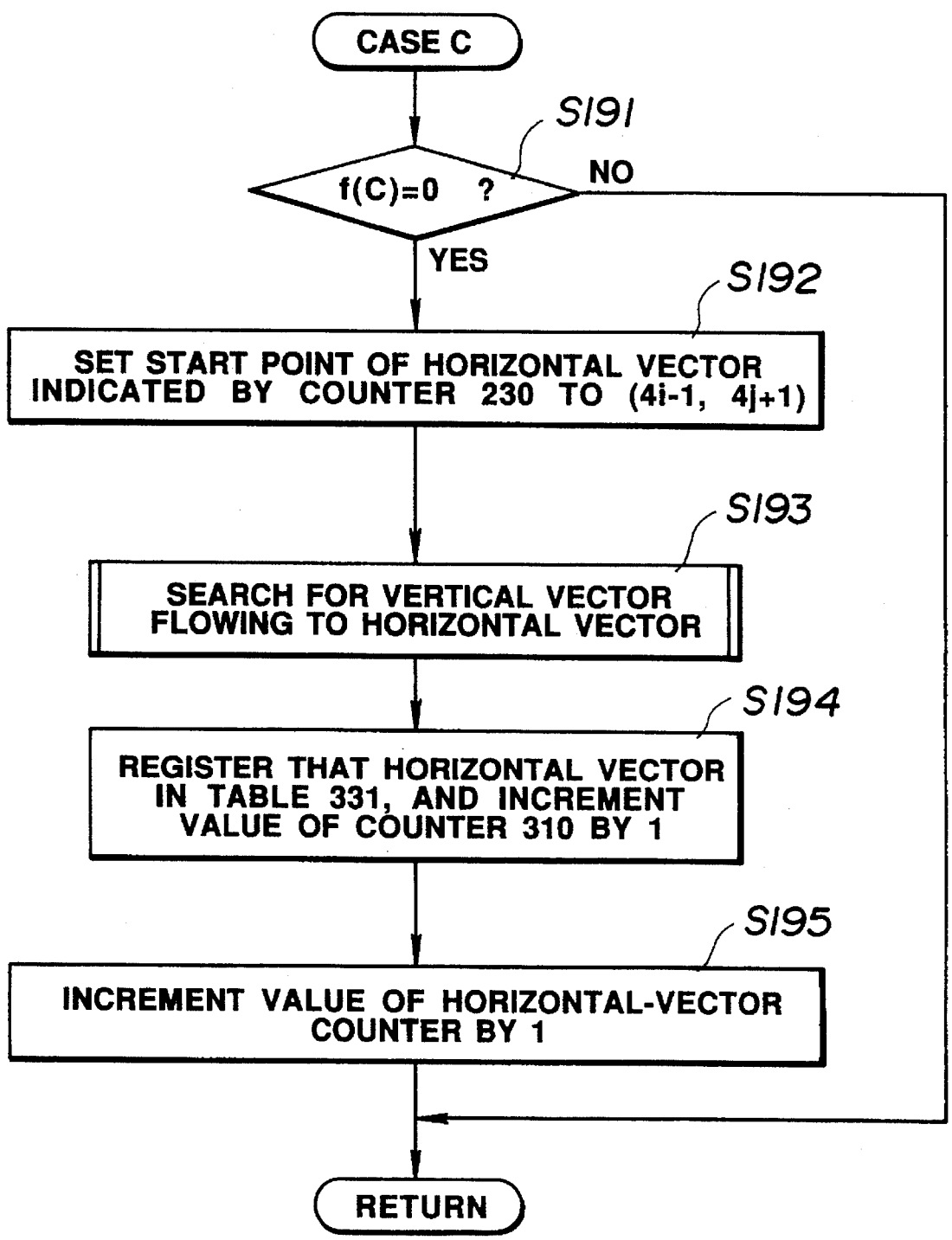
FIG. 81 is a flowchart illustrating the contents of the process for case C relating to vector extraction in the first embodiment.

First, in step S1201, the process for the neighborhood of pixel position C shown in FIG. 14 is performed. The contents of the process are performed in accordance with the flowchart of FIG. 81.

In step S191, it is determined whether the pixel at pixel position C is a white pixel or a black pixel. In the case of a black pixel, the process returns with doing nothing. In the case of a white pixel, the process proceeds to step S192, in which point (4$i$−1, 4$j$+1) is registered as the start point of a horizontal vector. In step S193, a vertical vector to which the horizontal vector registered in step S192 flows is registered. Horizontal vector 185 registered in step S192 is registered in the table of FIG. 66 as the vector flowing in this vertical vector, and table 331 shown in FIG. 72 is updated.

Figure 49:
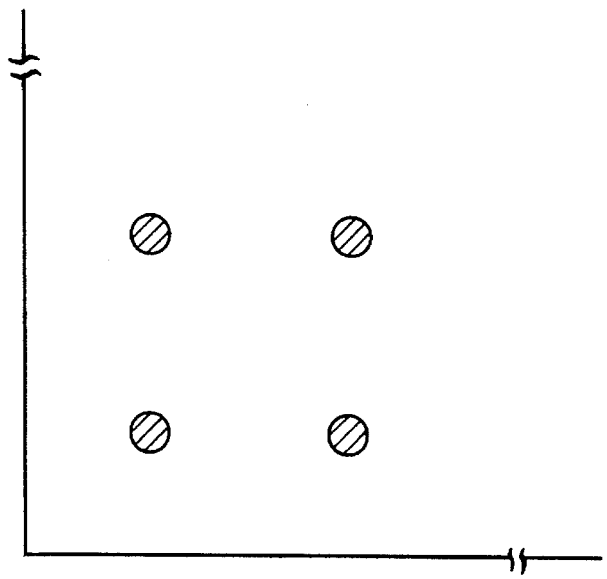
FIGS. 49 and 50 are diagrams illustrating the outline of the process for case C in the first embodiment.
Figure 50:
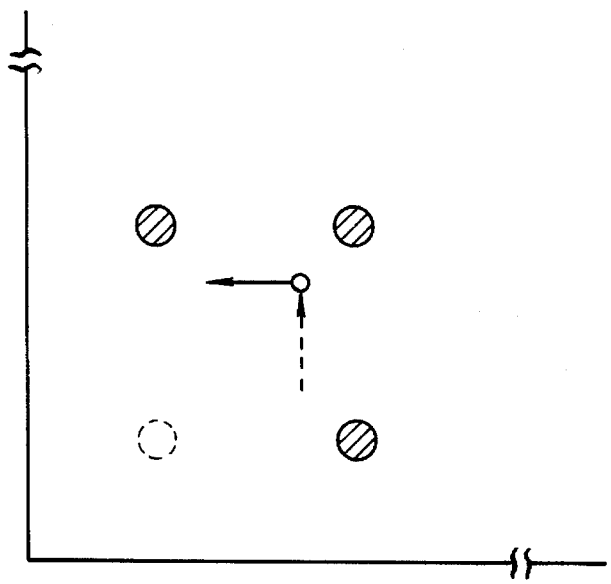

In step S194, the horizontal vector registered in step S192 is registered as a vector having an undetermined vertical vector flowing in it in table 311 for horizontal vectors having undetermined inflow vectors shown in FIG. 70, and the value of counter 310 is incremented by one. The process then proceeds to step S195, in which the value of horizontal-vector counter 230 is incremented by one, and the process returns to the original process. In this process, as shown in FIGS. 49 and 50, a contour vector present between the target pixel and pixel position C is extracted.

The process then proceeds to step S0202, in which the process for the neighborhood of pixel position "a" shown in FIG. 14 is performed. This process is entirely the same as the above-described process for case "a" shown in FIG. 25.

Thus, the process for the case (case 12) shown at the left-end portion of FIG. 14 is terminated.

Explanation of the Process for Case 13

Figure 51:
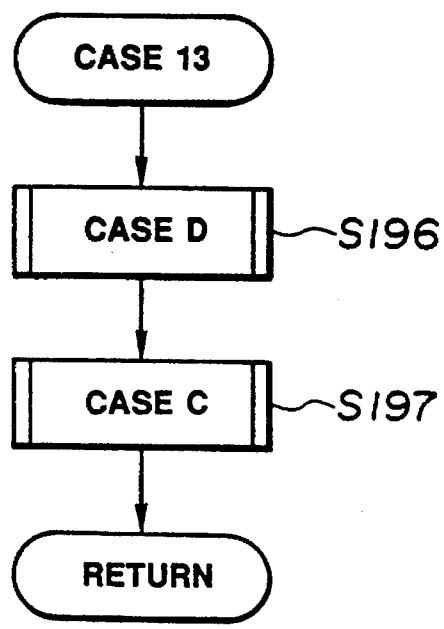
FIG. 51 is a flowchart illustrating the procedure of the process for case 13 in the first embodiment.

Case 13 is the case in which the pixels at pixel positions 0, 2 and 3 are black pixels, and the pixel at pixel position 1 is a white pixel. FIG. 15 illustrates case 13. The process in this case is performed in accordance with the flowchart of FIG. 51.

First, in step S196, the process for the neighborhood of pixel position D shown in FIG. 15 is performed. The contents of the process are the same as the contents of the above-described process for case D in step S0901 shown in FIG. 43. The process then proceeds to step S197, in which the process for the neighborhood of pixel position C shown in FIG. 15 is performed. The contents of the process are the same as the contents of the above-described process for case C in step S1201 shown in FIG. 48. Thus, the process for the case (case 13) shown at the left-end portion of FIG. 15 is terminated.

Explanation of the Process for Case 14

Figure 52:
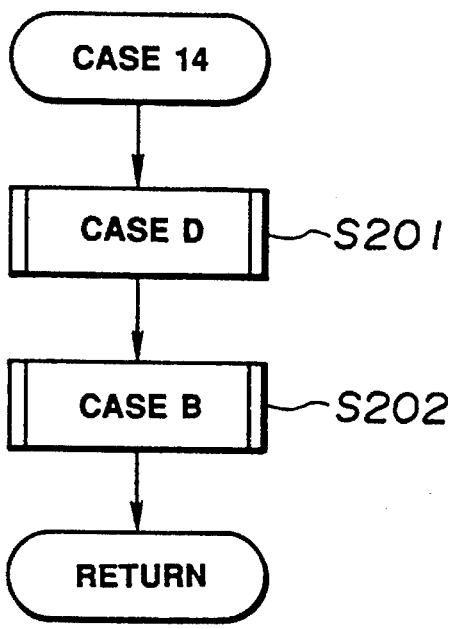
FIG. 52 is a flowchart illustrating the procedure of the process for case 14 in the first embodiment.

Case 14 is the case in which the pixels at pixel positions 1, 2 and 3 shown in FIG. 1 are black pixels, and the pixel at pixel position 0 is a white pixel. FIG. 16 illustrates case 14. The process in this case is performed in accordance with the flowchart of FIG. 52.

Figure 38:
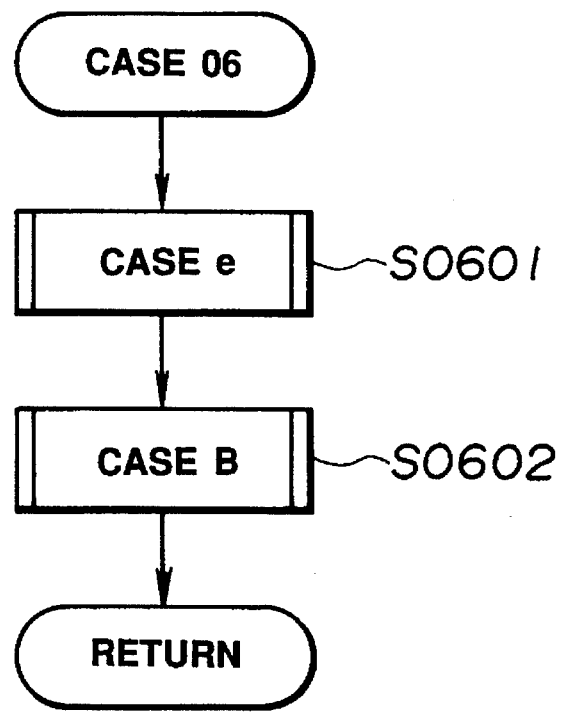
FIG. 38 is a flowchart illustrating the procedure of the process for case 06 in the first embodiment.
Figure 48:
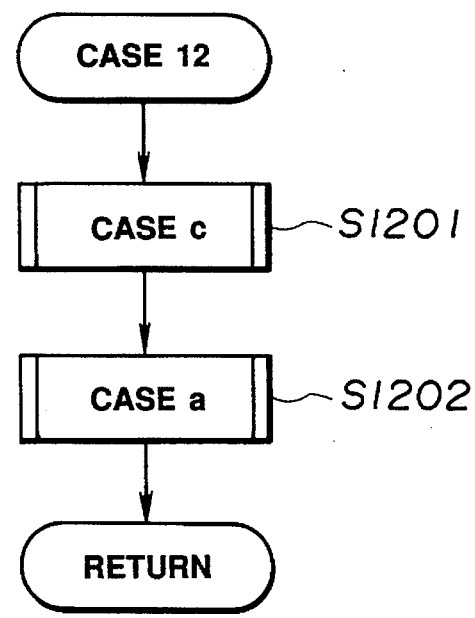
FIG. 48 is a flowchart illustrating the procedure of the process for case 12 in the first embodiment.

First, in step S201, the same process as the above-described process for case c in step S1201 shown in FIG. 48 is performed. The process then proceeds to step S202, in which the same process as the above-described process for case B in step S0602 shown in FIG. 38 is performed. Thus, the process for the case (case 14) shown at the left-end portion of FIG. 16 is terminated.

Explanation of the Process for Case 15

Figure 17:
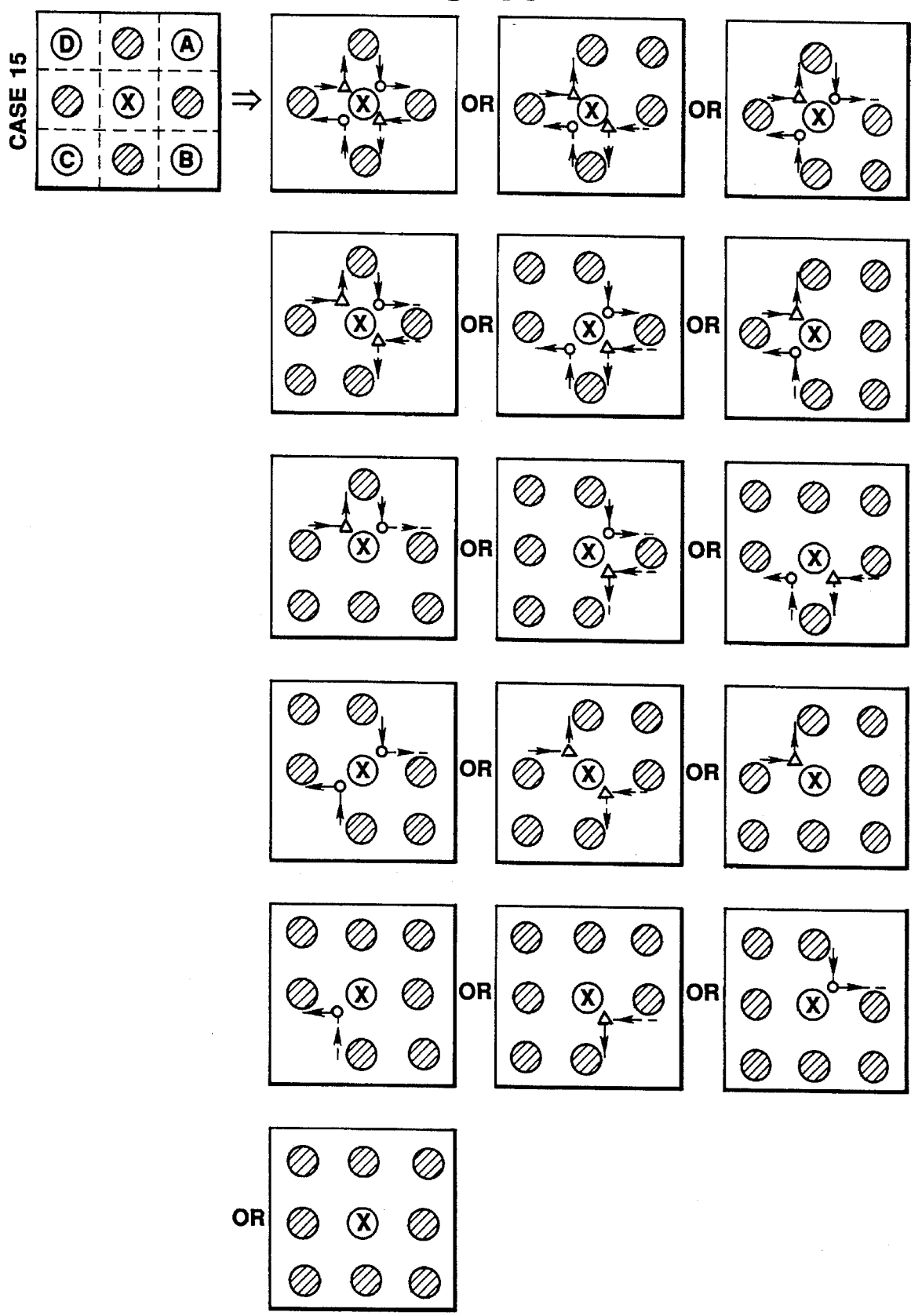
FIG. 17 is a diagram illustrating the state of case 15 when extracting contour vectors from a binary image in the first embodiment.
Figure 53:
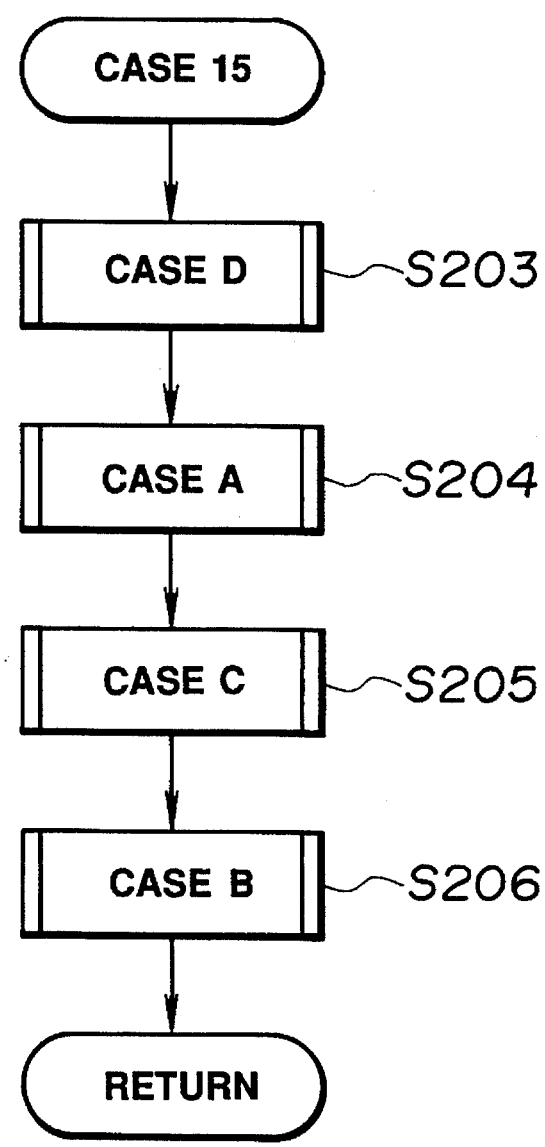
FIG. 53 is a flowchart illustrating the procedure of the process for case 15 in the first embodiment.

Case 15 is the case in which the pixels at pixel positions 0, 1, 2 and 3 (the pixels above, at the right, below and at the left of the target pixel, respectively) shown in FIG. 1 are black pixels. FIG. 17 illustrates case 15. In this case, the process is performed in accordance with the flowchart of FIG. 53.

First, in step S203, the process for the neighborhood of pixel position D shown in FIG. 17 is performed. The contents of the process are the same as the contents of the above-described process for case D in step S0901 shown in FIG. 43. The process then proceeds to step S204, in which the process for the neighborhood of pixel position A shown in FIG. 17 is performed. The contents of the process are the same as the contents of the above-described process for case "a" in step S302 shown in FIG. 33. In step S208, the process for the neighborhood of pixel position C shown in FIG. 17 is performed. The contents of the process are the same as the contents of the above-described process for case c in step S1201 shown in FIG. 48. The process then proceeds to step S206, in which the process for the neighborhood of pixel position B shown in FIG. 17 is performed. The contents of the process are the same as the contents of the above-described process for case B in step S0602 shown in FIG. 38. Thus, the process for the case (case 15) shown in the upper left-end portion of FIG. 17 is terminated.

According to the above-described processes, contour-vector data can be extracted from a binary image.

Thereafter, the process may be executed based on the technique disclosed, for example, in Japanese Patent Application No. 2-281958 (1990) proposed by the assignee of the present application.

The present invention may also be applied to the technique disclosed in Japanese Patent Application No. 3-345082 (1991) proposed by the assignee of the present application.

For example, in Japanese Patent Application No. 3345062 (1991), a technique of performing a smoothing operation using seven edge vectors, i.e., a target contour edge vector and respective three edge vectors before and after the target edge vectors to be subjected to a first smoothing operation has been described. The first smoothing operation will be executed with no problem even if the above-described edge vectors are replaced by contour vectors extracted in the present embodiments.

A contour point extracted in the present embodiments is set at a position closer to a black pixel between a white pixel and the black pixel of an input image. Hence, for example, a black line having the width of one pixel is extracted as a contour loop having the width of ½ pixel, and a white line having the width of one pixel in a black region is extracted as a contour loop having the width of (1+½) pixels. Even for the same pixel width in an input image, the width in an output image becomes greater by one pixel width for a recessed portion than for a projecting portion in a black-pixel region. That is, a projecting portion of black pixels is extracted narrower by ½ pixel width and a recessed portion is extracted wider by ½ pixel width than in the techniques proposed in Japanese Patent Application Nos. 2-281958 (1990) and 3-272701 (1991). Accordingly, the combination of the directions and the lengths of the above-described edge vectors may be adjusted in accordance with these differences. Other processes may be performed in accordance with the technique disclosed in the above-described Japanese Patent Application No. 3-345062 (1991).

Second Embodiment

The above-described cases 00, 03, 06, 09 and 12 may be processed with no problem in accordance with the processes for case 00', 03', 06', 09' and 12' shown in FIGS. 55 through 59, respectively.

That is, it will be easily understood that in each of the above-described cases, it is only necessary to satisfy the following two conditions.

(1) Case e is processed before case "a" and case c.
(2) Case b is processed after case "a" and case c.

Third Embodiment

In the above-described embodiments, a description has been provided of methods of extracting a region comprising eight connected black pixels. In a third embodiment of the present invention, by changing case e, case c, case "a" and case b to case e' shown in FIG. 60, case C' shown in FIG. 61, case a' shown in FIG. 62 and case b' shown in FIG. 63, respectively, it becomes possible to extract a region comprising four connected black pixels.

Figure 60:
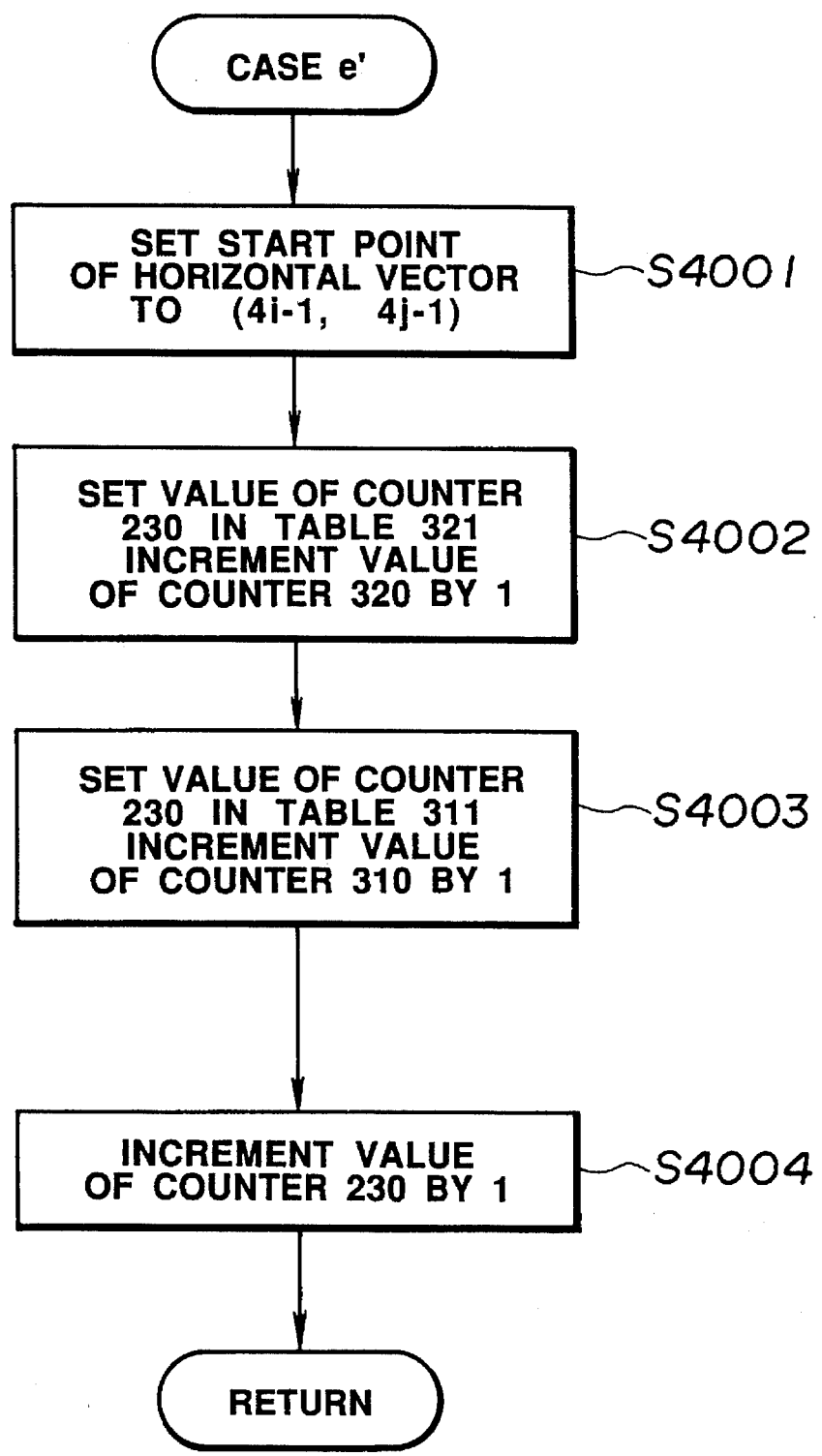
FIG. 60 is a flowchart illustrating the procedure of another process for case e in a third embodiment of the present invention.

The process for case e' shown in FIG. 60 is entirely the same as the above-described process for case e shown in FIG. 19, except using "... f(D)≠1?" instead of "... f(D)=1?" in step S2003. That is, whether the pixel at position D is a white pixel or a black pixel, the process for a white pixel in case e is performed. The respective processes in steps S4001, S4002, S4003 and S4004 for case e' are the same as the processes in steps S2001, S2002, S2004 and S2005 for case e.

Figure 61:
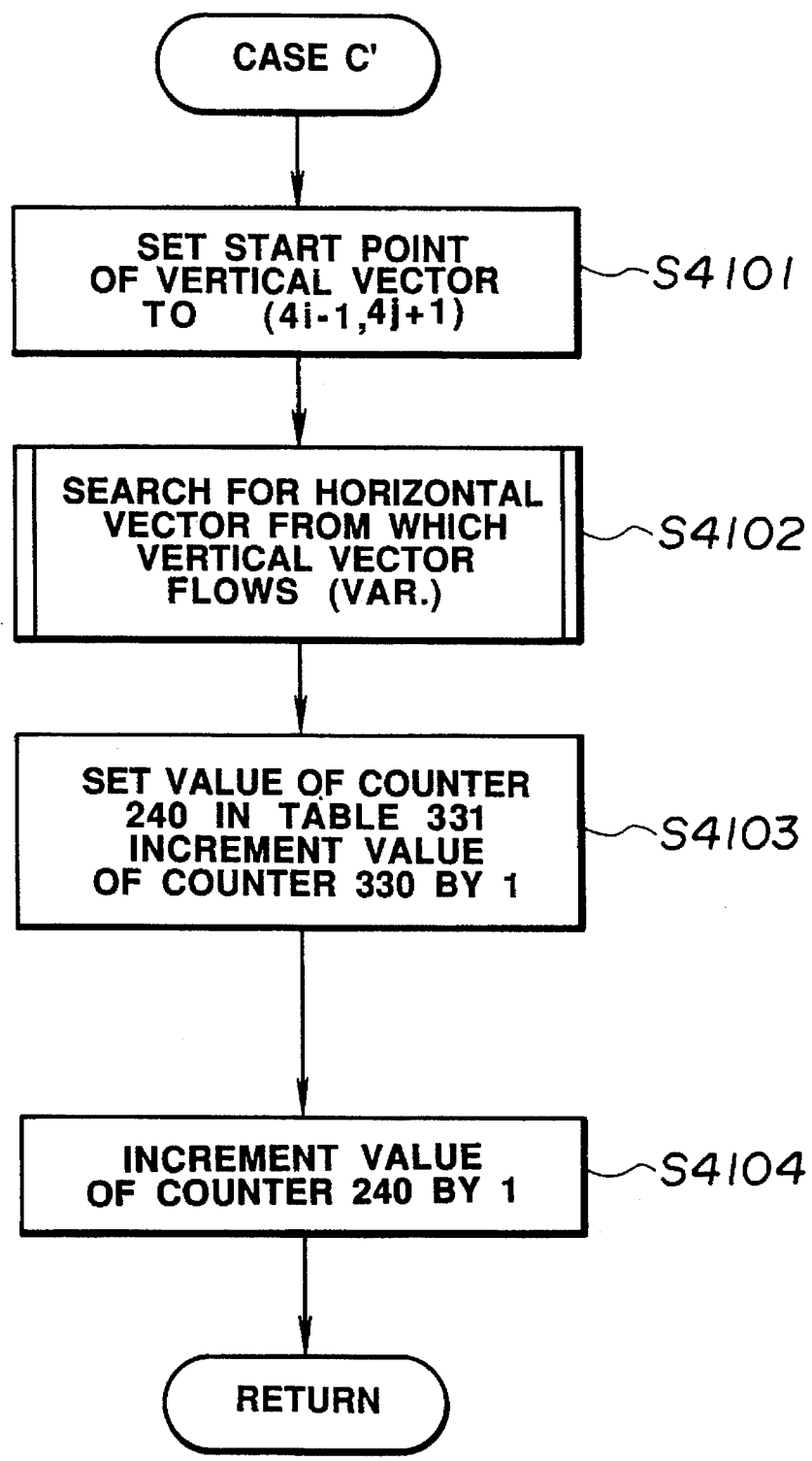
FIG. 61 is a flowchart illustrating the procedure of another process for case c in the third embodiment.

The process for case c' shown in FIG. 61 is entirely the same as the above-described process for case c shown in FIG. 22, except using "... f(C)≠1?" instead of "... f(C)=1?" in step S2103. That is, whether the pixel at position C is a white pixel or a black pixel, the process for a white pixel for case "a" is performed. The respective processes in steps S4101, S4102, S4103 and S4104 for case c' are the same as the processes in steps S2101, S2102, S2112 and S2113 for case c.

Figure 25:
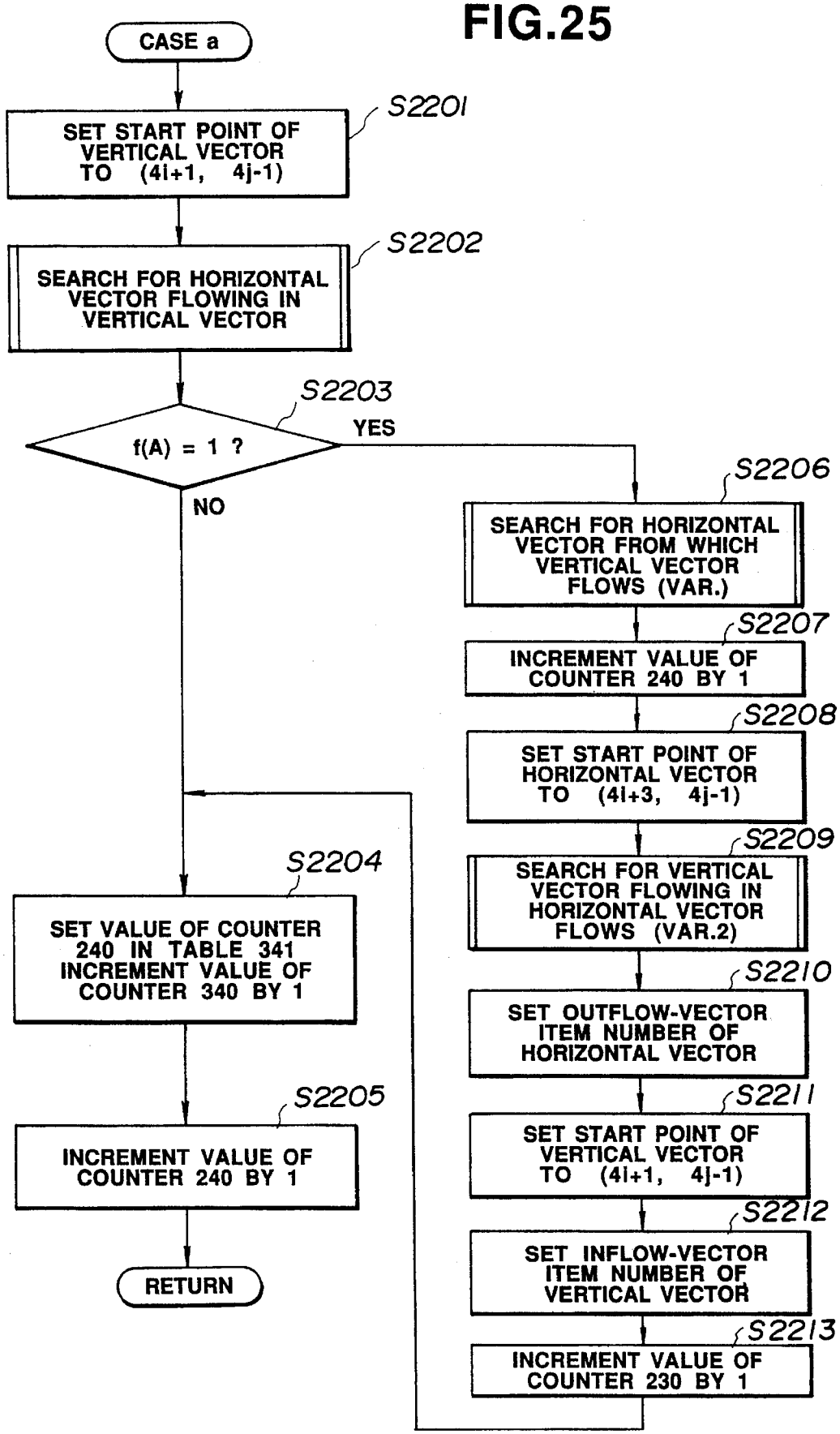
FIG. 25 is a flowchart illustrating the procedure of the process for case "a" in the first embodiment.
Figure 62:
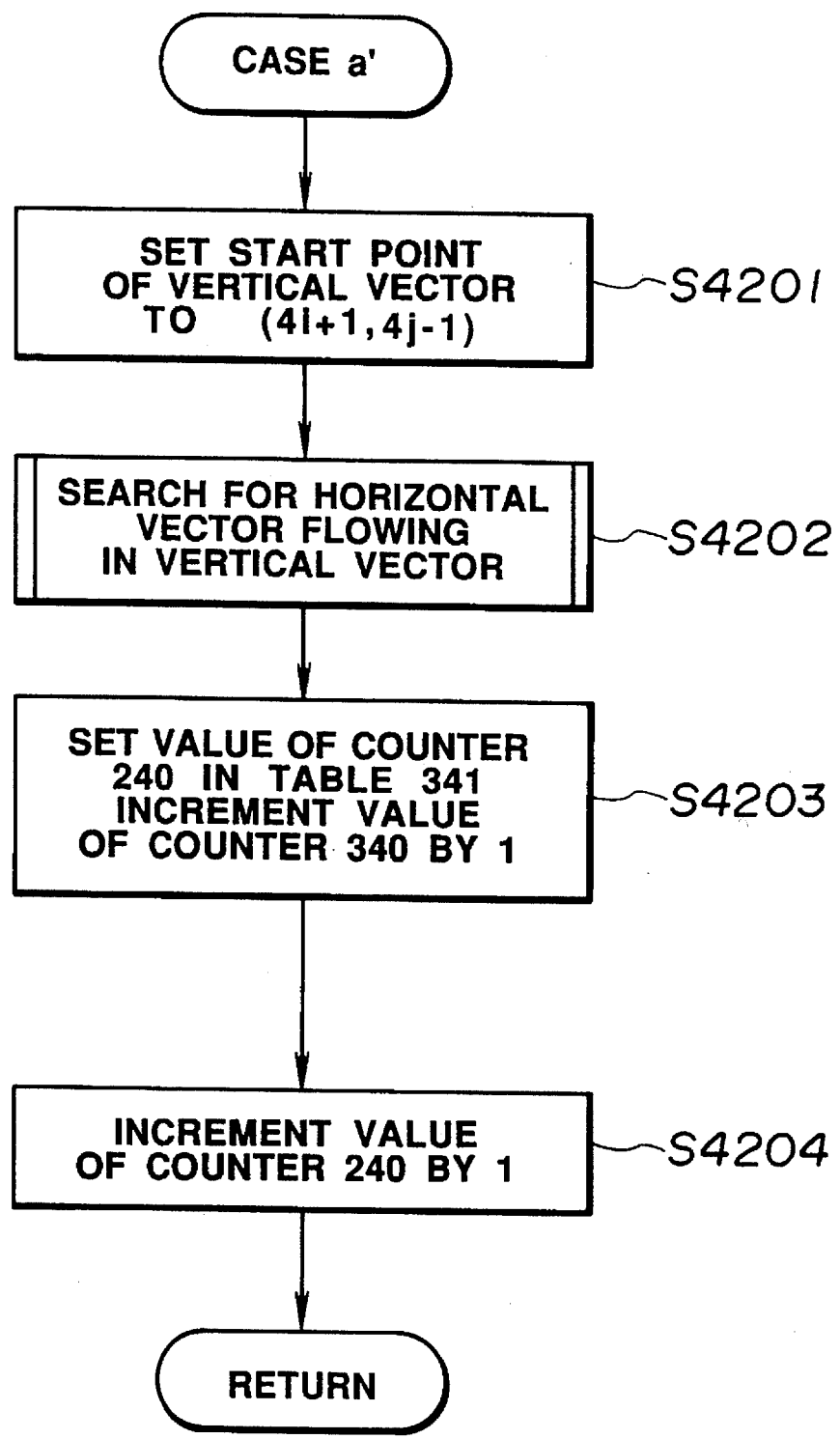
FIG. 62 is a flowchart illustrating the procedure of another process for case "a" in the third embodiment.
Figure 63:
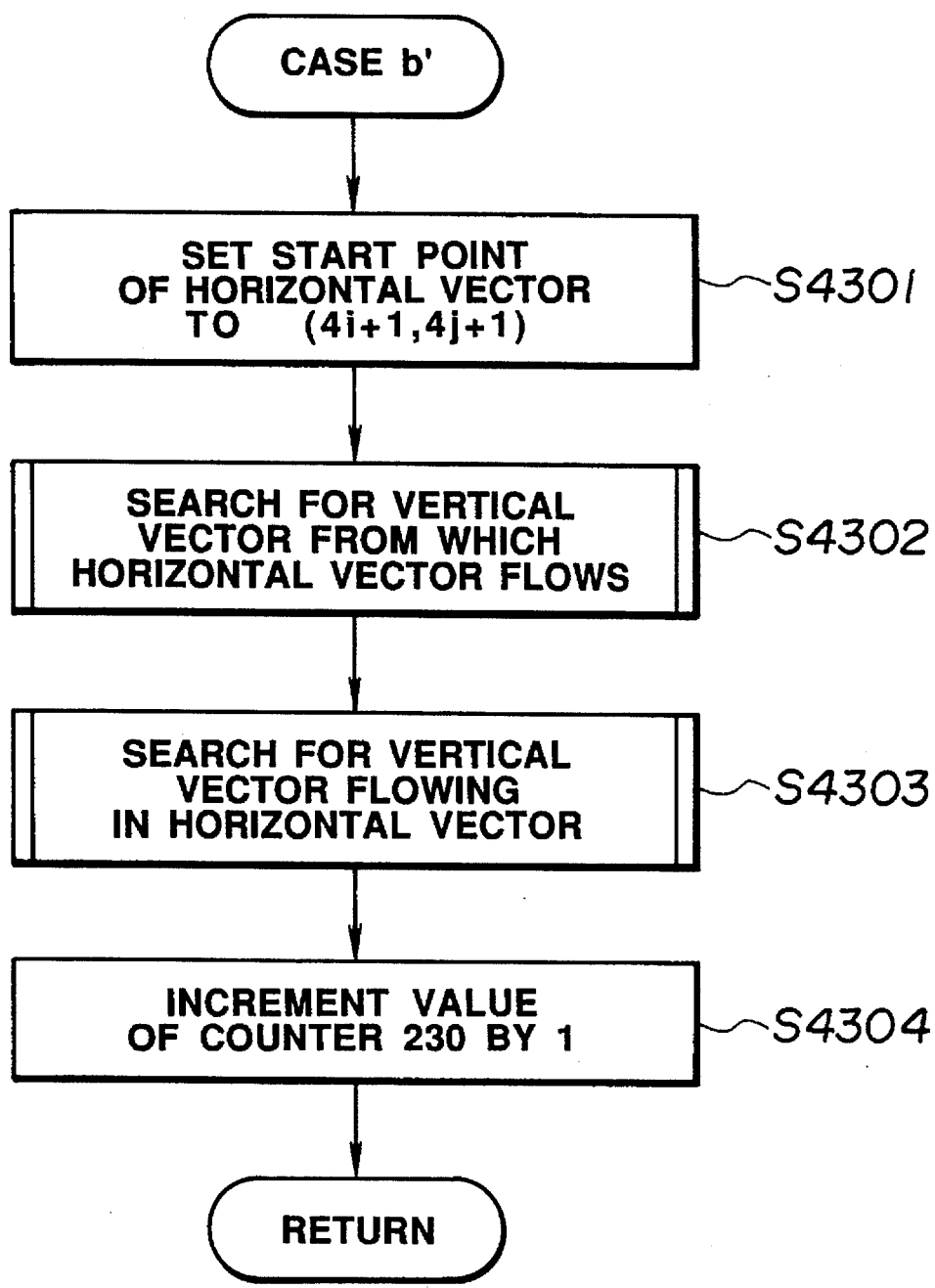
FIG. 63 is a flowchart illustrating the procedure of another process for case b in the third embodiment.

The process for case a' shown in FIG. 62 is entirely the same as the above-described process for case "a" shown in FIG. 25, except using "... f(A)≠1?" instead of "... f(A)=1?" in step S2203. That is, whether the pixel at position A is a white pixel or a black pixel, the process for a white pixel in case "a" is performed. The respective processes in steps S4201, S4202, S4203 and S4204 for case a' are the same as the processes in steps S2201, S2202, S2204 and S2205 for case "a".

The process for case b' shown in FIG. 83 is entirely the same as the above-described process for case b shown in FIG. 28, except using "... f(B)≠1?" instead of "... f(B)=1?" in step S2303. That is, whether the pixel at position B is a white pixel or a black pixel, the process for a white pixel for case b is performed. The respective processes in steps S4301, S4302, S4303 and S4304 for case b' are the same as the processes in steps S2301, S2302, S2312 and S2313 for case b.

Fourth Embodiment

In each of the above-described embodiments, in expressing the position of a pixel of an input binary image, the binary image is assumed to comprise m+n pixels (m and n are integers) having n rasters, each having m pixels. The position of the i-th pixel on the j-th raster is expressed by $(4i, 4j)$ (i and j are positive integers, and $i \leq m$ and $j \leq n$). The coordinates of extracted contour points are expressed by $(4i \pm 1, 4j \pm 1)$, $(4i \pm 3, 4j \pm 1)$ and $(4i \pm 1, 4j \pm 3)$. These coordinates may, of course, be expressed by adding constants p and q to the components of the main-scanning direction and the sub-scanning direction, respectively. That is, the coordinates of extracted contour points may, of course, be expressed by $(4i+p \pm 1, 4j+q \pm 1)$, $(4i+p \pm 3, 4j+q \pm 1)$ and $(4i+p \pm 1, 4j+q \pm 3)$. For example, when p=q=1, the coordinates of extracted contour points become $(4i, 4j)$, $(4i, 4j \pm 2)$, $(4i, 4j+4)$, $(4i \pm 2, 4j)$, $(4i+4, 4j)$, $(4i+4, 4j+4)$ and $(4i \pm 2, 4j \pm 2)$. This corresponds to the case in which each contour point is extracted at the exact midpoint between a pixel of an input image and the midpoint between pixels. Such a situation is obtained by merely performing parallel movement of the above-described position of a contour point extracted closer to a black pixel, and hence substatially equals the determination of the position of a contour point extracted closer to a black pixel. That is, black-pixel regions are extracted narrower than white-pixel regions.

Fifth Embodiment

When applying the present invention to the technique disclosed in Japanese Patent Application No. 3-345062 (1991) proposed by the assignee of the present application, a CPU may determine whether or not the value of the magnification is low. If the result of the determination is affirmative (for example, the magnification is equal to or less than 2.0), the contour vector extraction method of the present invention may be used. If the result of the determination is negative, the method disclosed in Japanese Patent Application No. 2-281958 (1990) or 3-272701 (1991) proposed by the assignee of the present application may be used. According to such an approach, an enlarged image having an expected line width corresponding to the magnification is obtained even if the magnification has a large value.

Although a description has been provided of the embodiments in which an attention is paid to black pixels in the original image, an attention may be paid to white pixels. In such a case, entirely the same processing can, of course, be performed.

The present invention may be applied to a system comprising a plurality of apparatuses, or an apparatus comprising a single unit. In addition, the present invention may, of course, be applied to cases in which programs are supplied to a system or an apparatus.

As described above, according to the present embodiments, when extracting outline vectors from a binary image, by extracting narrower contour points for a region of the input image in which black pixels are connected than for a region in which white pixels are connected, the widths of lines in a magnified image of a low magnification do not tend to increase even in the case of black pixels on contour lines and black pixels in a region surrounded by contour lines.

As described above, according to the image processing method and apparatus of the present invention, it becomes possible to extract contour vector data in order to generate an excellent image without increasing the width of a line even after magnification-varying processing.

As described above, according to the present invention, it becomes possible to provide an image processing method and apparatus for extracting contour vectors of a binary image consisting of a set of a first pixel state and a second pixel state, wherein, when extracting a vector present along an image edge changing from the first pixel state to the second pixel state, a vector present along a border which is provided at least between the first and second pixel state and closer to the first pixel state is extracted.

As described above, according to the present invention, it becomes possible to provide an image processing method and apparatus for extracting contour vectors of a binary image consisting of a set of a first pixel state and a second pixel state, and generating a binary image having a desired varying magnification based on the extracted contour vectors, wherein, when extracting a vector present along an image edge changing from the first pixel state to the second pixel state, a vector present along a border which is provided at least between the first pixel state and the second pixel state and closer to the first pixel state based on the varying magnification is extracted.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and appended claims. The scope of the following claims are to be accorded the broadest interpretation so as to encompass all such modifications and equivalent structures and functions.

What is claimed is:

1. An image processing method comprising the steps of:

inputting image data;

extracting contour vector data representing a contour of the image data input in said inputting step;

storing the contour vector data extracted in said extracting step; and generating image data representing an image in the input image data based on magnification-varying processing performed on the contour vector data so that a pixel within a region surrounded by the contour vector data is made into a black pixel, and so that a pixel represented by the contour vector data is also made into a black pixel, wherein vectors represented by the extracted contour vector data are located between a white and a black pixel at a boundary between a white and a black region, and are located closer to the black pixel.

2. A method according to claim 1, wherein the input image data is binary image data.

3. A method according to claim 1, wherein the vectors represented by said extracted vector data are vectors in which horizontal vectors and vertical vectors are combined alternately.

4. A method according to claim 1, wherein in said extracting step, the contour vector data is extracted based on a combination of a target pixel and pixels surrounding the target pixel.

5. A method according to claim 1, wherein in said inputting step, the image data is input in the form of raster scanning.

6. An image processing method comprising the steps of:

extracting contour vector data representing input image data;

storing the contour vector data extracted in said extracting step;

discriminating a magnification with which to perform magnification-varying processing on the contour vector data, wherein when a value of the discriminated magnification is higher than a predetermined value, vectors represented by the contour vector data extracted in said extracting step are located between and at a center of white and black pixels at a boundary between white and black regions of the input image data, and when a value of the discriminated magnification is lower than the predetermined value, the vectors are located between the white and black pixels at the boundary between the white and black regions of the image data extracted in said extracting step and closer to the black pixel of the input image data; and generating image data representing an image in the input image data based on magnification-varying processing performed on the contour vector data so that a pixel within a region surrounded by the contour vector data is made into a black pixel, and so that a pixel represented by the contour vector data is also made into a black pixel.

7. A method according to claim 6, further comprising the step of inputting image data.

8. A method according to claim 6 or 7, wherein the input image data is binary image data.

9. A method according to claim 6, wherein the vectors represented by said extracted vector data are vectors which horizontal vectors and vertical vectors are combined alternately.

10. A method according to claim 6, wherein in said extracting step, the contour vector data is extracted based on a combination of a target pixel and pixels surrounding the target pixel.

11. A method according to claim 7, wherein in said inputting step, the image data is input in the form of raster scanning.

12. An image processing apparatus comprising:

input means for inputting image data;

extracting means for extracting contour vector data representing a contour of the image data input in said input means;

storing means for storing the contour vector data extracted by said extracting means; and generating means for generating image data representing an image in the input image data based on magnification-varying processing performed on the contour vector data so that a pixel within a region surrounded by the contour vector data is made into a black pixel, and so that a pixel represented by the contour vector data is also made into a black pixel, wherein vectors represented by the extracted contour vector data are located between a white and a black pixel at a boundary between a white and a black region, and closer to the black pixel.

13. An apparatus according to claim 12, wherein the input image data is binary image data.

14. An apparatus according to claim 12, wherein the vectors represented by said extracted vector data are vectors in which horizontal vectors and vertical vectors are combined alternately.

15. An apparatus according to claim 12, wherein said extracting means extracts the contour vector data based on a combination of a target pixel and pixels surrounding the target pixel.

16. An apparatus according to claim 12, wherein said input means inputs the image data in the form of raster scanning.

17. An image processing apparatus comprising:

extracting means for extracting contour vector data representing input image data;

storing means for storing the contour vector data extracted by said extracting means;

discriminating means for discriminating a magnification with which to perform magnification-varying processing on the contour vector data, wherein when a value of the discriminated magnification is higher than a predetermined value, vectors represented by the contour vector data extracted by said extracting means are located between and at a center of white and black pixels at a boundary between white and black regions of the input image data, and when a value of the discriminated magnification is lower than the predetermined value, the vectors are located between the white and black pixels at the boundary between the white and black regions of the image data extracted in said extracting step and closer to the black pixel of the input image data; and generating means for generating image data representing an image in the input image data based on magnification-varying processing performed on the contour vector data so that a pixel within a region surrounded by the contour vector data is made in to a black pixel, and so that a pixel represented by the contour vector data is also made into a black pixel.

18. An apparatus according to claim 17, further comprising an input means for inputting image data.

19. An apparatus according to claim 18, wherein said input means inputs the image data in the form of raster scanning.

20. An apparatus according to claim 17 or 18, wherein the input image data is binary image data.

21. An apparatus according to claim 17, wherein the vectors represented by said extracted vector data are vectors which horizontal vectors and vertical vectors are combined alternately.

22. An apparatus according to claim 17, wherein said extracting means extracts the contour vector data based on a combination of a target pixel and pixels surrounding the target pixel.

* * * * *

UNITED STATES PATENT AND TRADEMARK OFFICE
CERTIFICATE OF CORRECTION

PATENT NO. : 5,579,405

DATED : November 26, 1996

INVENTORS : Yoshihiro Ishida, et al.

It is certified that error appears in the above-identified patent and that said Letters Patent is hereby corrected as shown below:

COVER page,

Under [56] References Cited, Foreign Patent Documents,
"4157578" should read --4-157578--;
"5108823" should read --5-108823--; and
"5174140" should read --5-174140--.

COLUMN 2

Line 14, "2-281988" should read --2-281958--.

COLUMN 6

Figure 54:
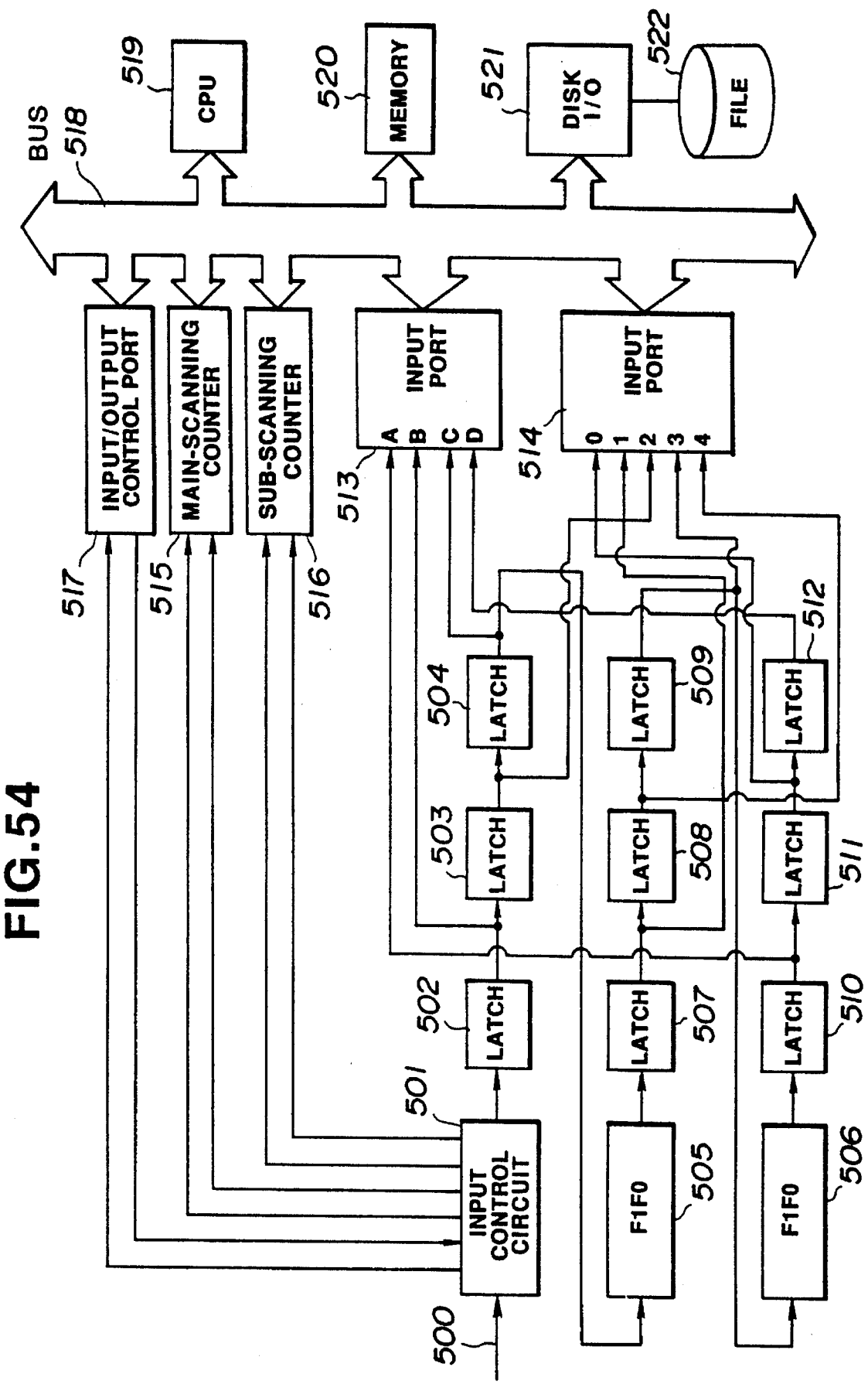
FIG. 54 is a block diagram showing the configuration of a principal part of an image processing apparatus of the first embodiment.
Figure 55:
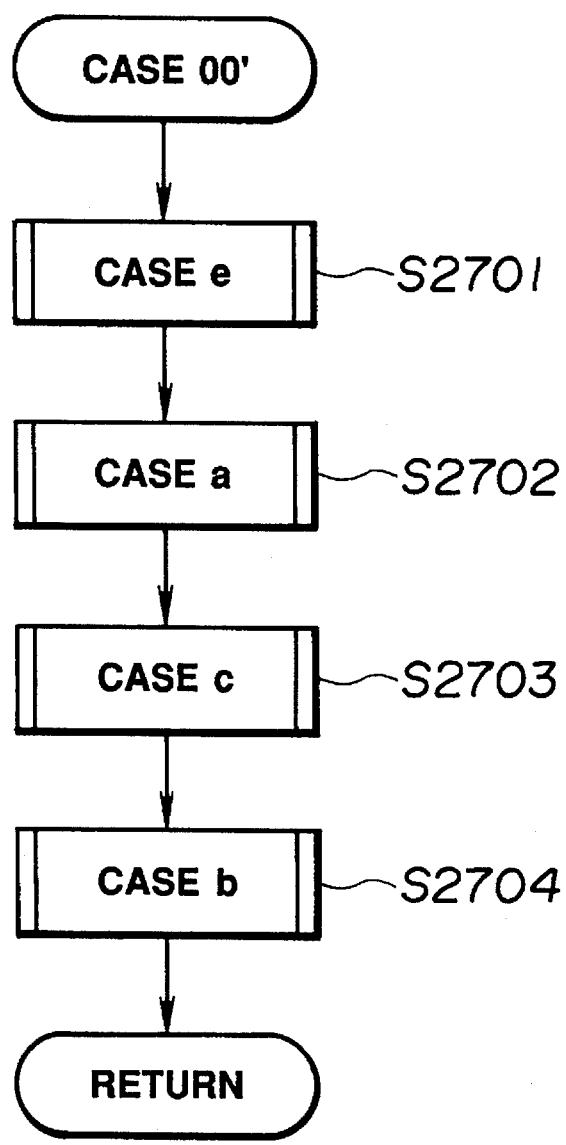
FIG. 55 is a flowchart illustrating the procedure of another process for case 00 in a second embodiment of the present invention.
Figure 56:
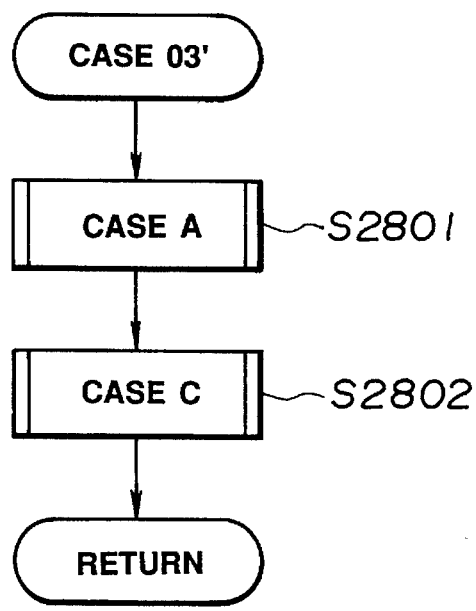
FIG. 56 is a flowchart illustrating the procedure of another process for case 03 in the second embodiment.
Figure 57:
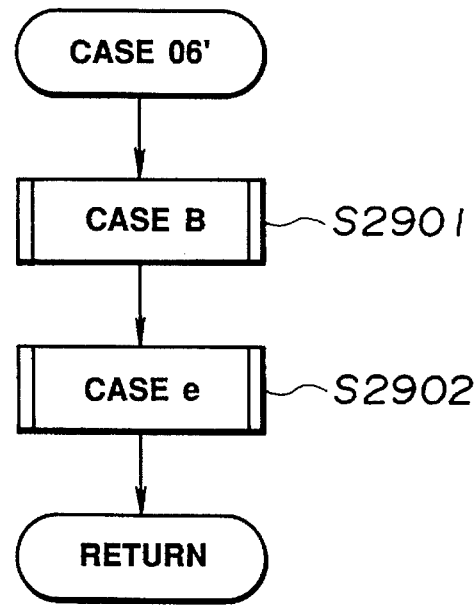
FIG. 57 is a flowchart illustrating the procedure of another process for case 06 in the second embodiment.
Figure 58:
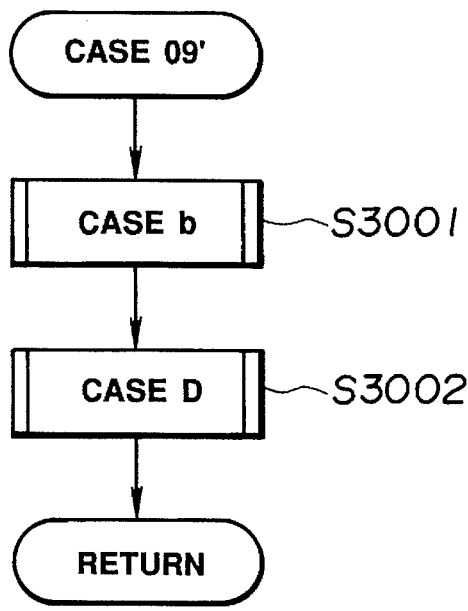
FIG. 58 is a flowchart illustrating the procedure of another process for case 09 in the second embodiment.
Figure 59:
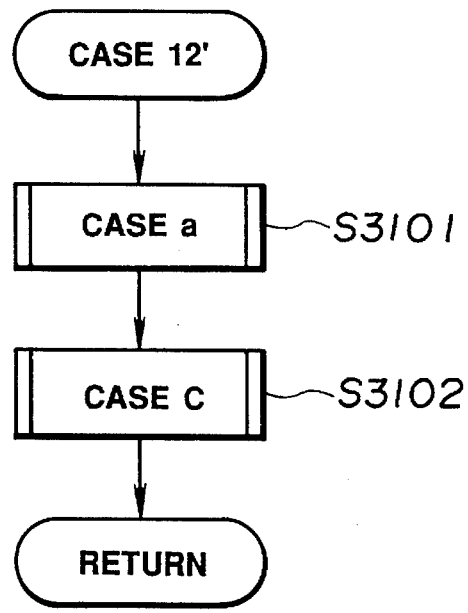
FIG. 59 is a flowchart illustrating the procedure of another process for case 12 in the second embodiment.

Line 19, "Fig. 84" should read --Fig. 54--; and
Line 22, "In Fig. 84," should read --In Fig. 54,--.

COLUMN 11

Line 62, "FIG." should read --FIG. 65.--.

UNITED STATES PATENT AND TRADEMARK OFFICE
CERTIFICATE OF CORRECTION

PATENT NO. : 5,579,405

DATED : November 26, 1996

INVENTORS : Yoshihiro Ishida, et al.

It is certified that error appears in the above-identified patent and that said Letters Patent is hereby corrected as shown below:

COLUMN 12

Line 46, "`...(4i-1)?" should read --"...(4i-1)?"--.

COLUMN 18

Line 32, "S208," should read --S205,--;
Line 51, "3-345082" should read --3-345062--; and
Line 53, "3345062" should read --3-345062--.

COLUMN 20

Line 6, "mtn" should read --mxn--.

Signed and Sealed this

Sixth Day of May, 1997

BRUCE LEHMAN

*Attest:*

*Attesting Officer*   Commissioner of Patents and Trademarks